United States Patent [19]

Hamanaka et al.

[11] Patent Number: 5,801,837
[45] Date of Patent: Sep. 1, 1998

[54] IMAGE FORMING APPARATUS FOR PRINTING OUT SHEETS OF A DOCUMENT ONE BY ONE AS THEY ARE INPUT IN ELECTRONIC SORT MODE

[75] Inventors: Miki Hamanaka, Kawasaki; Masako Shibaki, Yokohama; Toshiharu Takahashi, Kawasaki, all of Japan

[73] Assignee: Kabushiki Kaisha Toshiba, Kanagawa-Ken, Japan

[21] Appl. No.: 597,245

[22] Filed: Feb. 6, 1996

[30] Foreign Application Priority Data

Feb. 14, 1995 [JP] Japan ......................... 7-025300

[51] Int. Cl.[6] .......................... H04N 1/21; H04N 1/387
[52] U.S. Cl. .......................... 358/296; 358/450
[58] Field of Search .......................... 399/381, 383; 355/24, 77, 321–25; 358/296, 450, 444, 468, 498; 395/115–116

[56] References Cited

U.S. PATENT DOCUMENTS

| | | |
|---|---|---|
| 4,502,776 | 3/1985 | Matsumoto et al. ............. 355/14 SH |
| 4,597,018 | 6/1986 | Sonobe et al. .................. 358/296 |
| 4,657,375 | 4/1987 | Watanabe et al. ............... 355/14 R |
| 5,229,866 | 7/1993 | Kashiwagi et al. .............. 358/444 |
| 5,309,245 | 5/1994 | Hayashi et al. ................. 358/296 |
| 5,475,475 | 12/1995 | Kohtani et al. ................. 355/244 |
| 5,539,445 | 7/1996 | Muramatsu et al. ............. 347/262 |

OTHER PUBLICATIONS

Anonymous: "Production of Signatures From Documents Stored In Electronic Memory" (1990) Sep.; No. 317, Emsworth, GB; pp. 735–738.

Primary Examiner—Peter S. Wong
Assistant Examiner—Gregory J. Toatley, Jr.
Attorney, Agent, or Firm—Limbach & Limbach, LLP

[57] ABSTRACT

An image forming apparatus comprises a scanner for reading images of a document, a memory for storing the images, a printer function for printing images corresponding to the document one by one every time the images are read by the scanner in accordance with set image forming conditions, another printer function for printing the stored images after all the images of the document are read in accordance with the image forming conditions, and a control section for setting the image forming conditions and enabling one of the printer functions in accordance with the image forming conditions.

20 Claims, 38 Drawing Sheets

| | |
|---|---|
| 1ST PAGE INPUT=COMPLETED | 1ST PAGE OUTPUT=COMPLETED |
| 2ND PAGE INPUT=COMPLETED | 2ND PAGE OUTPUT=EMPTY |
| 3RD PAGE INPUT=COMPLETED | 3RD PAGE OUTPUT=EMPTY |
| | |
| $\ell$-TH PAGE INPUT=IN PROCESS | $\ell$-TH PAGE OUTPUT=EMPTY |
| $(\ell+1)$-TH PAGE INPUT=EMPTY | $(\ell+1)$-TH PAGE OUTPUT=EMPTY |

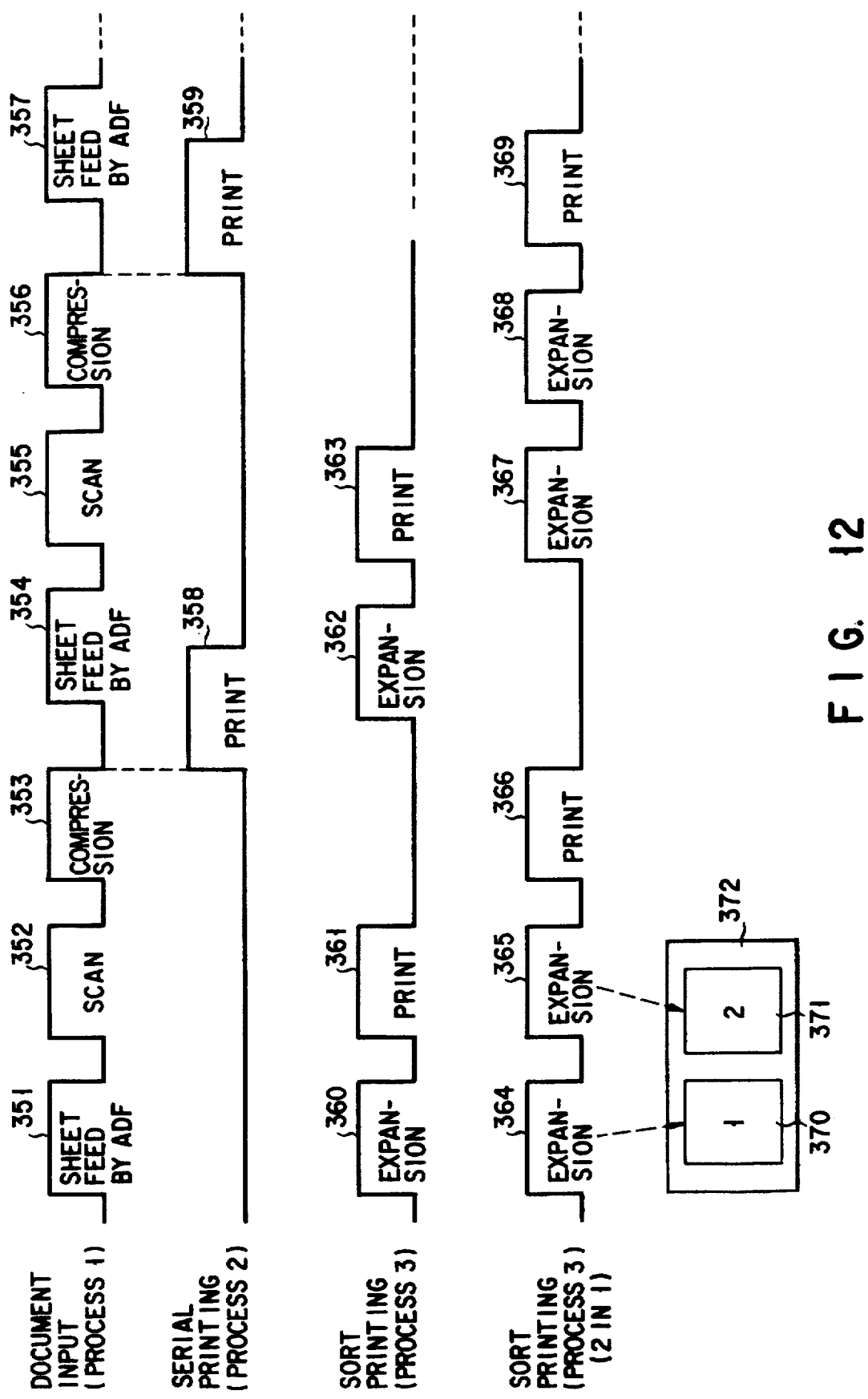

| JOB ID | INPUT TASK | OUTPUT TASK |
|---|---|---|
| 1 | COMPLETED | |
| 2 | MEMORY FULL | |
| ⋮ | ⋮ | ⋮ |

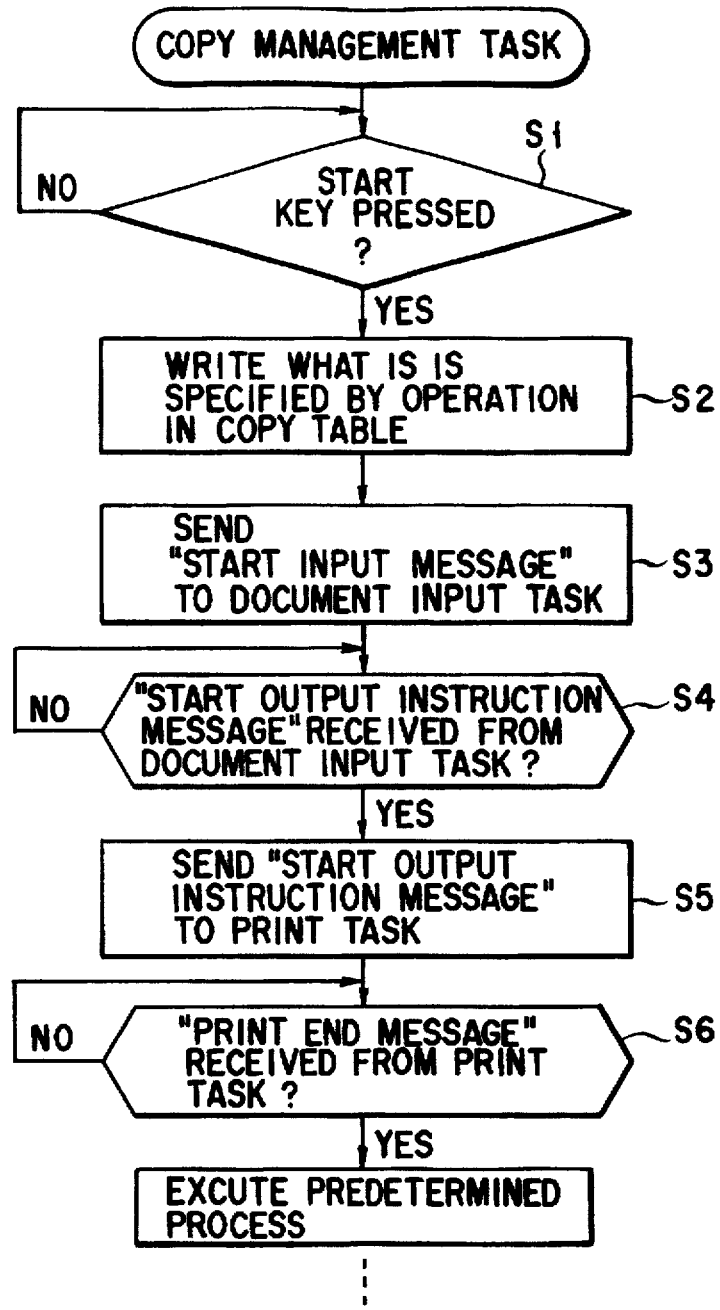
F I G. 16

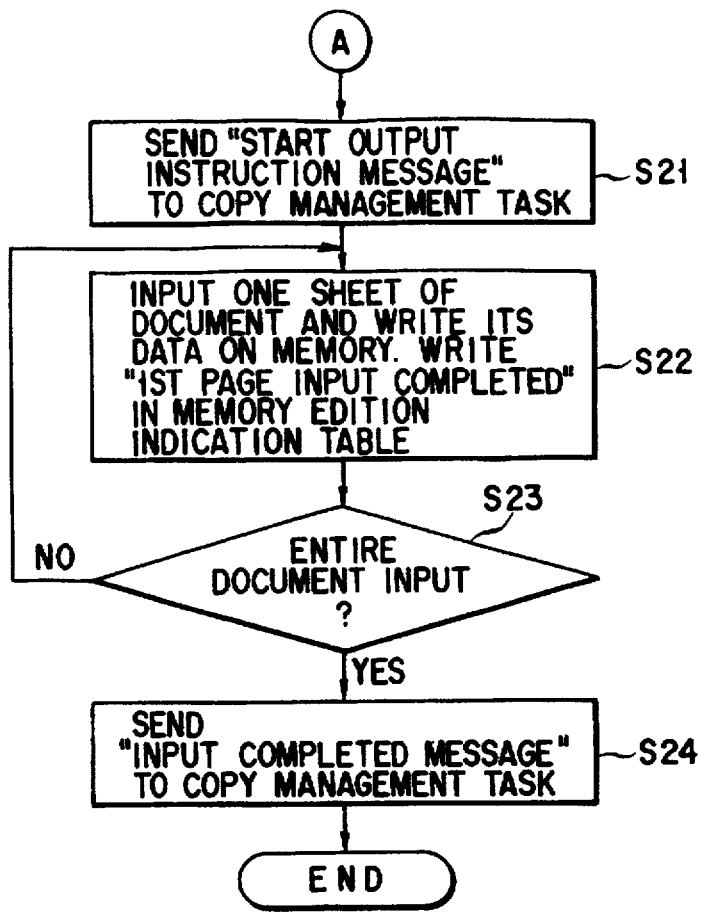
FIG. 18
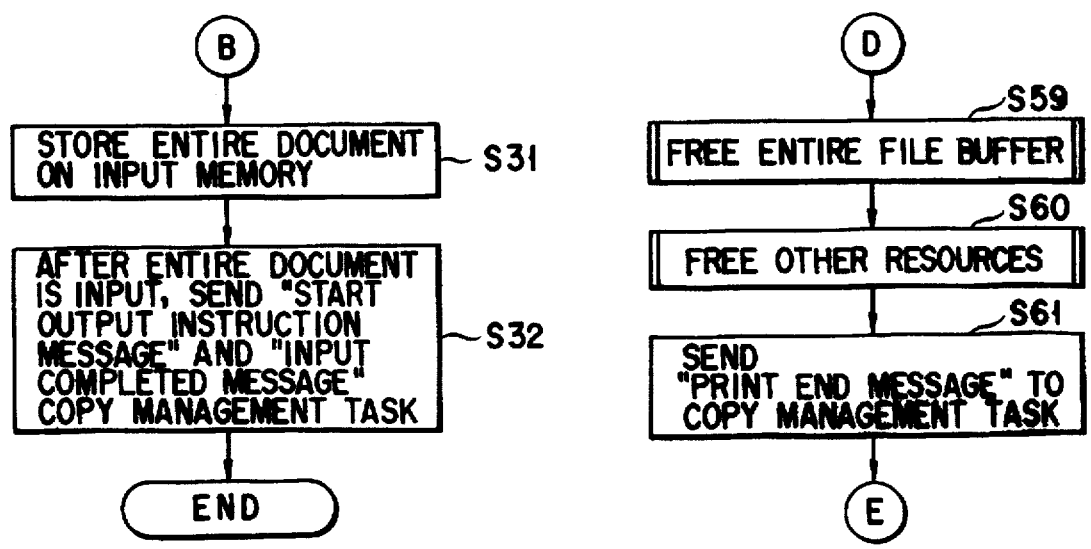
FIG. 19
FIG. 22

PRECEDING OUTPUT
(FOR SERIAL OUTPUT)

|     |     | INPUT | OUTPUT |
|-----|-----|-------|--------|
|     | 8M  | 2MB   | 2MB    |
| 8M  | 16M | 4MB   | 4MB    |
|     | 24M | 4MB   | 4MB    |
| 16M | 32M | 4MB   | 4MB    |
| 24M |     | 4MB   | 4MB    |
| 32M |     | 4MB   | 4MB    |

FOR AFTER-READING

|     |     | INPUT | OUTPUT |
|-----|-----|-------|--------|
|     | 8M  | 4MB   | 4MB    |
| 8M  | 16M | 4MB   | 4MB    |
|     | 24M | 4MB   | 4MB    |
| 16M | 32M | 4MB   | 4MB    |
| 24M |     | 8MB   | 8MB    |
| 32M |     | 8MB   | 8MB    |

| 33e | | |
|---|---|---|
| 01— | —02— | —03 |
| END | NULL | NULL |
| NULL | NULL | NULL |
| . | . | . |
BLOCK MANAGEMENT
TABLE IN SOME STATE
F I G. 38A
| 33e | | |
|---|---|---|
| 01— | —02— | —03 |
| 04— | —END | NULL |
| NULL | NULL | NULL |
| . | . | . |
STATE OF BLOCK
MANAGEMENT TABLE AFTER
ONE MEMORY ALLOCATION
F I G. 38B
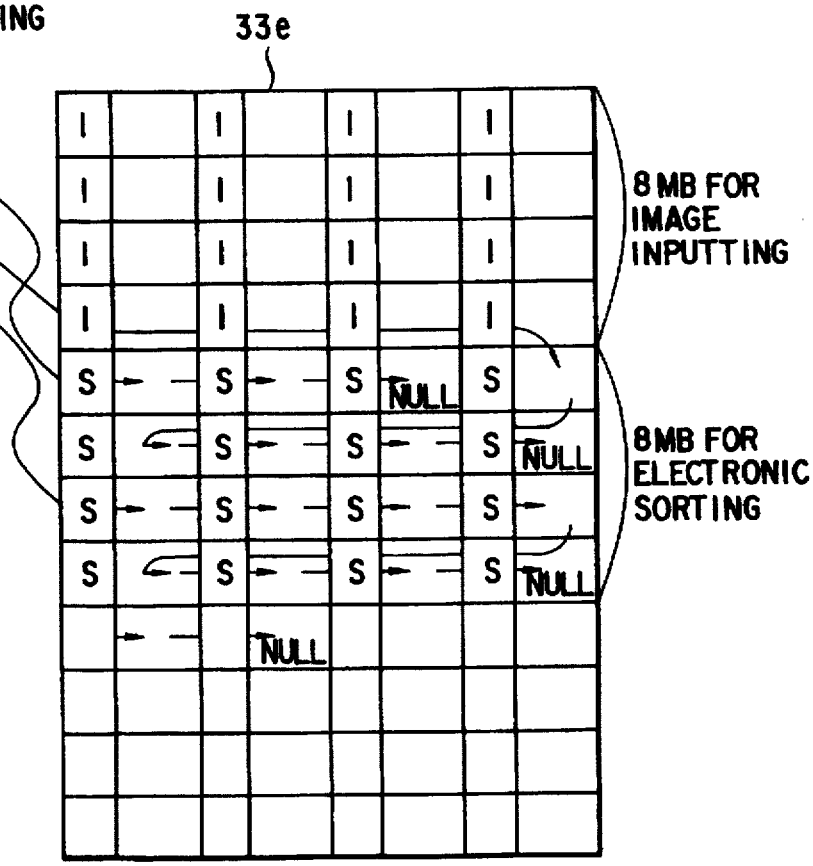
F I G. 39

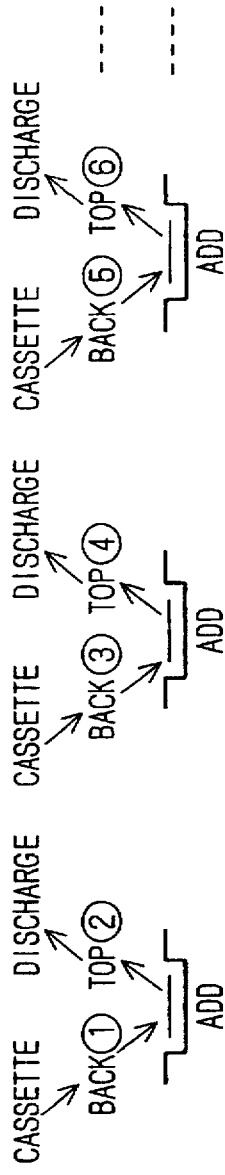
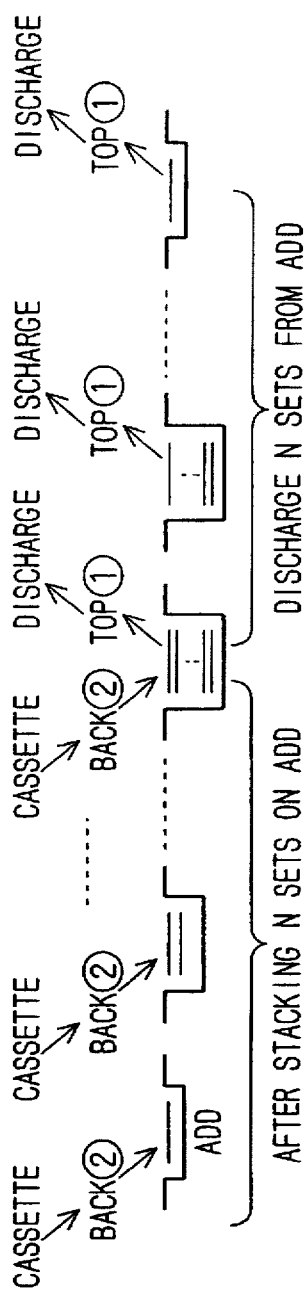
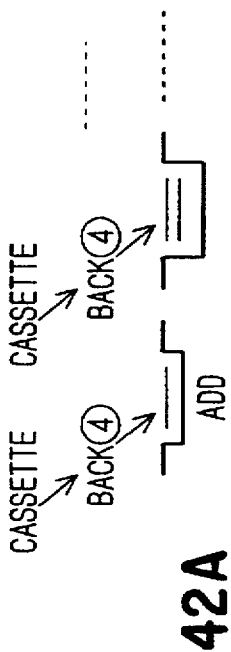
FIG. 41
FIG. 42A

IMAGE FORMING APPARATUS FOR PRINTING OUT SHEETS OF A DOCUMENT ONE BY ONE AS THEY ARE INPUT IN ELECTRONIC SORT MODE

BACKGROUND OF THE INVENTION

1. Field of the Invention

The present invention relates to a digital image input/output apparatus having image compression/expansion means and image storage means or to a digital copying machine.

2. Description of the Related Art

Conventional digital copying machines are equipped with an electronic sort/copy function for compressing and storing input images, read by a scanner, and expanding and printing the images or a so-called memory edit/copy function for combining a plurality of document images as a single image and copying the combined image.

The electronic sort/copy function starts editing or printing after all document images are input through a scanner, whereas the memory edition/copy function combines document images on a page memory without compression or memorization and then prints the combined image.

In the electronic sort/copy function, after all document images are read, the images are compared and temporarily stored in a specific memory area after which the compressed images are expanded and printed. When a document contains many sheets, it takes time until printing actually starts so that an operator cannot promptly check to see if document reading and/or copying is being carried out properly. Therefore, an operator is very likely to find out the improper reading of a document too late to prevent a pile of misprint-outs.

As the conventional memory edition which does not involve compression and temporary storage starts printing when each sheet of a document is read, its copy is obtained quickly, but rescanning is needed when paper jamming occurs. When a plurality of sets of a document are to be copied without the compression and temporary storage operations, the next sheet cannot be input until a specified number of copies of the previous sheet are made. It therefore takes time until all the sheets of a document are scanned.

SUMMARY OF THE INVENTION

Accordingly, it is an object of the present invention to provide an image forming apparatus capable of checking the first sheet of a copy or the first set of copies as early as possible while using an electronic sort function.

An image forming apparatus according to this invention comprises: means for reading an image of a document; means for storing the image read by the reading means; setting means for setting image forming conditions at a time of forming the image stored in the storing means on an image-forming medium; first output means for, every time the reading means reads images of sheets of a document sheet by sheet, printing images corresponding to the read images one by one; second output means for, after the first output means prints images corresponding to all sheets of the document one by one, printing images which correspond to the sheets of the document and have not been printed out yet in accordance with the image forming conditions; third output means for, after storing all images corresponding to sheets of the document, printing images corresponding to all sheets of the document; and means for enabling the first and second output means or the third output means in accordance with the image forming conditions set by the setting means.

With the above structure, after input document images are printed out one by one, the input images of all the sheets of the document are compressed and stored and electronic sort printing is performed in accordance with the set conditions. This design allows an operator to find out misreading of a document, the wrong input direction, the wrong setting, etc. at the time the document image is input, thus ensuring the adequate copying operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 12 is a timing chart illustrating a process in the case where serial printing is performed;

FIG. 16 is a flowchart for explaining the operation of a copy management task;

FIG. 18 is a part of a flowchart for explaining the operation of the document input task;

FIG. 19 is a part of a flowchart for explaining the operation of the document input task;

FIG. 22 is a part of a flowchart for explaining the operation of the print task;

FIGS. 38A and 38B are diagrams exemplifying the stored contents of a block management table;

FIG. 39 is a diagram exemplifying stored the contents of the block management table;

FIG. 41 is a diagram showing the image of double-side printing for the first set;

FIG. 42A is a diagram showing the flow of collective double-side processing in group mode;

DETAILED DESCRIPTION OF THE PREFERRED EMBODIMENTS

The present invention will be described below as an embodiment of a composite image forming apparatus which has the functions of a copying machine (PPC), facsimile (FAX) and a printer (PRT).

Figure 1:
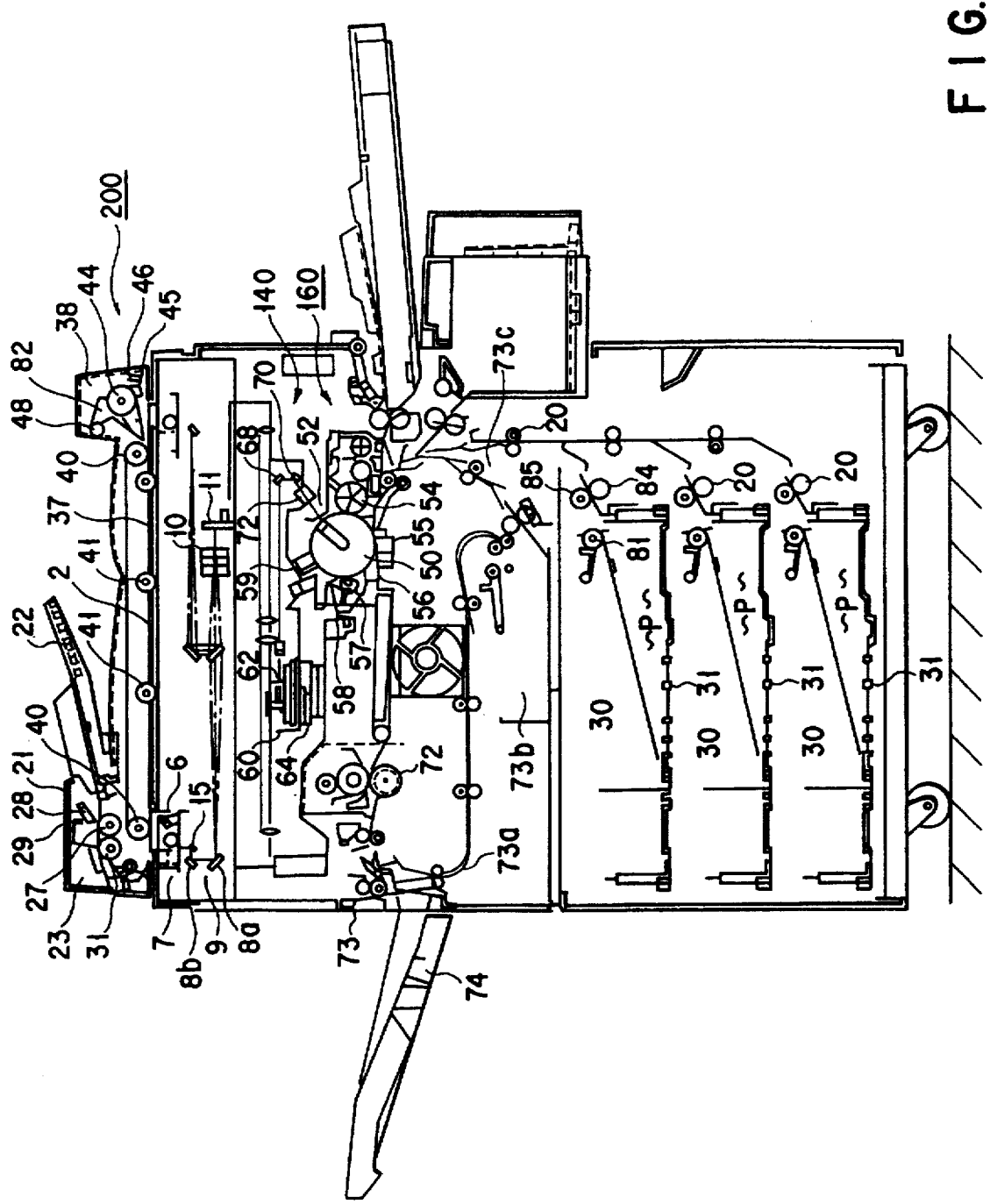
FIG. 1 is a cross-sectional view of a composite image forming apparatus according to one embodiment of this invention.

FIG. 1 schematically shows the general structure of an electronic copying machine as an image forming apparatus embodying this invention. This apparatus comprises a document scanning section 140 and image forming section 160 with an automatic document feeder 200 mounted at the top.

The automatic document feeder 200 has a cover body 21 as a box having the rear edge portion attached to the top rear edge portion of the main body of the apparatus in an openable and closable manner by means of a hinge mechanism, so that the entire automatic document feeder 200 can be turned to set the top of a document table 2 free as needed. Provided at the top and slightly leftward portion of the cover body 21 is a document feed table 22 which can collectively hold a plurality of sheets of a document. Provided at one end side of the apparatus is feeding means 23 for sequentially taking up sheets of a document one after another and feeding the sheet toward one end (left end in the diagram) of the document table 2. The feeding means 23 includes a pickup roller 27 for taking up sheets of a document, a weight plate 28 for pressing a sheet against the pickup roller 27, and an empty sensor 29 as a document sensor for sensing the set status of a document on the document feed table 22. A feed roller 31 is disposed in the document take-up direction of the pickup roller 27 to ensure that sheets of a document are fed sheet by sheet. Stretched on the top surface of the document table 2 is a document conveying belt 37 which covers this top surface. This belt 37 is a wide endless belt which has a white top surface and is put around a pair of belt rollers 40, and it is driven both in the forward and backward directions by a belt driving mechanism (not shown). Provided at the inner surface side of the document conveying belt 37 are a plurality of belt pressing rollers 41 for pressing the belt surface against the document table 2 and a set switch (not shown) for sensing the open/close state of the automatic document feeder. The belt 37 conveys a sheet, fed by the feeding means 23, from one end side (left end side) of the document table 2 to the other end side (right end side). Sheet discharging means 38 is provided on the right side part of the apparatus, and is provided with a feed roller 44, a pinch roller 45 for pressing a sheet against this feed roller 44 and a sheet discharge sensor 46 as document sensing means for detecting the rear end of a sheet fed in the sheet discharging direction. A sheet discharge roller 48 is disposed on the downstream side in the document discharging path. Disposed in the document discharging path is a gate 82 for flipping over a sheet and guiding it to the document table 2 to ensure double-side printing.

The document scanning section 140 comprises an exposure lamp 6 as a light source, a first carriage 7 provided with a mirror 15, a second carriage 9 provided with mirrors 8a and 8b for bending the light path, a lens 10, a photoelectric converting section 11 for receiving reflected light, a driving system (not shown) for altering the positions of those components, and an A/D converting section (not shown) for converting image data output from the photoelectric converting section 11 to digital data. The first and second carriages 7 and 9 are connected by a timing belt (not shown) so that the second carriage 9 moves at a half the speed of the first carriage 7 in the same direction. Accordingly, scanning is executed in such a way that the length of the light path to the lens 10 becomes constant. The lens 10 is moved along the optical path with the fixed focal distance when the magnification changes. The photoelectric converting section 11, which photoelectrically converts the reflected light from a sheet of a document, is essentially constituted of, for example, a CCD type line image sensor. In this case, one pixel of a sheet corresponds to one element of the CCD sensor. The output of the photoelectric converting section 11 is output to the A/D converting section. The first and second carriages 7 and 9 and the mirrors 8a and 8b are moved by a stepping motor (not shown). The first and second carriages 7 and 9 are moved in accordance with the movement of a timing belt (not shown) put around a drive pulley (not shown) coupled to the rotational shaft of the stepping motor and an idle pulley (not shown). The lens 10 has a spiral shaft (not shown) which is rotated by an associated stepping motor (not shown) so that the lens 10 is moved along the optical axis in accordance with the spiral movement.

Reference numeral "60" denotes an electrooptic converting section (semiconductor laser). A collimator lens 62, a polygon mirror 64, a lens 66, reflectors 68 and 70 and a fixing unit 72 are arranged in association with the electrooptic converting section 60 so that a laser beam from an exposure unit 52 is irradiated on a photosensitive drum 50.

The image forming section 160 is a combination of, for example, a laser optical system and an electrophotographic system which can form an image on a transfer sheet. More specifically, the image forming section 160 has the photosensitive drum 50 as an image carrier which is rotatably supported in substantially the center of the apparatus, and further has the exposure unit 52, a developing unit 54, a transfer charger 55, a separation charger 56, a cleaning charger 57, a deelectrification charger 58 and an electrification charger 59 arranged in order around the photosensitive drum 50. The photosensitive drum 50 is evenly charged by the electrification charger 59 so that the laser beam from the document scanning section 140 is irradiated on the photosensitive drum 50 to form the image of a sheet of a document thereon as an electrostatic latent image.

The electrostatic latent image on the photosensitive drum 50 is developed by the developing unit 54 and the developed image is transferred via a resist roller 20 on a copy sheet P, fed from one of sheet feed cassettes 30 as sheet feeding means to be described later, by the transfer charger 55. The copy sheet P after image transfer made by the transfer charger 55 is separated by the separation charger 56 by AC corona charge and is fed via a conveying belt to the fixing unit 72. The copy sheet P whose developed image has been melted and fixed by the fixing unit 72 is discharged on a sheet discharge tray 74 by a pair of sheet discharge rollers. The developer remaining on the photosensitive drum 50 after the image transfer on the copy sheet P and the sheet separation is cleaned by the cleaning charger 57 and the potential on the photosensitive drum 50 is set equal to or lower than a given level by the deelectrification charger 58 to be ready for the next copying operation.

In the case of double-side printing which prints on both sides of a copy sheet P, the copy sheet P whose developed image has been melted and fixed by the fixing unit 72 is conveyed through a conveying path 73a to be placed on a tray 73b of an automatic double-side flip-over mechanism (this tray will be hereinafter called "ADD"). The one-side printed sheet P placed on this tray 73b is conveyed via a conveying path 73c to the aforementioned transfer charger 55 to form a developed image is transferred on the other, unprinted side of the sheet P.

The sheet feed cassettes 30 as sheet feeding means are detachably mounted in multiple stages from the front side of the apparatus body 1 in the up and down direction. Each sheet feed cassette 30 comprises a cassette case 31 as a box where copy sheets P are accommodated and which is designed in such a way that the take-out end portion of the cassette case 31 is inclined in the sheet take-out direction. The copy sheets P retained in the cassette case 31 of each sheet feed cassette 30 is picked up sheet by sheet by a pickup roller 81 from the topmost sheet. The copy sheets P picked up and fed toward the take-out end portion of the cassette case 31 by this pickup roller 81 are separated sheet by sheet by a feed roller 84 and a separate roller (separate pad) 85, located at the upper inside of the take-out end portion of the cassette case 31, and are fed toward the image forming section 160.

Figure 2:
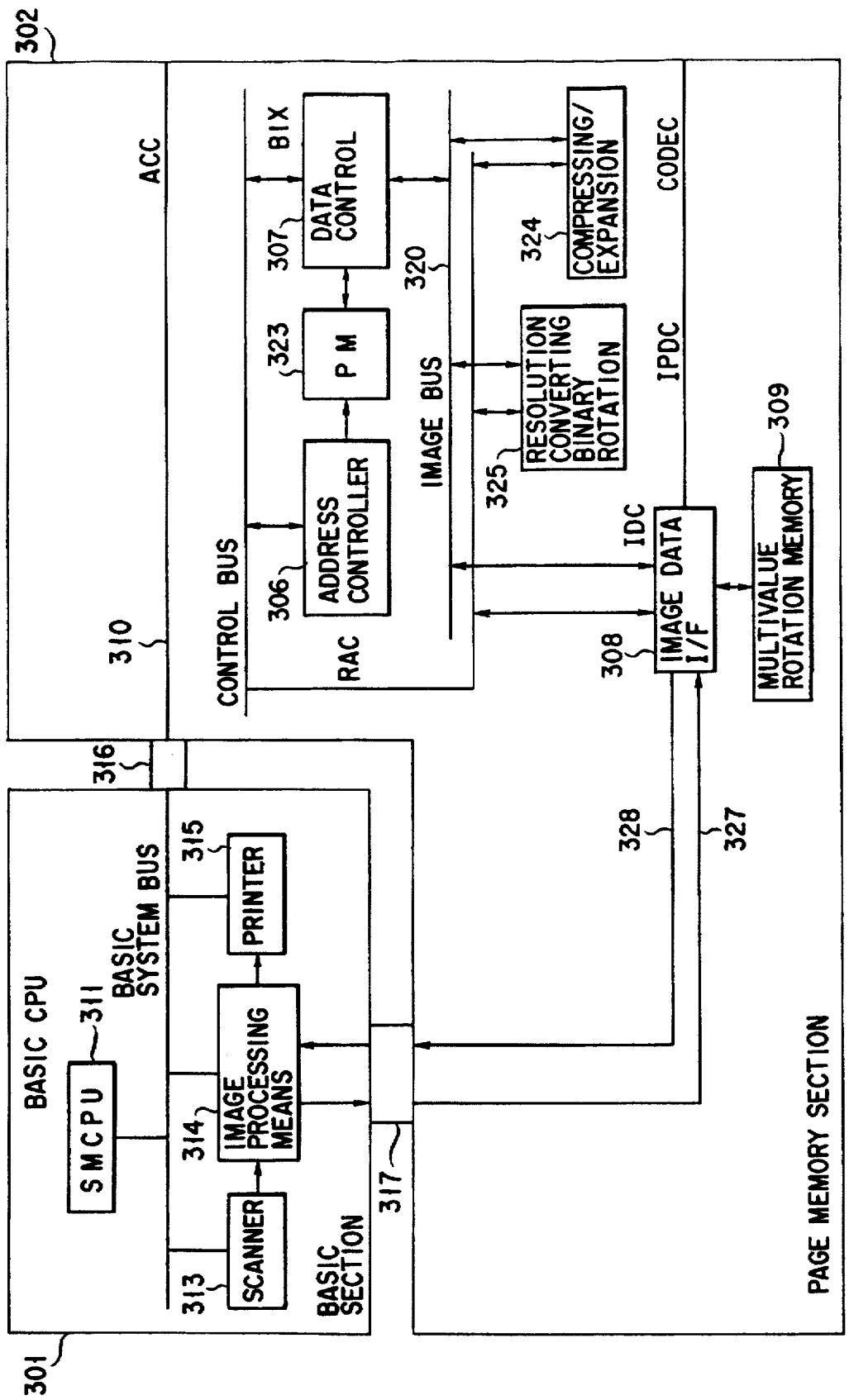
FIG. 2 is a system structural diagram of the composite image forming apparatus.
Figure 3:
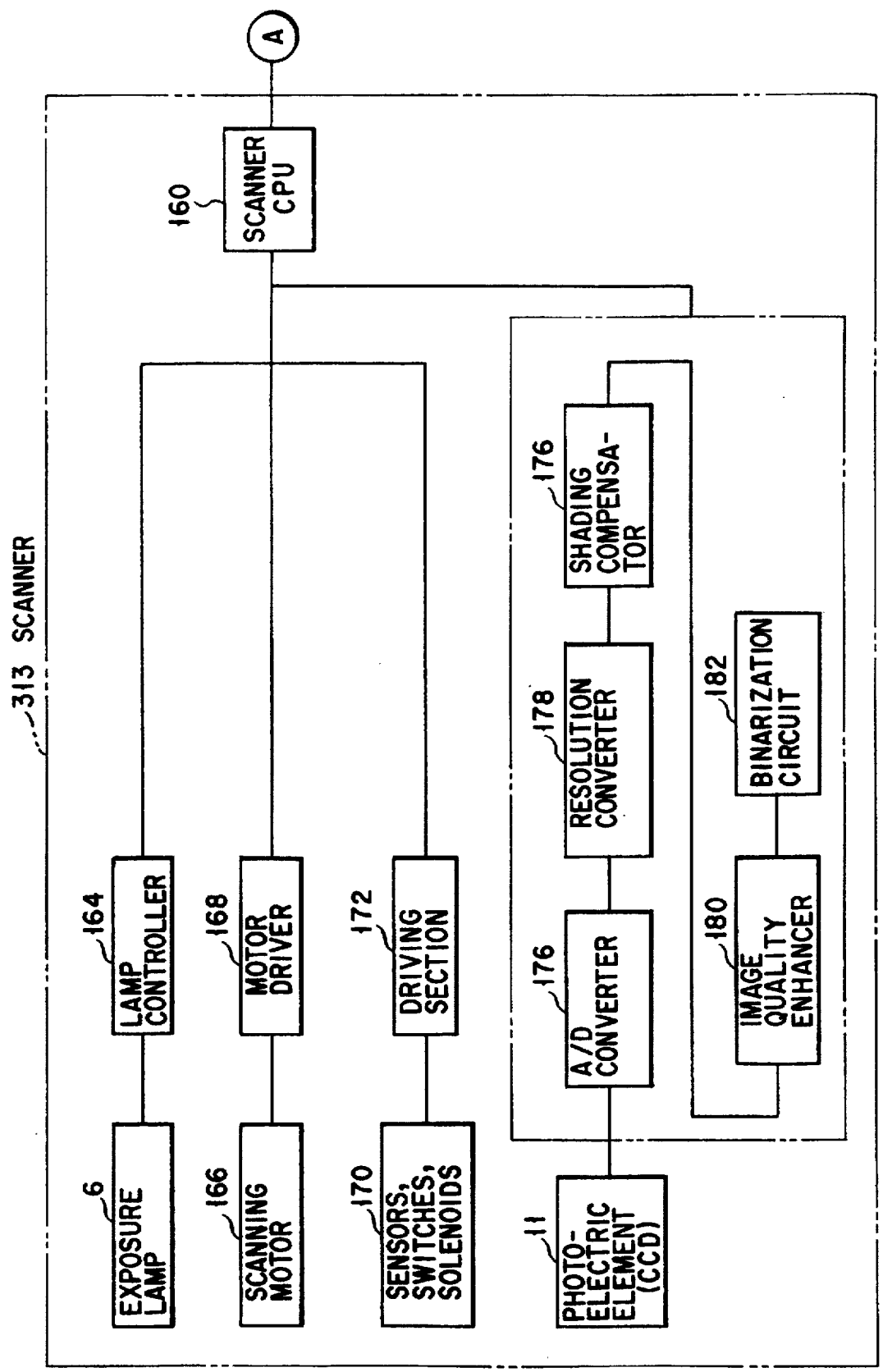
FIG. 3 is a block diagram showing the structure of a scanner section.

A control circuit of the image forming apparatus will now be described with reference to FIGS. 2 through 5. FIG. 2 is a schematic block diagram showing the structure of the image forming and storing apparatus such as a digital copier control system according to one embodiment of this invention. FIG. 3 shows a scanner section, FIG. 4 a CPU section and FIG. 5 a printer section.

The whole digital copier control system comprises two main blocks: a basic section 301 which connects a scanner 313 to a printer 315 by image processing means 314 to thereby constitute a digital copying machine, and a page memory section 302 which stores image data received from this basic section 301 and transfers the stored image data back to the basic section 301 to accomplish memory copying.

The basic section 301 and the page memory section 302 are connected together by a basic section system interface 316, which exchanges control data, and a basic section image interface 317, which exchanges image data.

The basic section 301 comprises input means (scanner) 313, output means (printer) 315, image processing means 314 and control means (basic CPU) 311 which controls those mentioned means.

The control means (basic CPU) 311 has a main CPU 100 to which a ROM 102, RAM 104, image memory 106, timer memory 108, password code memory 110, timer 112, an internal interface 122, an external interface 124, and a printer interface 128 are connected. Connected to the internal interface 122 is an operation panel 114 on which an LCD unit 116, ten keys 118, a job password mode button 120 and so forth are arranged. The printer interface 128 is connected to an external device 138.

The storage, reading and so forth of image information are executed by the main CPU 100. When a password code and image information are to be stored, for example, image information read by the scanner section under the control of a scanner CPU 160 is stored in the image memory 106 by an instruction from the main CPU 100. The instruction from the main CPU 100 is executed according to the mode that is determined by an input operation (key input) through the operation section.

The detailed structure of the scanner section 313 will now be described with reference to FIG. 3. The scanner CPU 160 of the scanner section 313 is connected to a lamp controller 164 for controlling the exposure lamp 6, a motor driver 168 for controlling a scanning motor 166 and a driving section 172 for controlling the driving of sensors, switches and solenoids 170. The scanner CPU 160 is further connected to an A/D converter 176 for performing image processing on image information from the photoelectric element 11, a resolution converter 178, a shading compensator 179, image quality enhancer 180 and a binarization circuit 182 and controls those sections.

Figure 5:
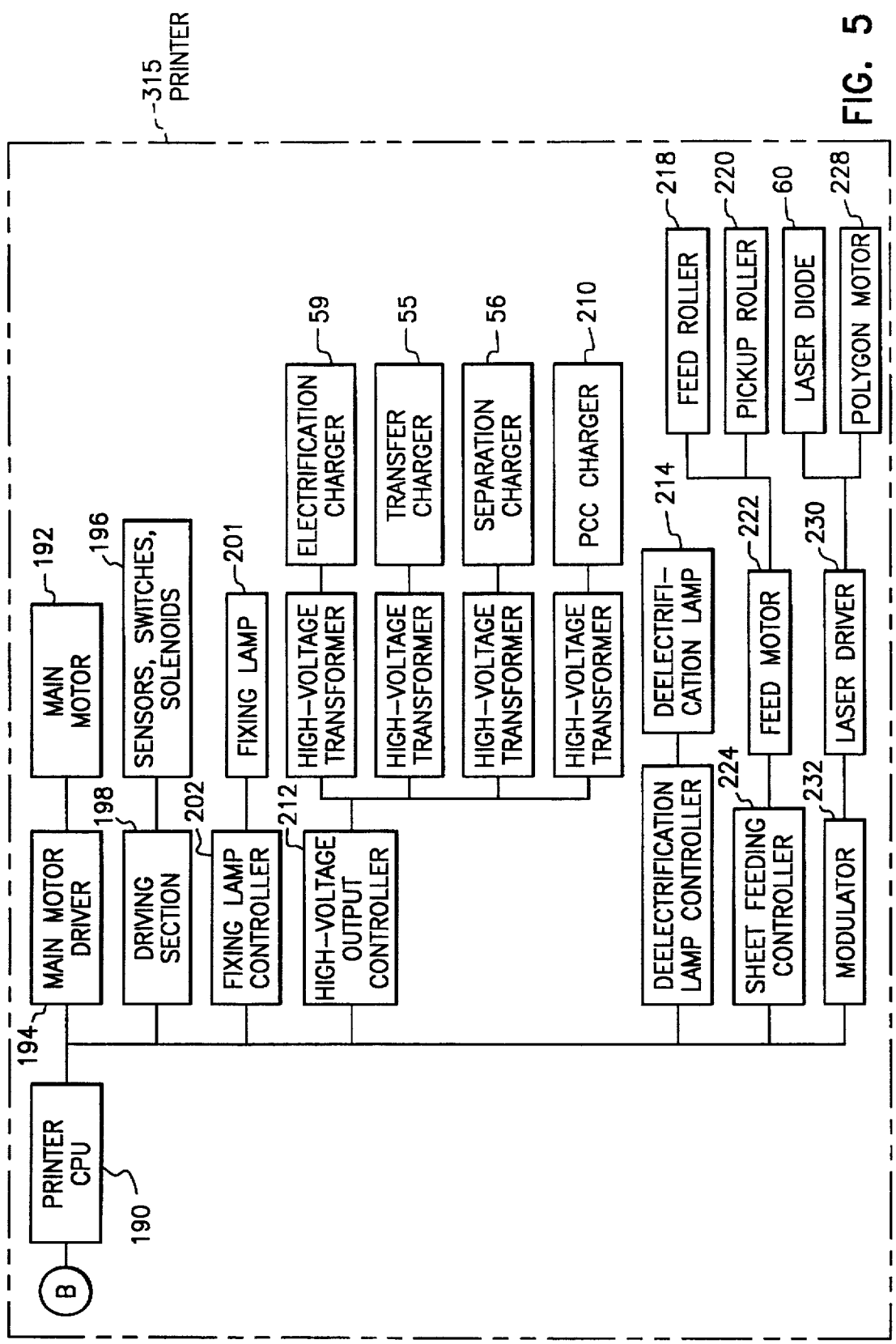
FIG. 5 is a block diagram showing the structure of a printer section.

The printer 315 will now be described in detail with reference to FIG. 5. A printer CPU 190 in the printer 315 is connected to a main motor driver 194 for driving a main motor 192, a driving section 198 for controlling the driving of sensors, switches and solenoids 196, a fixing lamp controller 202 for controlling a fixing lamp 200, a high-voltage output controller 212 for controlling an electrification charger 204, a transfer charger 206, a separation charger 208 and a PCC charger 210, a deelectrification lamp controller 216 for controlling a deelectrification lamp 214, a sheet feeding controller 224 for controlling a sheet feeding motor 222 for a feed roller 218 and a pickup roller 220, and a modulator 323 for controlling a laser driver 230 for the electrooptic converting section (laser diode) 60 and a polygon motor 228, and controls those sections.

The page memory section 302 will be discussed below with reference to FIG. 2. The page memory section 302 comprises storage means (page memory) 323 for temporarily storing image data, an address controller 306 for generating addresses for the page memory 323, an image bus 320 for data transfer among individual devices in the page memory section 302, data control means 307 for controlling data transfer between the page memory 323 and other devices via the image bus 320, image data interface (I/F) means 308 for interfacing the exchange of image data with the basic section 301 via the basic image interface 317, resolution converting/binary rotation means 325 for converting image data received from a device having a different resolution to have the resolution of the printer 315 of the basic section 301 and executing 90-degree rotation of binary image data, compression/expansion means 324 for compressing input image data for devices which transmit or store image data in a compressed form as done in facsimile transmission or storage on an optical disk, and expanding compressed image data into a visible form as is obtained from the printer 315, and a multimode rotation memory 309 which is connected to the image data I/F means 308 and is used to rotate image data 90 degrees clockwise or counterclockwise at the time of outputting the image data.

The operation of the copying machine according to this invention will now be described in detail.

Figures 6, 13:
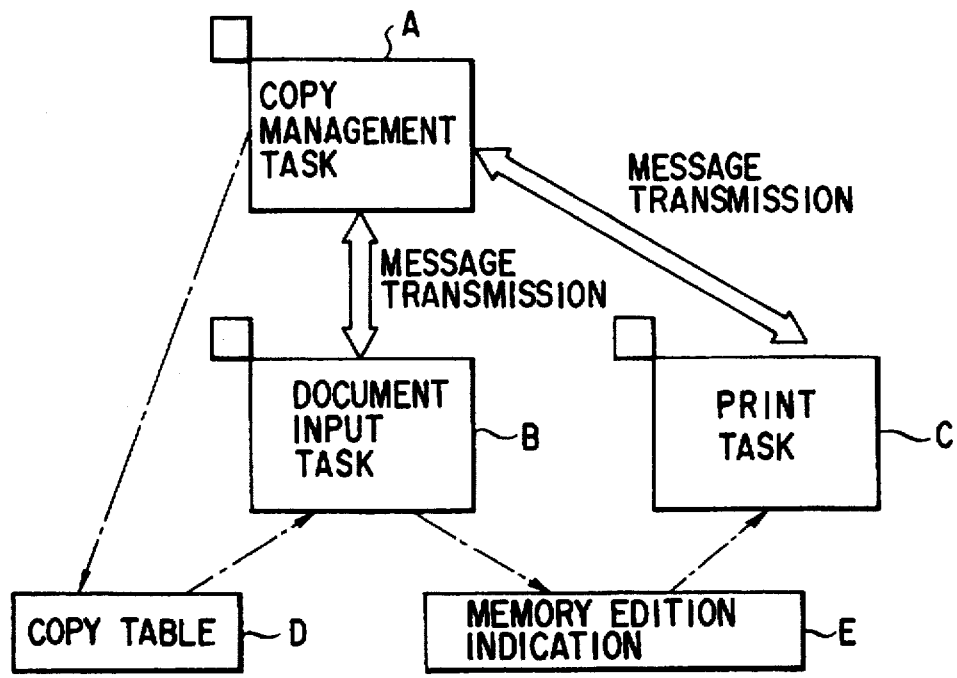
FIG. 6 is a diagram showing the correlation among a copy management task, a document input task and a print task.
FIG. 13 is a diagram showing the format of page-by-page input completion information.

The copying machine according to this invention executes three tasks: a copy management task A, a document input task B and a print task C all shown in FIG. 6. More specifically, the operation of this copying machine is executed basically by performing a copy task after the completion of an input task based on the management of the copy management task.

This invention executes copying of a document according to various modes (normal mode, sort mode or group mode, serial output or normal output, and one-side printing or double-side printing) by performing those three tasks. The normal mode is a mode other than the sort mode and group mode.

Figure 7:
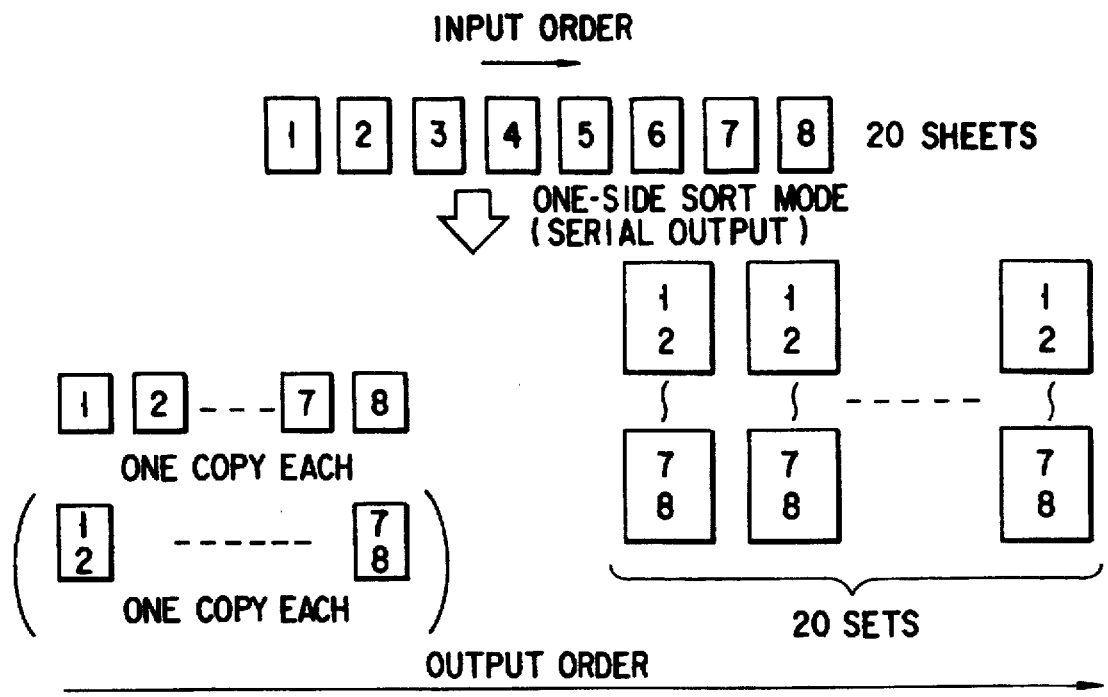
FIG. 7 shows a printing example in the case where serial printing is performed in a one-side sort mode (2 in 1)
Figure 8:
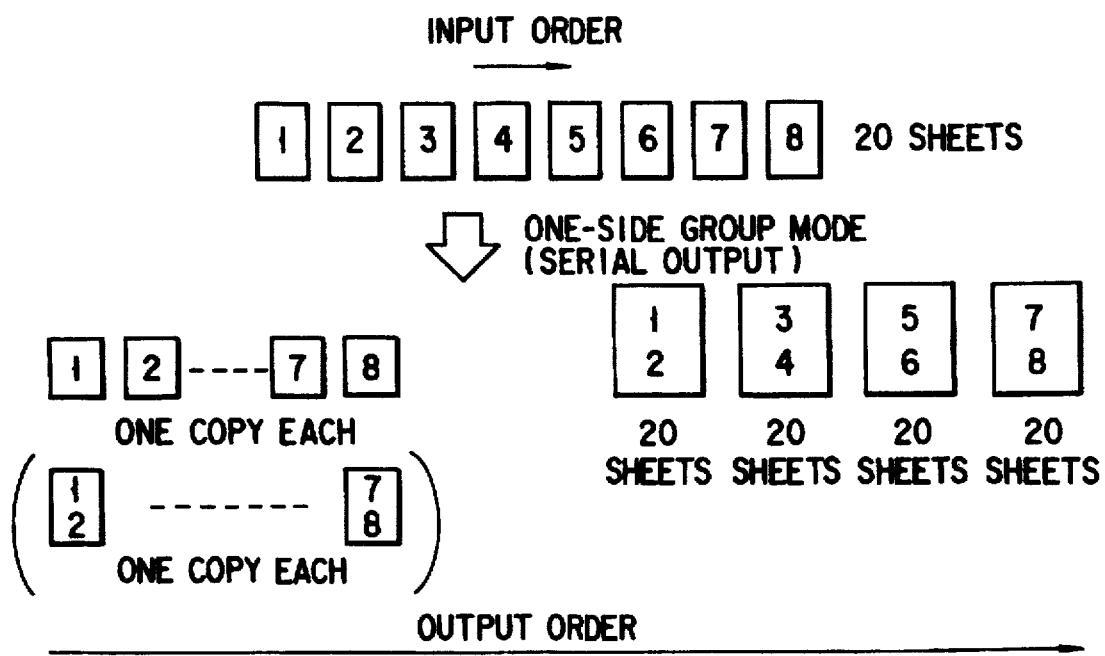
FIG. 8 shows a printing example in the case where serial printing is performed in a one-side group mode (2 in 1)
Figure 9:
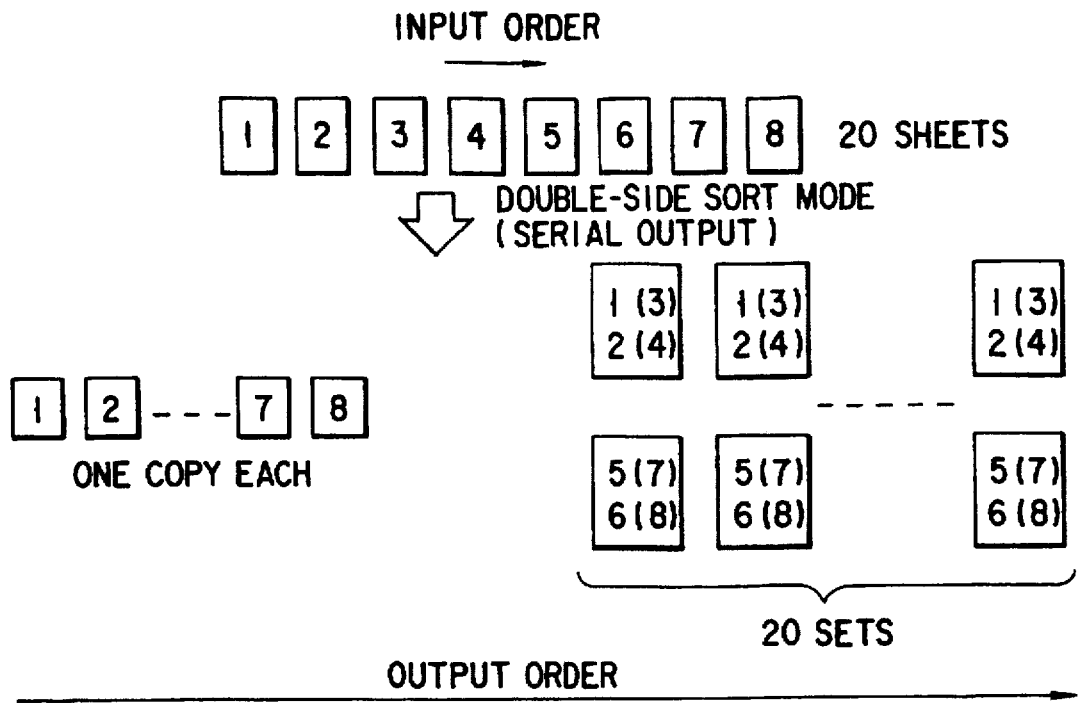
FIG. 9 shows a printing example in the case where serial printing is performed in a double-side sort mode (2 in 1)
Figure 10:
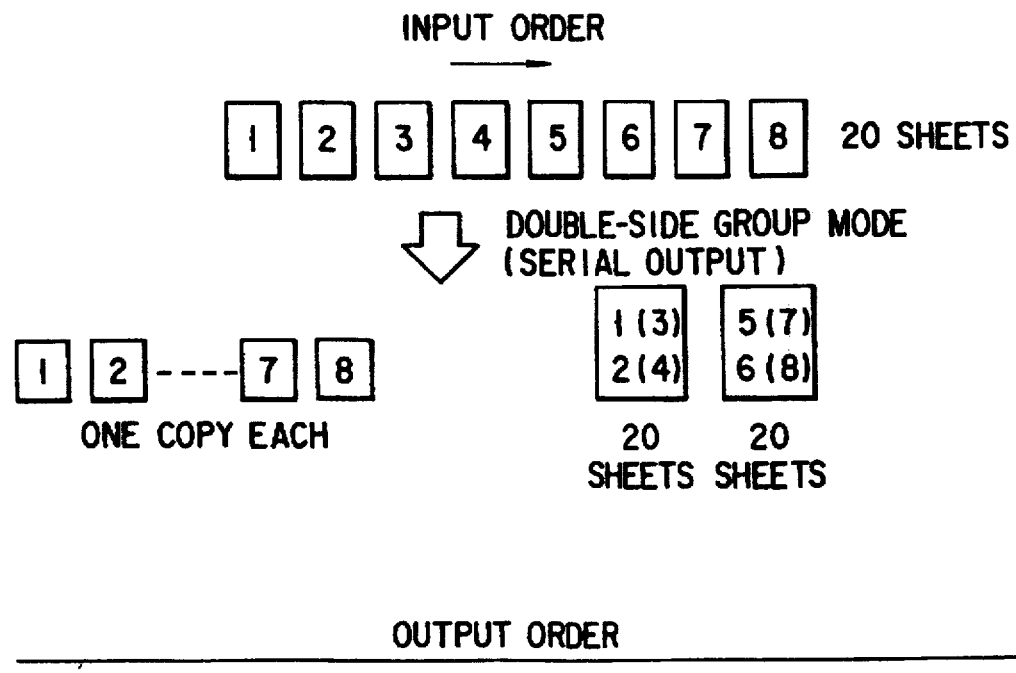
FIG. 10 shows a printing example in the case where serial printing is performed in a double-side group mode (2 in 1)

FIG. 7 shows a printing example in the case where serial printing is performed in a one-side sort mode (2 in 1), FIG. 8 shows a printing example in the case where serial printing is performed in a one-side group mode (2 in 1), FIG. 9 shows a printing example in the case where serial printing is performed in a double-side sort mode (2 in 1), and FIG. 10 shows a printing example in the case where serial printing is performed in a double-side group mode (2 in 1).

The sort mode will now be discussed. When twenty sets of, for example, pages 1 to 8 of a document are to be copied and printed in a sort mode, as shown in FIG. 7, pages 1 to 8 are printed out sheet by sheet first by the serial printing that is one feature of this invention in order to check that image inputting is conducted properly. After this checking, twenty sets are printed out in accordance with the set specification, for example, 2 in 1 or the like (4 in 1 also available). As a result, a total of 20 sets of one document consisting of pages 1 to 8 are provided. This copy mode is therefore convenient, for example, in the case where the same document consisting of eight pages is distributed to twenty people in a meeting or the like. At the time of printing, the printouts for confirmation may be made in one-side 2 in 1 printing in which case the remaining 19 sets should be printed to present a total of twenty sets according to the set specification.

The group mode will now be discussed. When twenty sets of, for example, pages 1 to 8 of a document are to be copied and printed in a group mode, as shown in FIG. 8, pages 1 to 8 are printed out sheet by sheet first by the serial printing that characterizes this invention in order to check that image inputting is conducted properly. After this checking, twenty sets of page 1 are printed out, then twenty sets of page 2 are printed, and so forth for the remaining pages. As a result, 20 sets of printouts are obtained for each of pages 1 to 8. This copy mode is therefore convenient, for example, in the case where each document page is used independently.

When the serial printing that characterizes this invention is executed in the group mode, the first printouts may become the same as the printout for the first set in the sort mode in some case. When sort mode is selected, the contents of printouts made by the serial printing mode that characterizes this invention appear the same.

It is needless to say that in the double-side printing modes in FIGS. 9 and 10, basically, printouts are made in the same way as the one-side printing mode.

In addition to the mentioned modes, there are a stack mode and a cascade mode which are not set on the control panel by an operator but are automatically selected by the number of copies and the number of sheets retainable on the ADD 73b. When a double-side printing mode is selected, normally, the back side of a sheet is printed first and this back-side printed sheet is retained on the ADD 73b and after one-side printing is completed, the back-side printed sheets are discharged so that their top sides are printed. When the number of copies is smaller than the number of sheets retainable on the ADD 73b, the stack mode is selected and the printing is carried out in the above-described procedures. When the number of copies is greater than the number of sheets retainable on the ADD 73b, e.g., when the set number of copies is 30 and only ten sheets are retainable on the ADD 73b, double-side printing cannot be conducted in a single sequence but the sequence of the back-side printing, retaining, discharging and top-side printing should be repeated three times, each for ten sheets. This is called a cascade mode.

Figure 17:
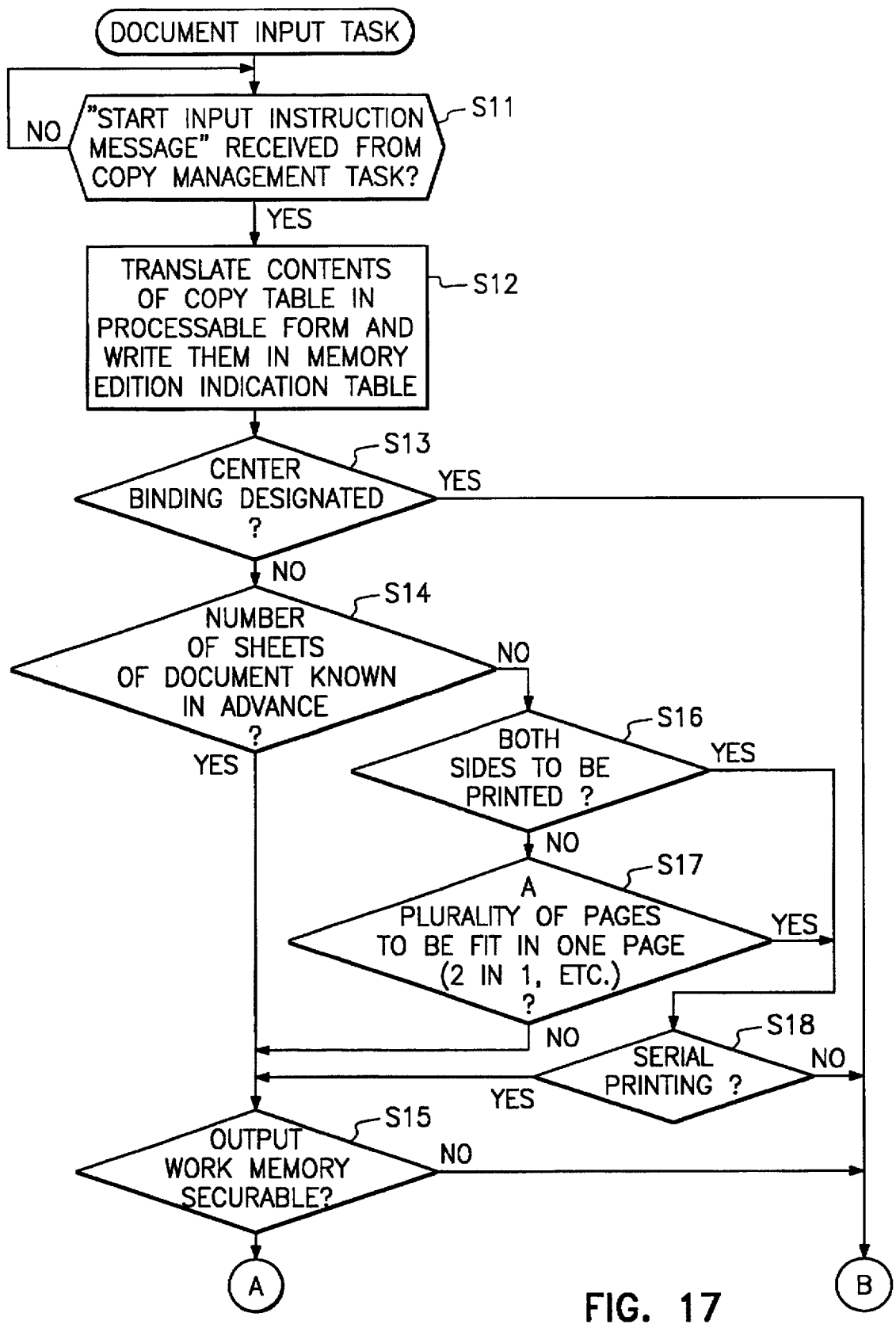
FIG. 17 is a part of a flowchart for explaining the operation of a document input task.
Figure 34:
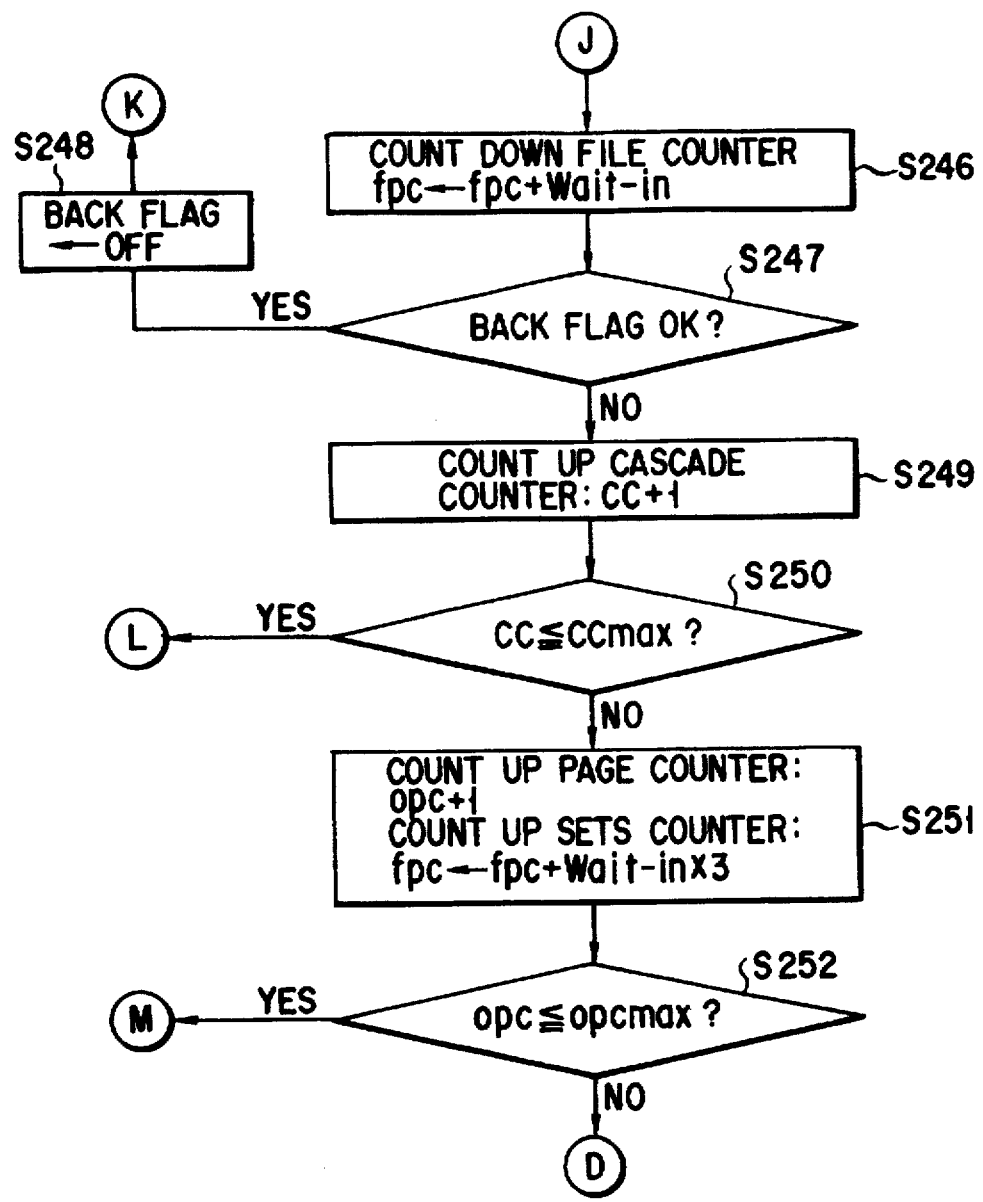
FIG. 34 is a part of a flowchart for explaining the cascade double-side printing in a group mode (after the first set)
Figures 35, 36A, 36B:
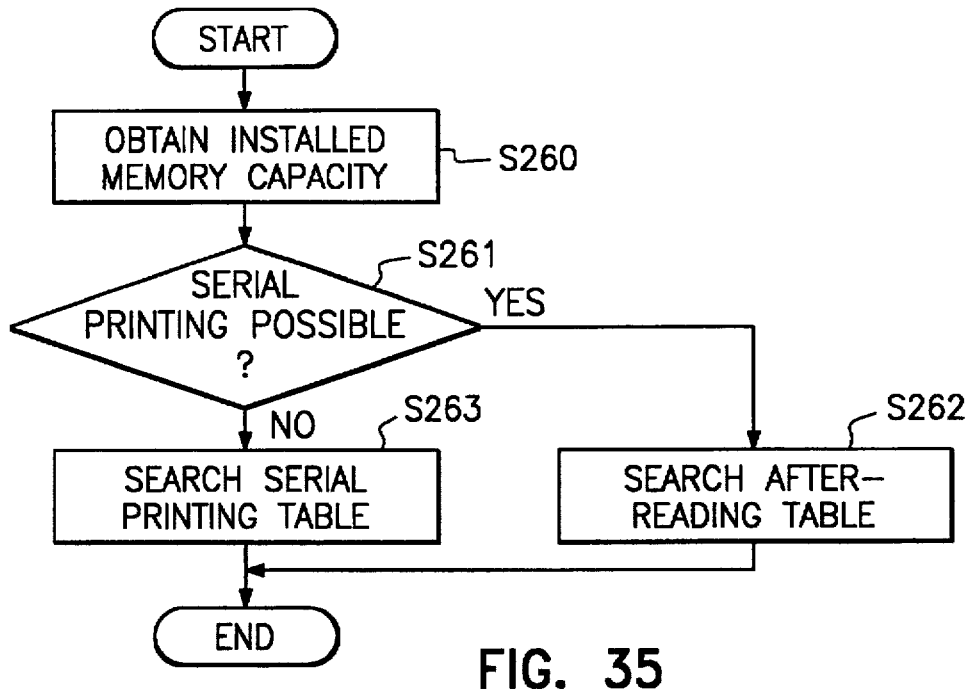
FIG. 35 is a flowchart for explaining how to secure image input and image output buffers in a page buffer M1.
FIG. 36A is diagram showing a table for securing image input and image output buffers for serial printing.
FIG. 36B is diagram showing a table for securing image input and image output buffers for print completion.
Figure 37:
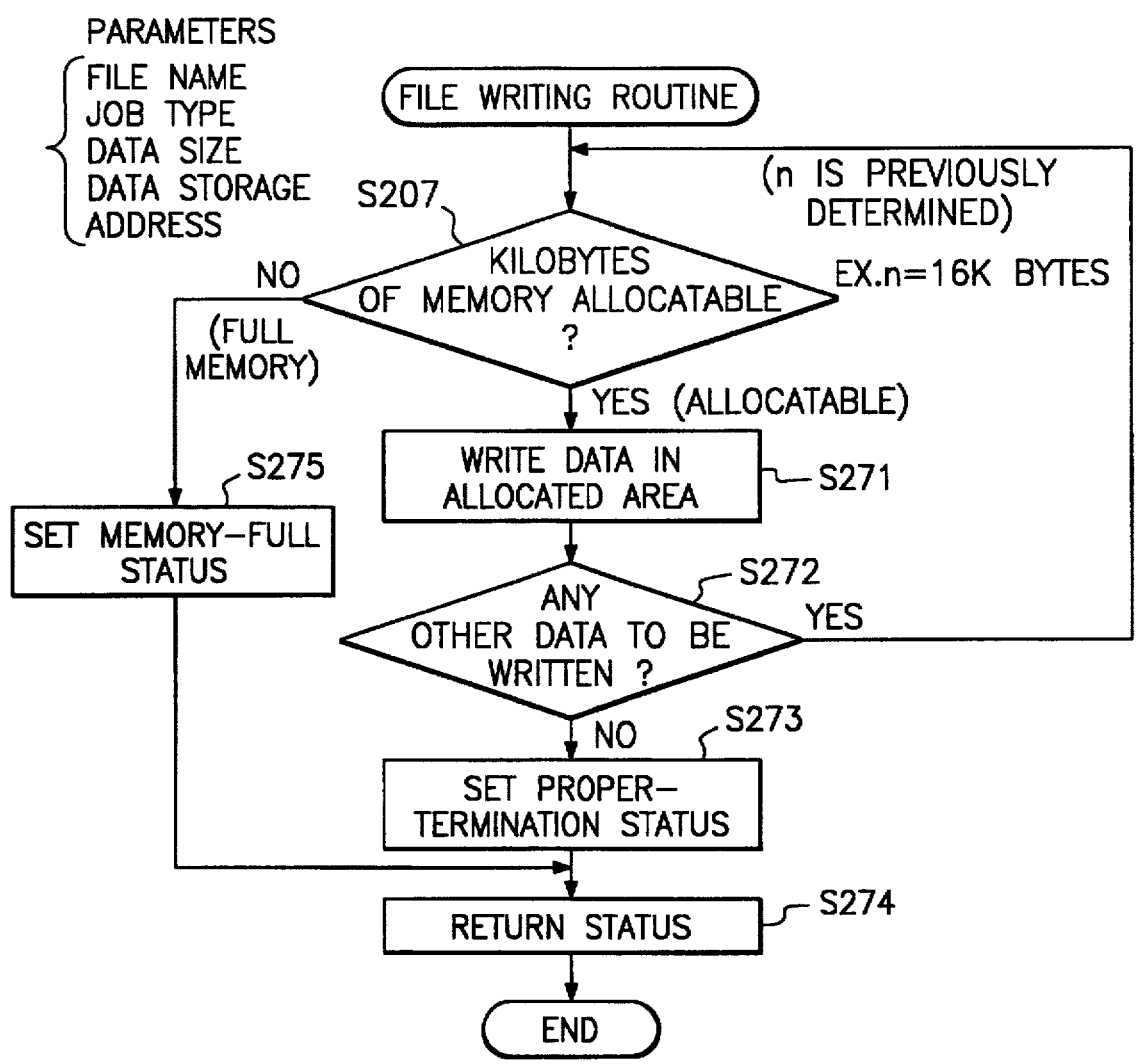
FIG. 37 is a flowchart illustrating a file writing routine.
Figure 40:
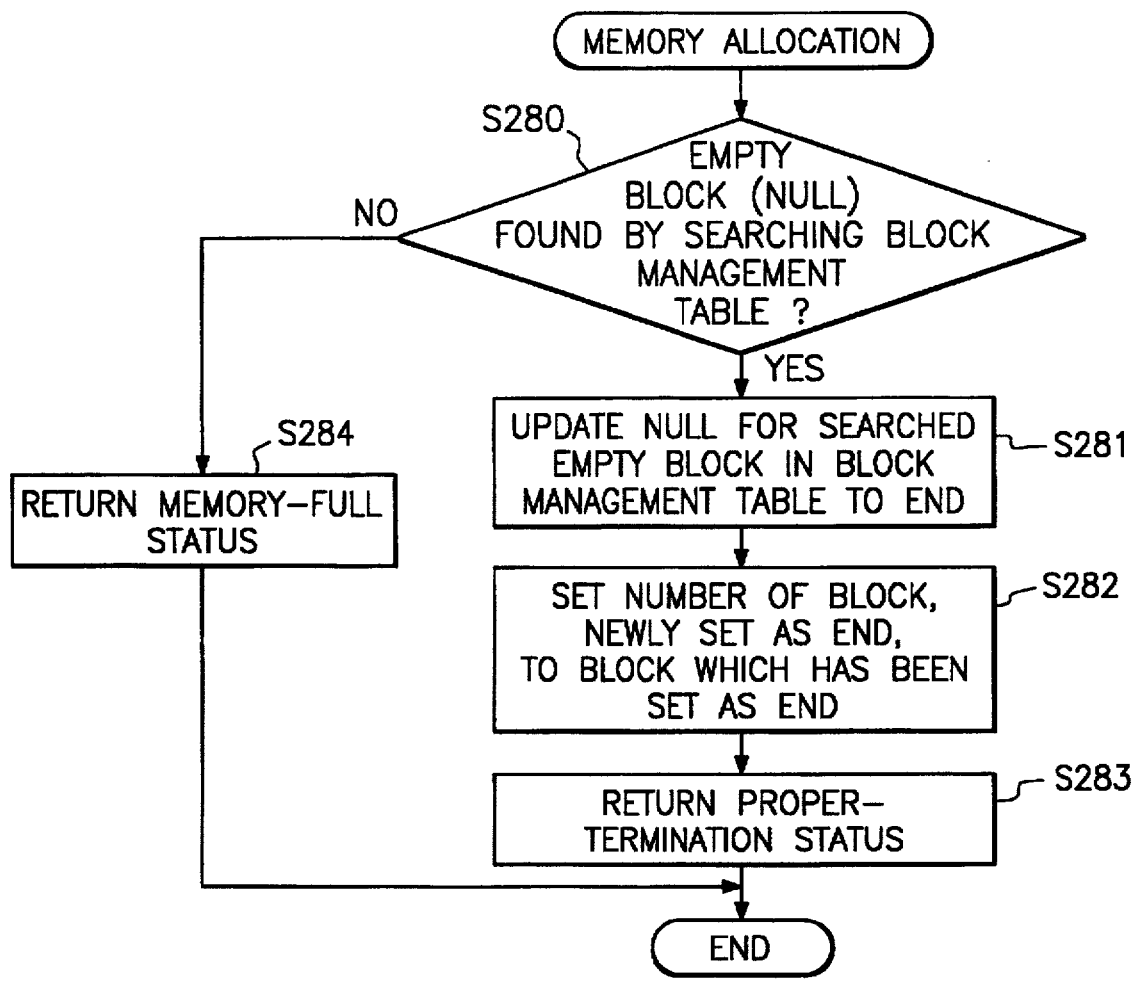
FIG. 40 is a flowchart illustrating a memory allocating routine.

Stored in the ROM 102 in the basic CPU 311 are a control program which executes the copy management task A illustrated in the flowchart in FIG. 16, a control program which executes the document input task B illustrated in the flowcharts in FIGS. 17 to 19, a control program which executes the print task C illustrated in the flowcharts in FIGS. 21 to 34 and a control program which executes the file writing routine illustrated in the flowcharts in FIGS. 35, 37 and 40.

Communication is made by a message transmission as shown in FIG. 6 between the copy management task A and the document input task B, and between the copy management task A and the print task C.

What is specified through the control panel (not shown), such as the number of copies, document size, magnification, binding margin direction, binding margin width, sheet type and/or one-side reduced coupling enabled or disabled, is input in the copy management task A.

The RAM 104 in the basic CPU 311 has a copy table D and an memory edition indication table E.

What is specified through the aforementioned operation section 114 is written in the copy table D.

Specifications concerning memory copy (printout order (group or sort), the number of printouts, file number, resolution, the number of input pages, double-side printing/ one-side printing and page-by-page input completion information) are set in the memory edition indication table E.

The page-by-page input completion information stored in this memory edition indication table E has the format as shown in FIG. 13. This page-by-page input completion information is so set that every time one page of a document is input, the input flag for that page is set to a "completed" flag and when this page is printed, the output flag of that page is set to a "completed" flag.

Figures 14, 15:
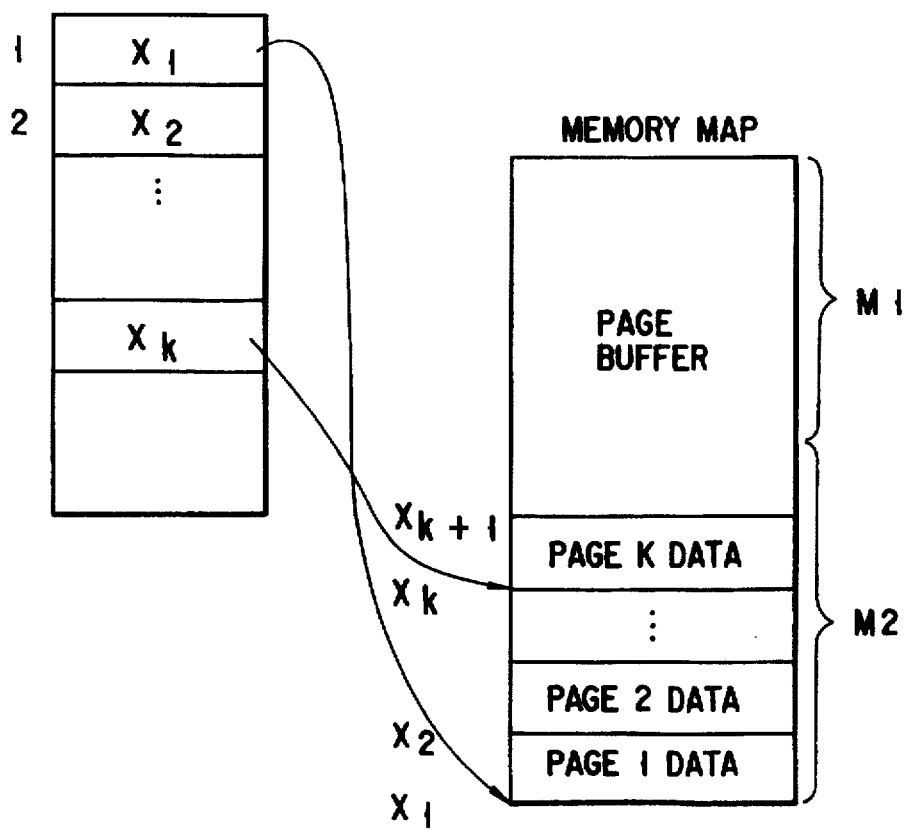
FIG. 14 is a diagram showing a table in which the status of an input task (document reading process) and an output task (printing process) is set in association with job numbers.
FIG. 15 is a diagram showing the relationship between a page buffer area M1 and a file area M2 of a page memory.

The RAM 104 in the basic CPU 311 also has a table in which the status of an input task (document reading process) and an output task (printing process) is set in association with each job number as shown in FIG. 14. A single copying operation is a single job; for example, an operation for double-side copying of ten sheets of a document is a single job or an operation for sorting five sheets of a document and making one-side copying for ten sets each is also a single job.

As shown in FIG. 15, the page memory 323 is separated to a page memory area M1 where image data of a document scanned by the scanner section 313 is written, and a file area M2 segmented page by page where compressed image data is written.

The head address of each page of the file area M2 is stored in a file area page-by-page data head address storage area M3.

Figure 11:
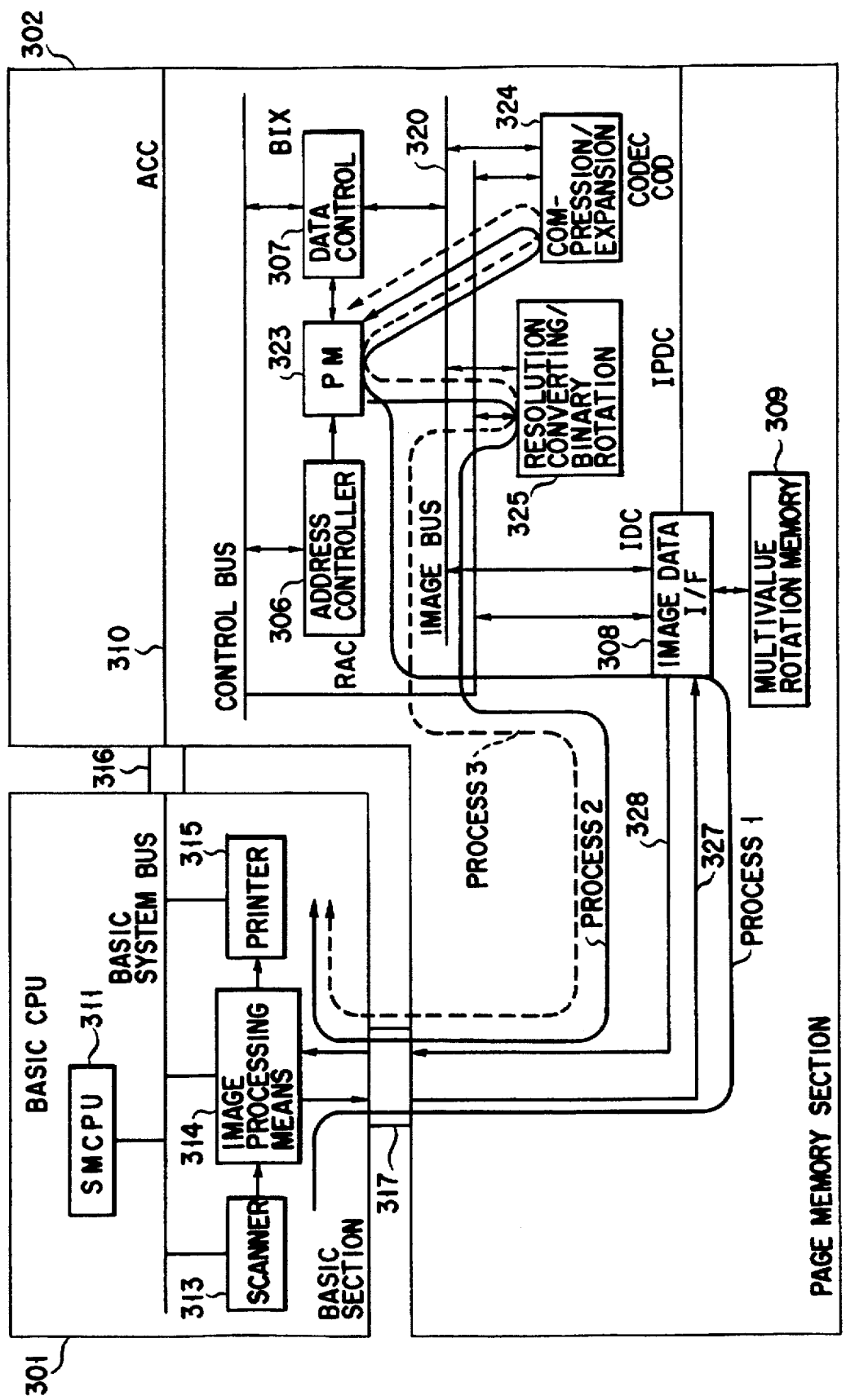
FIG. 11 is a diagram showing an image data processing path in the case where serial printing is performed.

FIG. 11 shows an image data processing path in the case where the serial printing of this invention is performed, and FIG. 12 presents a timing chart illustrating a process in the case where the serial printing of this invention is performed. The procedures of the serial printing of this invention will be schematically described with reference to FIGS. 11 and 12 (the details will be given later with reference to the associated flowcharts).

In FIGS. 11 and 12, the processing executed by this image forming apparatus is separated to three main processes: the process 1 is a document input process, the process 2 is the serial printing that characterizes this invention, and the process 3 is the normal sort printing. In the process 1, a document is read (351) by an ADF (Automatic Document Feeder), the image information is scanned (352) by the scanner 313, and this image information is subjected to compression (353) after which the compressed image information is stored in the page memory (PM) 323. This sequence of procedures is repeated for all the sheets of the document. In the process 2, after it is determined that a single sheet of a document has been read and compressed in the process 1, uncompressed document image information in the page memory 323 is serially printed (358). The timing is such that every time a sheet of a document is read into the page memory 323, the image of a single sheet is printed as illustrated in FIG. 12. Through the execution of such serial printing, even when sort printing is selected, for example, it is possible to check at the time of reading a document whether the reading of a mid-part of the document is properly conducted, thereby avoiding an undesirable situation whereby an operator discovers improper document printing starts. The serial printing process 2 thereby ensures proper document reading and printing.

When this document reading and checking through the serial printing process 2 is completed, the sort printing process 3 is executed. This sort printing process 3 is basically not different from the normal printing. The expansion (360 or 362) of image information in the page memory 323 is executed after which the expanded image information is printed (361 or 363). In the case of a so-called "2 in 1" which prints two document images on a copy sheet, after two expansions (364 and 365 or 367 and 368), the expanded image information is printed (366 or 369) for each document information until the whole printing is completed.

The operations for the copy management task and document input task will now be described with reference to FIGS. 16 to 19.

Referring to FIG. 16, when an operator instructs the memory copy and presses the start key on the operation section 114, information to that effect is transmitted to the basic CPU 301. In the copy management task A, it is determined if the start key has been depressed (S1).

When the decision is "YES" in this step S1, what has been instructed by the operator through the operation section 114 is written in the copy table D (S2).

In this manner, the number of copies, document size, magnification, binding margin direction, binding margin width, sheet type, one-side reduced coupling enabled or disabled, etc. are stored in the copy table D.

Next, a "START INPUT message" is transmitted to the document input task B (S3).

When the "START INPUT message" is sent to the document input task B, the operation of this task B as shown in FIG. 17 starts.

Referring to FIG. 17, it is determined if the "START INPUT message" has been received from the copy management task A (S11).

When the decision is "YES" in this step S11, the contents of the copy table D are translated in the form that is easily processed and are then written in the memory edition indication table E (S12).

Referring to the memory edition indication table E, it is determined if a center binding has been designated (S13). When the decision is "NO" in this step S13, it is determined if the number of sheets of a document is known in advance (S14).

Figure 20:
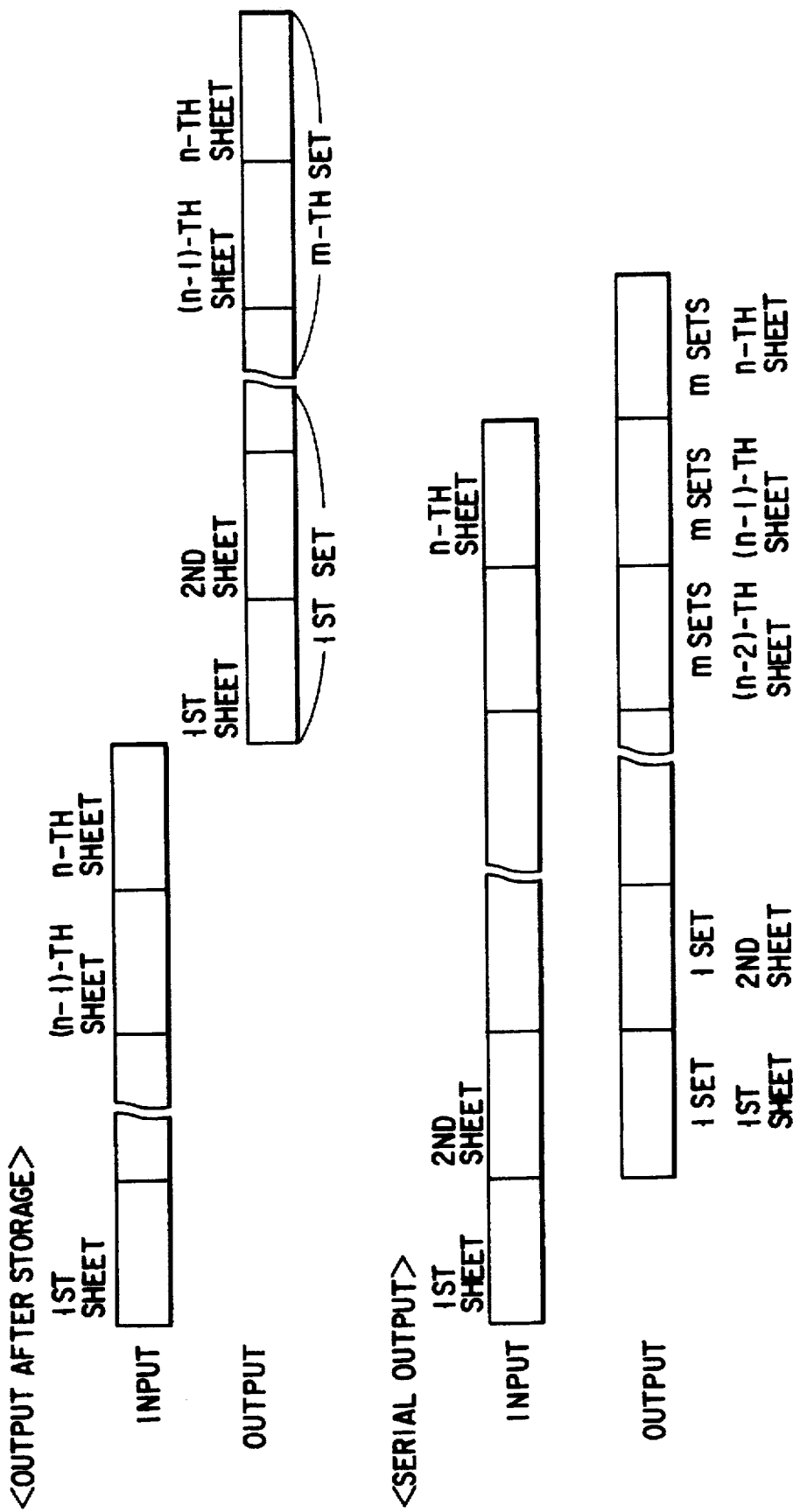
FIG. 20 is a diagram showing the input and output relationship of printing after storage and serial printing.

When the number of sheets of a document has been set through the control panel (not shown) at the time the document is input, the decision in step S14 is "YES" after which it is determined if the memory for the output work can be secured (S15). When the decision is "YES" in this step S15, serial printing is performed through the flowchart in FIG. 18. This serial printing is such that when m copies of n sheets of a document are to be made, one copy of n sheets is printed first as shown in FIG. 20. In this process, a "START OUTPUT instruction message" is transmitted to the copy management task A (S21) as shown in FIG. 18.

Then, one sheet of the document is input and its data is written in the page memory 323 (S22). It is then determined if every sheet of the document has been input (S23) and the process in step S22 continues while the decision is "NO" in this step S23.

When the decision is "YES" in the step S23, an "INPUT COMPLETED message" is sent to the copy management task A (S34).

When the decision is "YES" in the aforementioned step S13, it is determined that every sheet should be memorized and printed out, and the process illustrated in the flowchart in FIG. 19 is executed so that document input for the "printing after storage of every sheet." The "printing after storage of every sheet" means a process for making m copies after n sheets of a document have all been input as shown in FIG. 20. This processing causes all the sheets of the document, input by the scanner section 313, to be stored in the page memory 323 (S31) as shown in FIG. 19.

After every sheet is input, a process of sending the "START OUTPUT instruction message" and "INPUT COMPLETED message" to the copy management task A is executed.

Returning to FIG. 17, when the decision is "NO" in step S14, it is determined whether or not double-side printing has been specified (S16).

When the decision is "NO" in this step S15, it is determined if a so-called X in 1 (X being "2" or "4," for example) which sets a plurality of pages in one page has been specified (S17). When the decision is "NO" in this step S17, the flow returns to the decision in the aforementioned step S15. When the decision is "YES" in this step S15, the serial printing process shown in FIG. 18 is executed.

When the decision is "YES" in step S16 or "YES" in step S17, it is determined if quick printing is desired regardless of whether or not any inconvenience occurs (S18).

When the decision is "YES" in this step S18, the flow returns to the decision in step S15. When the decision is "YES" in this step S15, the serial printing process is executed.

When the decision is "NO" in step S18, the flowchart in FIG. 19 is executed to perform the "printing after storage" process.

As is apparent from the above, steps S13 to S18 in FIG. 17 constitute determining means for determining whether serial printing or printing after storage is to be performed.

That is, this determining means automatically selects the serial printing or the printing after storage in accordance with the contents of the memory edition indication table.

When the "START OUTPUT instruction message" is sent to the copy management task A from the document input task B, which has been explained with reference to FIGS. 17 to 19, the decision is "YES" in step S4 in the flowchart in FIG. 16 where it is determined if the "START OUTPUT instruction message" from the document input task B has been received, and a "START OUTPUT message" is transmitted to the print task C (S5).

The processing of the print task will now be described with reference to FIGS. 21 to 34.

First, it is determined whether or not the "START OUTPUT message" from the copy management task A has been received (S41).

When the decision is "YES" in this step S41, the memory edition indication table E shown in FIG. 6 is referenced to determine the enabling or disabling of the sort mode and memory edition (S43).

Based on the result of the decision in step S43, whether or not to execute double-side printing is determined (S44).

When the decision is "NO" in this step S44 or when one-side printing is to be performed, it is determined if making every copy has been specified through the operation section 114 (S45).

When the decision is "NO" in this step S45, it is determined if "the first set" is to be copied (S46).

When the decision is "YES" in this step S46, one-side printing of the fist set is executed in sort mode (S47). The process in the step S47 will be discussed later with reference to FIG. 24.

When the decision is "YES" in step S45 or the decision is "NO" in step S46, one-side printing of all the sets is executed in group mode (S48). This process will be discussed later with reference to FIG. 26.

Even when "one-side printing" is determined in step S44, one-side printing of all the sets is executed in group mode in step S48 as long as copying all the sets has been specified through the control panel (not shown).

When copies are checked after the completion of one-side printing in sort mode (first set) in step S47 and it is found that, for example, page y should be reread, the operator should depress keys for "erase page y."

In consideration of such a case, a step of determining if the keys on the operation section 114 for "erase page y" have been depressed (S49) is provided after the step S47 of executing one-side printing in sort mode (first set).

When the decision is "YES" in this step S49, data on page y is erased from the page memory 323 shown in FIG. 15 (S50).

Then, page y is reread and the processing associated with this page will be performed (S51).

Figure 23:
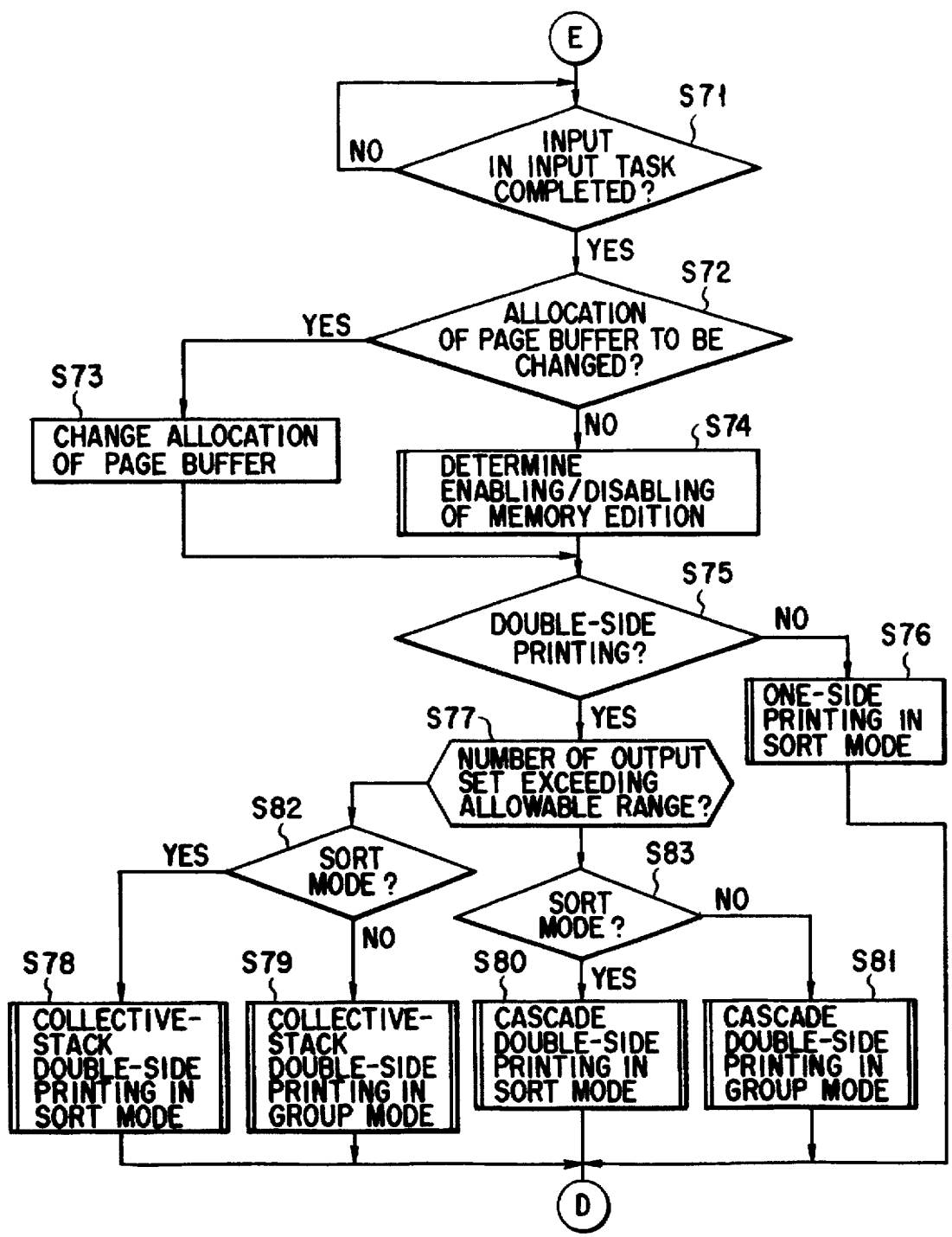
FIG. 23 is a part of a flowchart for explaining the operation of the print task.

When the decision is "NO" in step S49, on the other hand, the operation enters the flowchart in FIG. 23 and printing of page 2 and the subsequent pages will be performed. The detailed description of this flowchart in FIG. 23 will be given later.

When the decision is "YES" in step S44, i.e., when double-side printing is determined, it is determined whether or not making all copies has been specified through the control panel (not shown) (S52).

When the decision is "NO" in this step S52, it is determined if the copy is for "the first set" (S53).

When the decision is "YES" in this step S53, double-side printing of the first set in both the sort mode and group mode is executed (S54). The process in this step S54 will be discussed later with reference to FIG. 28.

When the decision is "YES" in step S52 or the decision is "NO" in step S43, double-side printing of all the sets in group mode is executed (S55). This process will be discussed later with reference to FIG. 27.

Even when "double-side printing" is determined in step S44, double-side printing of all the sets is executed in group mode in step S55 as long as copying all the sets has been specified through the operation section 114.

When copies are checked after the completion of double-side printing in group mode (first set) in step S54 and it is found that, for example, page y should be reread, the operator should depress keys for "erase page y."

In consideration of such a case, a step of determining if the keys on the operation section 114 for "erase page y" have been depressed (S56) is provided after the step S54 of executing double-side printing in sort mode (first set).

When the decision is "YES" in this step S56, data on page y is erased from the page memory 323 shown in FIG. 15 (S50).

Then, page y is reread and the processing associated with this page will be performed (S58).

When the decision is "NO" in step S56, on the other hand, the operation proceeds to the flowchart in FIG. 23 and printing of page 2 and the subsequent pages will be performed. The detailed description of this flowchart in FIG. 23 will be given later.

After the aforementioned one-side printing in group mode (all the sets) in the step S48 is completed or after the aforementioned double-side printing in group mode (all the sets) in the step S55 is completed, a process of freeing the whole file buffer which has been used for printing is performed (S59).

Then, a process of releasing the resources which have been used exclusively for printing is performed (S60).

When the decision is "NO" in step S49 or step S56, the operation proceeds to the flowchart in FIG. 23 and printing of the second set and the subsequent sets will be performed.

In FIG. 23, first, the table in FIG. 14 is searched to determine if the input is completed for the input task (S71).

While the decision in step S71 is "NO," the execution of the subsequent processing is held until the input task has the input-completed status.

When the decision is "YES" in step S71, it is determined if page buffer allocation should be changed (S72).

When the decision is "YES" in this step S72, a process of changing the page buffer allocation is performed (S73).

When the decision is "NO" in step S72 or the process in step S73 is completed, whether or not to perform memory edition is determined by referring to the memory edition indication table E (S74).

It is then determined if double-side printing is specified in the memory edition indication table E (S75).

When the decision is "NO" in this step S75, a process for one-side printing of the second set in sort mode is performed (S76). This one-side printing process will be discussed later with reference to FIG. 25.

When the decision is "YES" in step S75, it is determined if the number of printouts exceeds the allowable range of the ADD 73b (S77).

When the decision is "NO" in this step S77, a process for collective-stack double-side printing in sort mode is performed (S78) or a process for collective-stack double-side printing in group mode is performed (S79).

Figure 29:
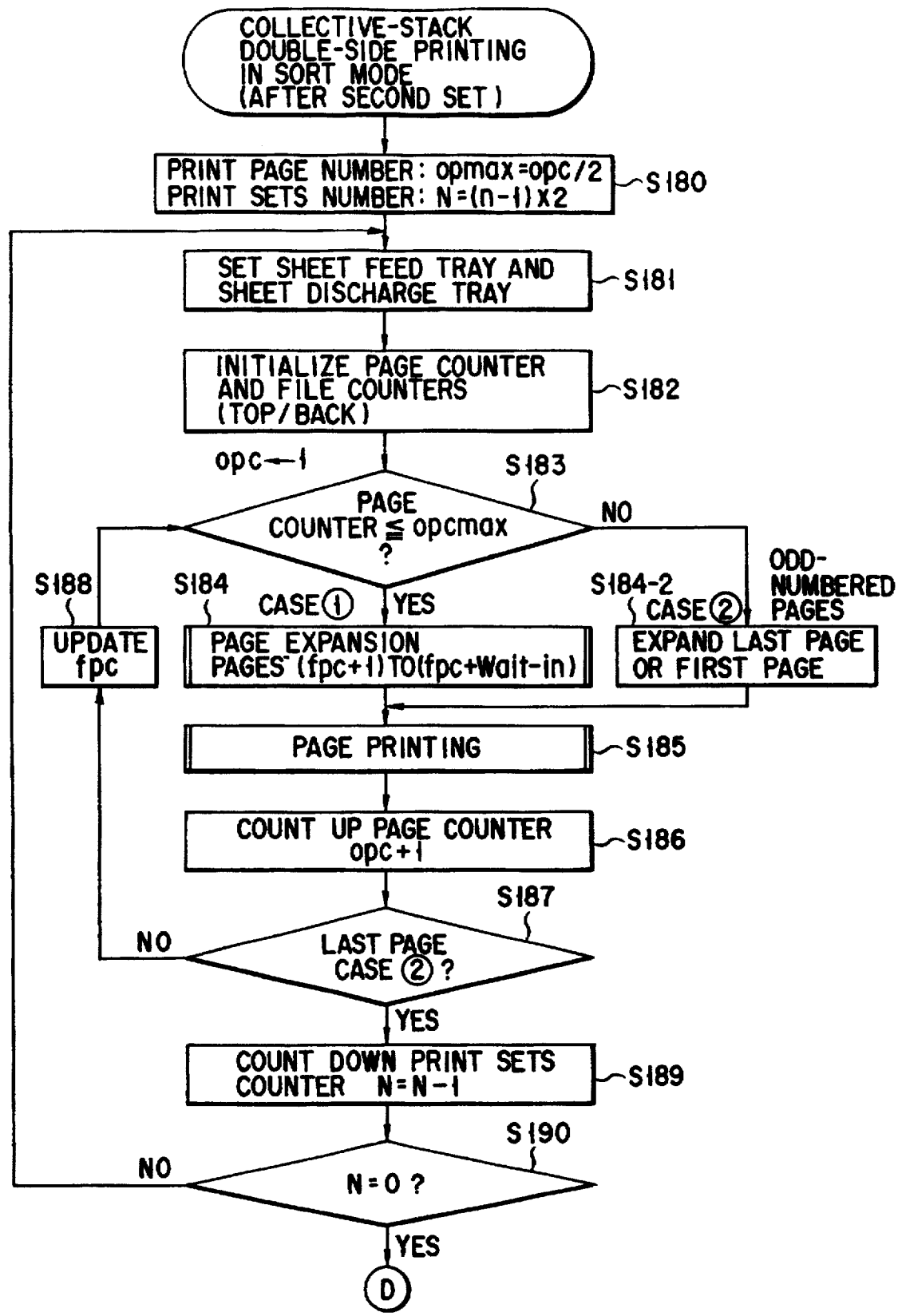
FIG. 29 is a flowchart for explaining collective-stack double-side printing in a sort mode (after the first set)

The process in the step S78 will be discussed later with reference to FIG. 29. The process in the step S79 will be discussed later with reference to FIG. 30.

When the decision is "YES" in step S77, a process for cascade double-side printing in sort mode is performed (S80) or a process for cascade double-side printing in group mode is performed (S81).

The process in the step S80 will be discussed later with reference to the flowcharts in FIGS. 31 and 32. The process in the step S81 will be discussed later with reference to the flowcharts in FIGS. 33 and 34.

As is apparent from the above, one-side printing of the second and subsequent sets in sort mode (S76), collective-stack double-side printing in sort mode (S78), collective-stack double-side printing in group mode (S79), cascade double-side printing in sort mode (S80) and cascade double-side printing in group mode (S81) are executed in the processing in the flowchart in FIG. 23.

After those processes, the sequence of processes starting with step S59 in the flowchart in FIG. 22 is performed, as already discussed above.

Figure 21:
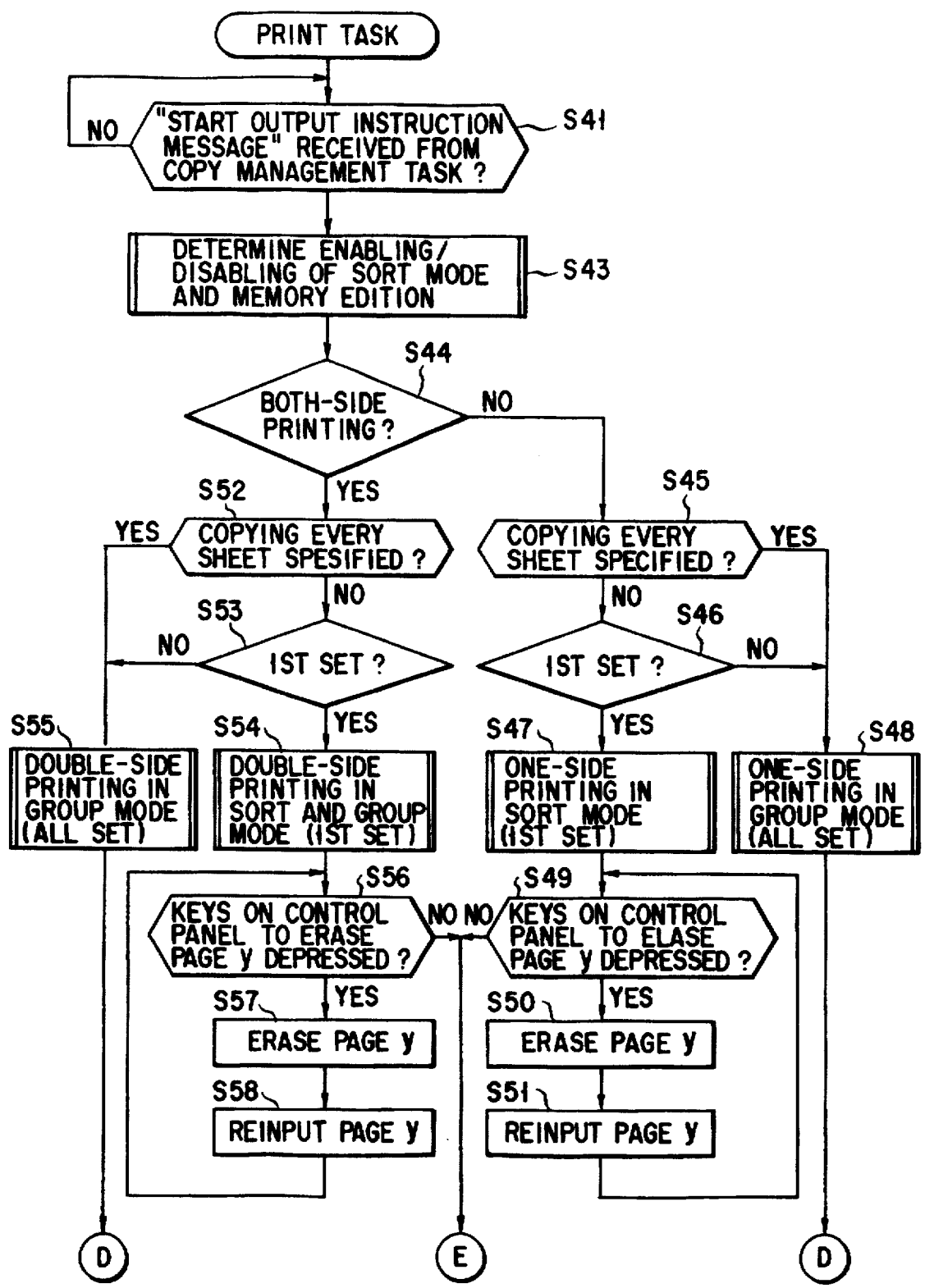
FIG. 21 is a part of a flowchart for explaining the operation of a print task.
Figure 24:
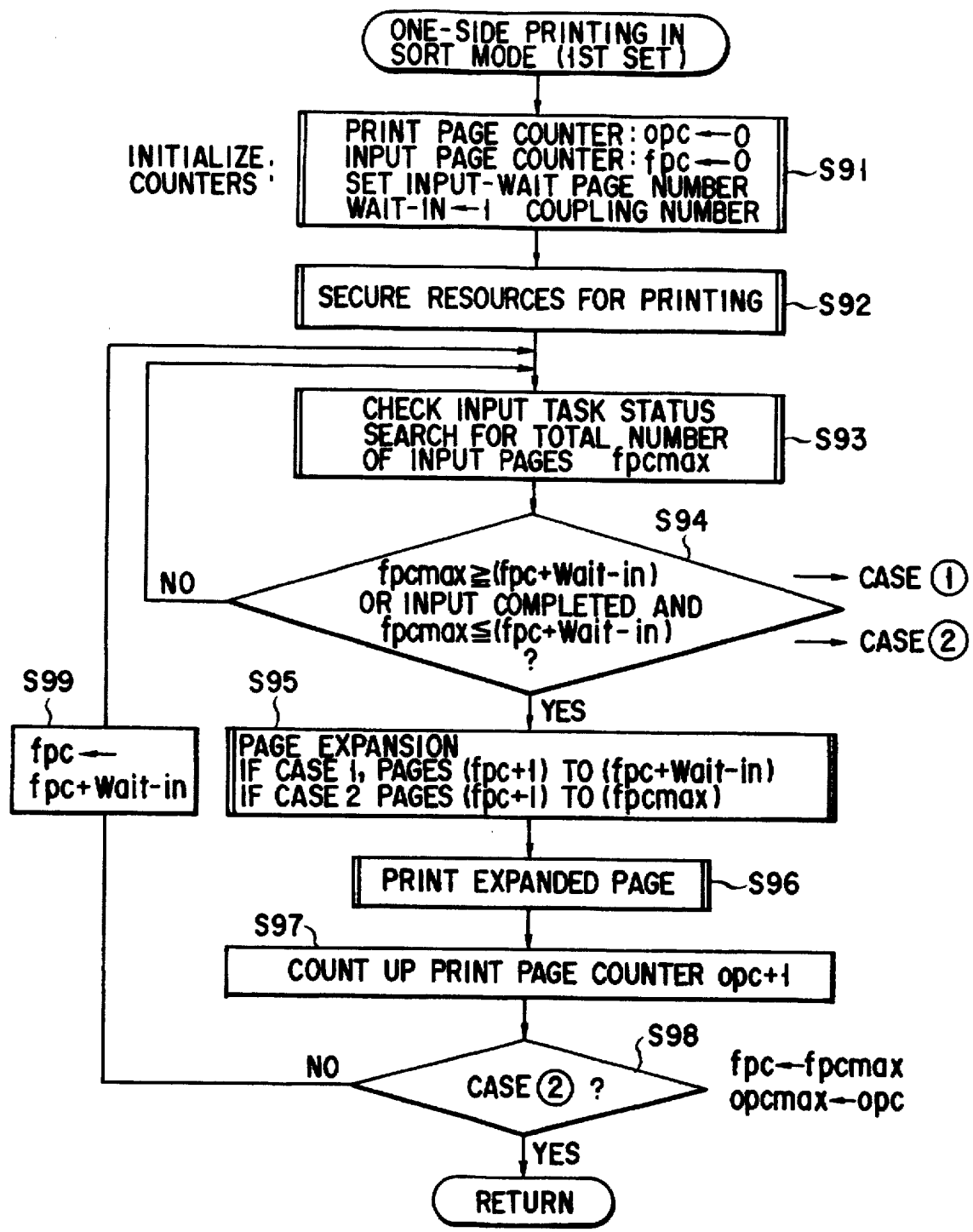
FIG. 24 is a flowchart for explaining one-side printing in a sort mode (first set)

With reference to FIG. 24, one-side printing in sort mode (first set) in FIG. 21 will be discussed below. In FIG. 24, counters are initialized first (S91). More specifically, a print page counter Opc for counting the print page number and an input page counter fpc for counting the number of pages of a document stored in a compressed form in the file area M2 in FIG. 15 are cleared to zero. That is, the page coupling number set from the operation section 114 is set as an input-wait page number Wait-in. When two sheets of a document of size A4 are both to be reduced to size B5 and both are to be printed on a sheet of size B4, for example, "2" is set as the "page coupling number." That is, the page coupling number is the number of pages to be coupled in the case where a plurality of pages stored in the file area M2 are coupled to be printed on a single sheet (hereinafter called "2 in 1"). When there are no pages to be coupled, "1" is set to Wait-in.

Next, resources for a printing process, such as the printing page buffer and printer, are secured (S92).

Then, the table in FIG. 14 is searched to see if the status of the input task is abnormal. Further, the total number of input pages of a document, fpcmax, stored in the file area M2 is detected by referring to the memory edition indication table E in FIG. 6 (S93).

Next, it is determined whether "fpcmax≧fpc+Wait-in (case 1)" or "input completed and fpcmax≦fpc+Wait-in (case 2)" is the case (S94).

The case 1 is such that inputting of a document is preceding to a document corresponding to the image data which is about to be output and the total number of input pages fpcmax is large.

The case 2 is such that every time printing is done, the input page counter fpc is counted up by Wait-in and the difference fpcmax and fpc becomes equal to or smaller than Wait-in. When an odd number of document sheets are input even though 2 in 1 has been designated, for example, only one sheet of a document would be printed on the last page. In this case, if the operator should have specified the "input completed," the condition for the case 2 is satisfied.

When the decision is "YES" in this step S94, page expansion is executed as follows (S95).

In the case 1, pages (fpc+1) to (fpc+Wait-in) of the document stored in a compressed form in the file area M2 expanded and are stored in the print page buffer. In the case 2, pages (fpc+1) to fpcmax of the document stored in a compressed form in the file area M2 expanded and are stored in the print page buffer.

Next, data stored in the print page buffer is sent to the printer 315 to be printed (S96).

Then, the print page counter Opc is counted up (+1) (S97).

Then, it is again determined if it is the case 2 (S98). When the decision is "NO" in this step S98, Wait-in is added to the value of the input page counter fpc and then the processing starting with the aforementioned step S93 is executed. In other words, in the case of 2 in 1, the input page counter fpc is counted up by "2."

If this processing is repeated, the input page counter fpc may become the total number of input pages fpcmax. That is, the condition for the case 2 is met. In this case, the decision in step S98 is "YES," fpcmax is set to fpc and Opc is set to Opcmax, by which one-side printing in sort mode (first set) is completed.

Figure 28:
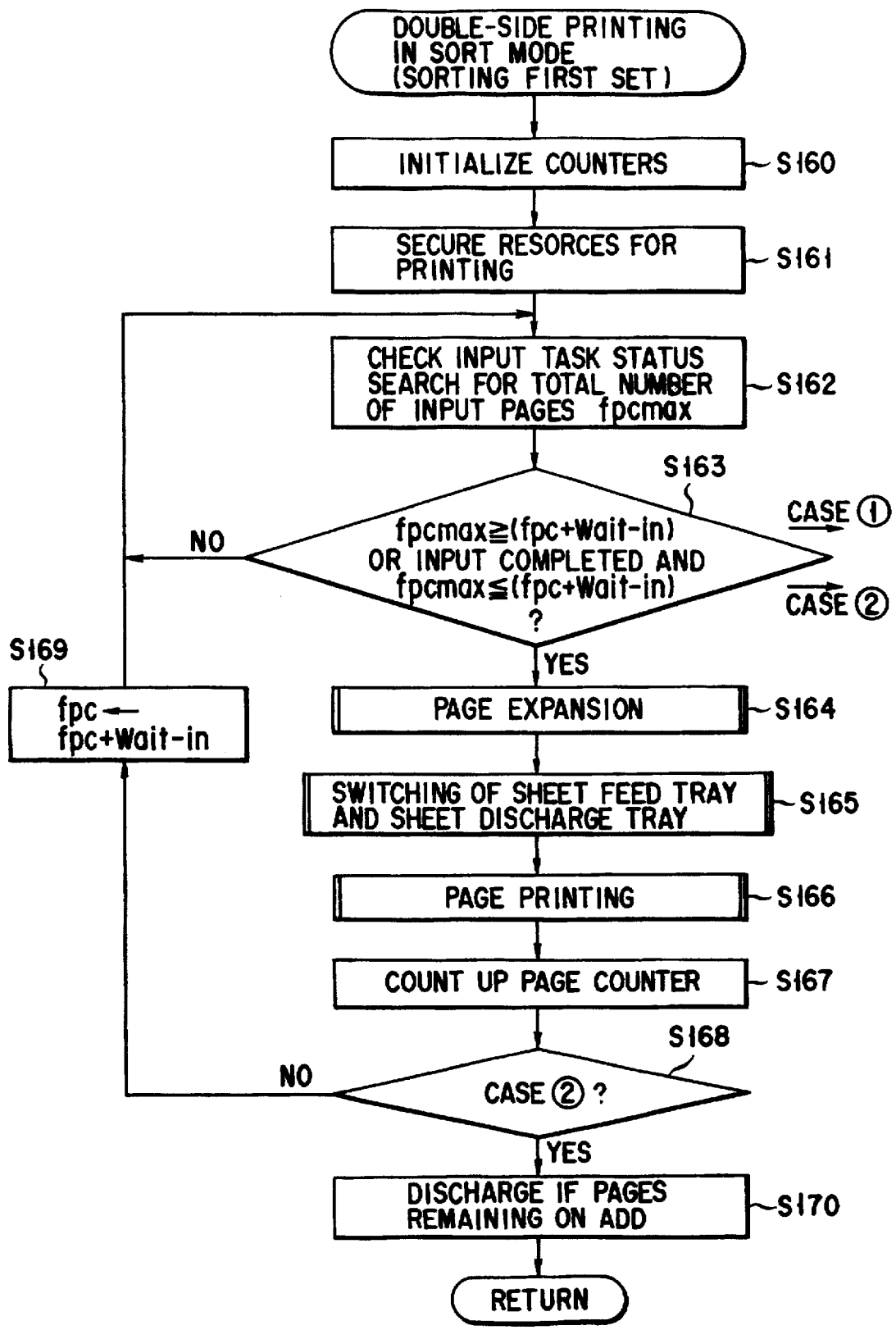
FIG. 28 is a flowchart for explaining double-side printing in a group mode (sort for the first set)

With reference to FIG. 28, one-side printing in group mode (sorting the first set) (S54) in FIG. 21 will be discussed in detail below. Counters are initialized first (S160). More specifically, a print page counter Opc for counting the print page number and an input page counter fpc for counting the number of pages of a document stored in a compressed form in the file area M2 in FIG. 15 are cleared to zero. Further, the page coupling number set from the operation section 114 is set as the input-wait page number Wait-in.

Next, resources for a printing process, such as the printing page buffer and printer, are secured and the initialization of the sheet feed tray and sheet discharge tray is carried out (S161).

Then, the table in FIG. 14 is searched to see if the status of the input task is abnormal. Further, the total number of input pages of a document, fpcmax, stored in the file area M2 is detected by referring to the memory edition indication table E in FIG. 6 (S162).

Next, it is determined whether "fpcmax≧fpc+Wait-in (case 1)" or "input completed and fpcmax≦fpc+Wait-in (case 2)" is the case (S163).

When the decision is "YES" in this step S163, page expansion is executed as follows (S164).

In the case 1, pages (fpc+1) to (fpc+Wait-in) of the document stored in a compressed form in the file area M2 are expanded and are stored in the print page buffer. In the case 2, pages (fpc+1) to fpcmax of the document stored in a compressed form in the file area M2 are expanded and are stored in the print page buffer.

Then, the sheet feed cassette and sheet discharge tray are switched (S165). When the print page counter Opc is "0" (even number), the sheet feed cassette 30 and the sheet discharge tray 74 are switched in such a way that sheets are fed from the sheet feed cassette 30 and are discharged on the ADD 73b (S165).

Next, data stored in the print page buffer is sent to the printer 315 to be printed, i.e., printing is made on the back side of a sheet (S166).

Then, the print page counter Opc is counted up (+1) (S167).

Then, it is again determined if it is the case 2 (S168). When the decision is "NO" in this step S168, Wait-in is added to the value of the input page counter fpc ("1" is added if there are no coupling pages) and then the processing starting with the aforementioned step S163 is executed (S169).

When the flow returns to step S165, a "1" (odd number) is set in the print page counter Opc, the sheet feed cassette and sheet discharge tray are switched so that sheets fed from the ADD 73b and are discharged on the sheet discharge tray 74.

Next, data stored in the print page buffer is sent to the printer 315 to be printed, i.e., printing is made on the top side of a sheet (S166).

Then, the print page counter Opc is counted up (+1) (S167).

Every time printing is done on one side of a sheet, the values of the input page counter fpc and the print page counter Opc are incremented by "+1."

If this processing is repeated, the input page counter fpc may become the total number of input pages fpcmax. That is, the condition for the case 2 is met. In this case, the decision in step S168 is "YES" and sheet discharging is performed if some sheets remain on the ADD 73b. This occurs when there are an odd number of sheets of a document for double-side printing, therefore some back-side printed sheets remain on the ADD 73b. In the above-described manner, double-side printing in sort mode (sorting the first set) is completed.

After one-side printing in sort mode (first set) (S47 and FIG. 24) and double-side printing in sort mode (sorting the first set) (S54 and FIG. 28) are completed through the above-described processing, a printing process for the second and subsequent sets is performed.

When the decision is "NO" in step S49 or S56, the flow proceeds to the flowchart in FIG. 23 to execute a process of printing the second and subsequent sets.

In FIG. 23, it is determined if the input task has been completed or the task of inputting page 2 and subsequent pages of a document has been completed by referring to the table in FIG. 14 (S71). When the decision is "YES" in this step S71, it is determined if the allocation of the page buffer should be changed (S72). If inputting a document image is completed, the input buffer will not be used any more so that the area other than what is used in the input buffer can be used as an output buffer. This feature can ensure a printing process with a sufficient buffer capacity.

When the decision is "YES" in the step S72, the allocation of the page buffer is changed (S73).

It is then determined if memory edition is enabled or disabled by referring to the memory edition indication table E (S74).

It is determined from this memory edition indication table E whether double-side printing is specified (S75).

When the decision is "NO" in this step S75, one-side printing in sort mode (after the first set) is performed (S76).

When the decision is "YES" in step S75, on the other hand, it is determined if the number of printouts exceeds the allowable range of the ADD 73b (S77). More specifically, given that the allowable number of sheets to be stacked on the ADD 73b is ADD-max, it is determined whether or not "the number of printouts≧ADD-max."

When the decision is "NO" in this step S77, collective-stack double-side printing in sort mode (after the first set) (S78) or collective-stack double-side printing in group mode (after the first set) is performed (S79). The detailed process in the step S78 will be discussed later with reference to FIG. 29, and the detailed process in the step S79 will be discussed later with reference to FIG. 30.

When the decision is "YES" in step S77, cascade double-side printing in sort mode (after the first set) (S80) or cascade double-side printing in group mode (after the first set) is performed (S81). The detailed process in the step S80 will be discussed later with reference to FIGS. 31 and 32, and the detailed process in the step S81 will be discussed later with reference to FIGS. 33 and 34.

Figure 25:
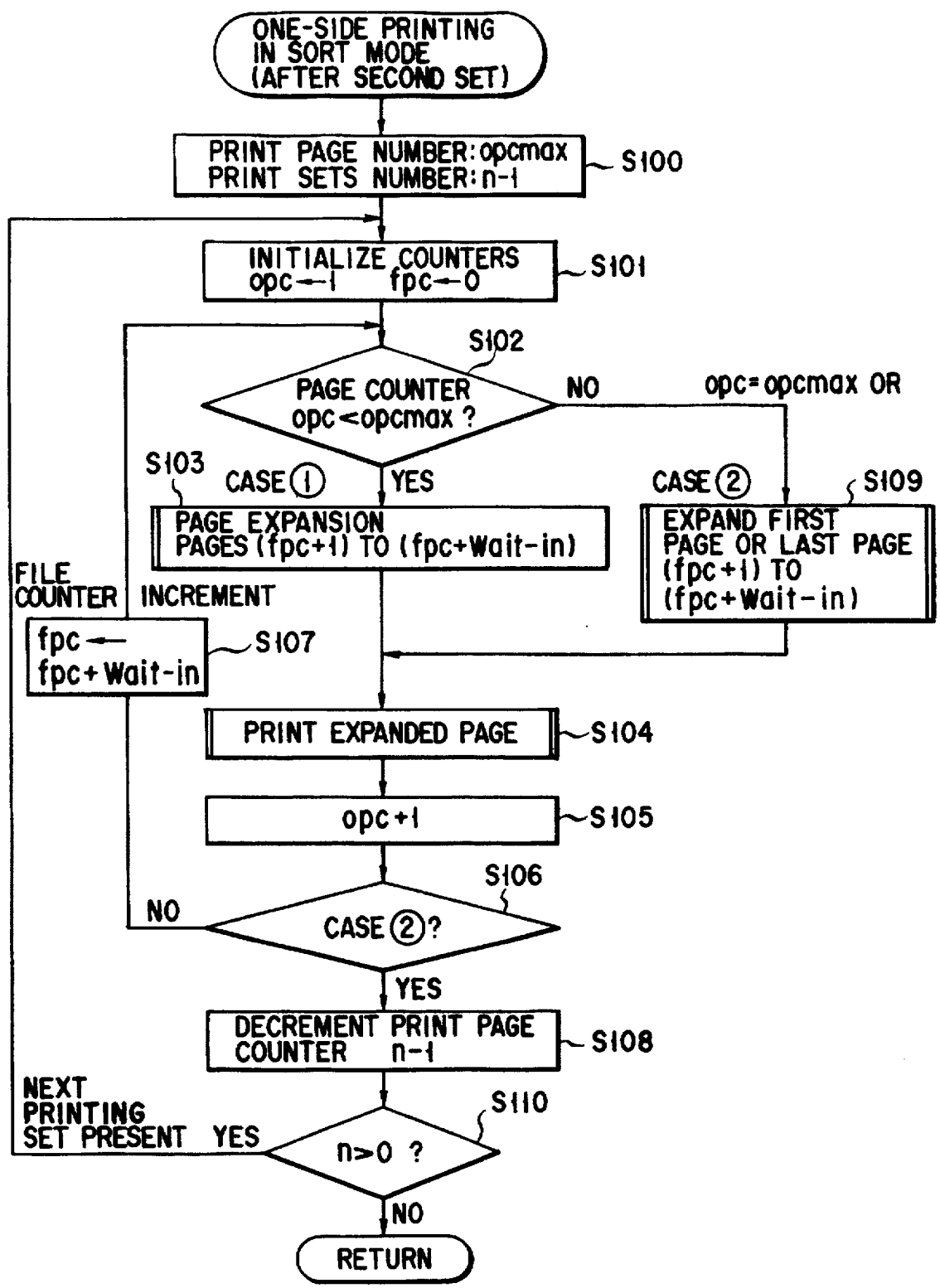
FIG. 25 is a flowchart for explaining one-side printing in a sort mode (after the first set)

To begin with, one-side printing in sort mode (after the first set) will be described in detail with reference to FIG. 25. First, Opcmax is obtained as the print page number and n−1 is obtained as the number of sets to be printed (print sets number) because the first set has been printed out (S100).

A counter initialization is performed to set "1" to the print page counter Opc and set "0" to the input page counter fpc (S101).

It is then determined if print page counter Opc<Opcmax (S102). When the decision is "YES" in this step S102, page expansion is executed as in the aforementioned case 1 (S103).

That is, pages (fpc+1) to (fpc+Wait-in) of the document stored in a compressed form in the file area M2 are expanded and are stored in the print page buffer.

Next, data stored in the print page buffer is sent to the printer 315 to be printed (S104).

When the decision is "NO" in step S102, page expansion is executed as in the aforementioned case 2 (S109).

Then, the print page counter Opc is counted up (+1) (S105).

Then, it is again determined if it is the case 2 (S106). When the decision is "NO" in this step S106, Wait-in is added to the value of the input page counter fpc and then the processing starting with the aforementioned step S102 is executed.

Thereafter, every time one-side printing is performed page by page, the input page counter fpc is incremented by +1 until the decision in step S106 becomes "YES" and when it becomes the aforementioned case 2 or when "input completed and fpcmax≦fpc+Wait-in," the decision in step S106 becomes "YES" and n−1 is set to the print sets number n (S108).

It is then determined if the print sets number n is greater than 0 (S110). While the decision is "YES" in this step S110, the processing starting with step S101 is repeated to print the subsequent sets (third set, fourth set, . . . , (n−1)-th set). When printing the (n−1)-th set is completed, the decision in step S110 becomes "NO" and printing in sort mode (after the first set) is completed.

Now, collective-stack double-side printing in sort mode (after the first set) will be described in detail with reference to FIG. 29. In FIG. 29, first, Opcmax/2 is set to the print page number, (n−1)×2 is set as a print sets counter N, and the back flag is set off (S180). Because of the double-side printing, Opc is divided by 2. Although the remaining number of sets to be printed is (n−1), this number is multiplied by 2 to be set to the print sets counter N because of the double-side printing. The sheet feed cassette 30 and sheet discharge tray 74 are switched in such a manner that when the back flag is on, a sheet is fed from the sheet feed cassette 30, and printing is made on the back side of the sheet after which the sheet is discharged on the ADD 73b, and when the back flag is off, a back-side printed sheet is fed from the ADD 73b, and printing is made on the top side of the sheet after which the sheet is discharged on the sheet discharge tray 74.

Then, the ON/OFF status of the back flag is inverted (flip-over process) and a process of switching the sheet feed tray and sheet discharge tray is performed (S181). More specifically, the sheet feed cassette 30 and sheet discharge tray 74 are switched in such a manner that when the back flag is on, a sheet is fed from the sheet feed cassette 30 and the sheet is discharged on the ADD 73b, and when the back flag is off, a back-side printed sheet is fed from the ADD 73b and the sheet is discharged on the sheet discharge tray 74.

Then, 1 is set to the page counter Opc. Then, an initialization is performed to set "0" to the input page counter fpc when the back flag is on and set "fpcmax−Wait-in" to the input page counter fpc when the back flag is off (S182).

It is then determined if "print page counter Opc≦Opcmax" when the back flag is on and if "input page counter fpc≦0" when the back flag is off (S184). When the decision is "YES" in this step S184, page expansion is executed as in the aforementioned case 1 (S184).

That is, pages (fpc+1) to (fpc+Wait-in) of the document stored in a compressed form in the file area M2 are expanded and are stored in the print page buffer when the back flag is on, and pages (fpc) to (fpc−Wait-in) of the document stored in a compressed form in the file area M2 are expanded and are stored in the print page buffer when the back flag is off.

When the decision is "NO" in step S183, page expansion is executed as in the aforementioned case 2 (S184a).

Next, data stored in the print page buffer is sent to the printer 315 to be printed (S185).

Then, the print page counter Opc is counted up (+1) (S186).

Then, it is again determined if it is the case 2 to thereby check if the last page is reached (S187). When the decision is "NO" in this step S187, Wait-in×2 is added to the value of the input page counter fpc when the back flag is on or Wait-in×2 is subtracted from the value of the input page counter fpc when the back flag is off, and then the processing starting with the aforementioned step S183 is executed.

Figure 42B:
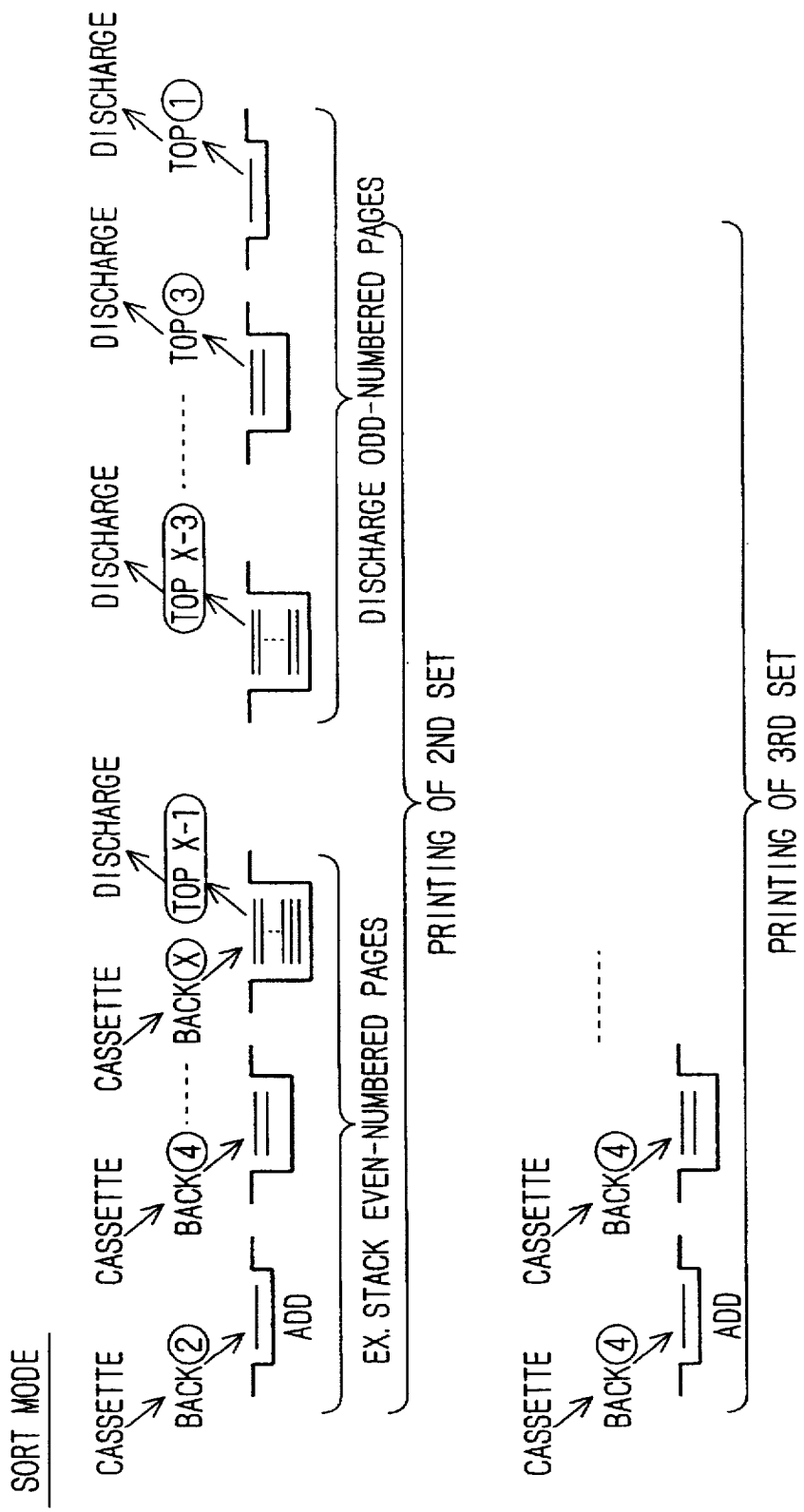
FIG. 42B is a diagram showing the flow of collective double-side processing in sort mode.

When the coupling page number Wait-in is "1," the input page counter fpc is counted up by "2." More specifically, if "1" is initially set in the input page counter fpc, the contents of page 2, page 4, . . . , and page X are printed on the back side of the first page of the second set. That is, the contents of the second page and fourth page are printed on the back side of the first page of the second set and this sheet is stacked on the ADD 73b, as shown in FIG. 42B.

When pages up to the page X are printed on the back side of the sheet, the decision is "YES" in step S187, and N−1 is set to the print sets counter N (S189).

It is then determined if N=0 (S190). Because all the sets have not been printed yet, the decision is "NO" in this step and the flow returns to step S181.

Then, the ON/OFF status of the back flag is inverted and a process of switching the sheet feed tray and sheet discharge tray is performed in such a manner that a sheet is fed from the ADD 73b and is discharged on the sheet discharge tray 74 (S181). In other words, "page X-1" "page X-2," "page 3" and "page 1" are printed on the surface of page X in the same manner as described above.

When the value of the print sets counter N is sequentially decremented by "1" and becomes "0," the decision is "YES" in step S190 after which the flow proceeds to the flowchart in FIG. 22 to free the entire file (S59) and free the other resources (S60).

The collective-stack double-side printing in sort mode (after the first set) is performed in the above-described manner and as illustrated in FIG. 42B.

Figure 30:
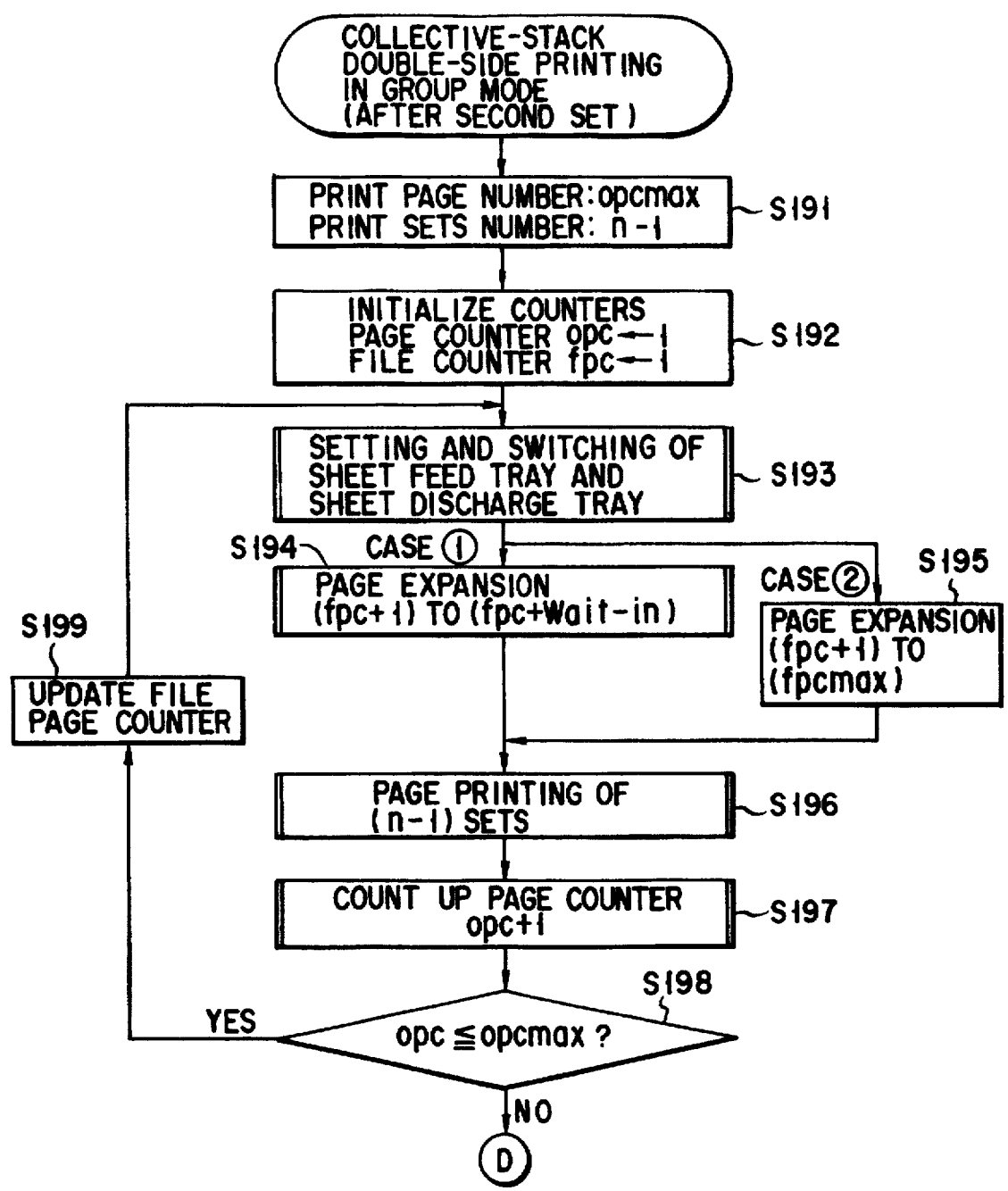
FIG. 30 is a flowchart for explaining collective-stack double-side printing in a group mode (after the first set)

The collective-stack double-side printing in group mode (after second set) will now be discussed later with reference to FIG. 30. In FIG. 30, Opmax is obtained as the print page number and n−1 is obtained as the print sets number (S191).

Then, counters are initialized. That is, "1" is set to the print page counter Opc and "1" is set to the input page counter fpc (S192).

Then, the sheet feed cassette and sheet discharge tray are switched (S193). More specifically, the sheet feed cassette 30 and the sheet discharge tray 74 are switched in such a way that sheets are fed from the sheet feed cassette 30 and are discharged on the ADD 73b when the print page counter Opc holds an odd number, and sheets are fed from the ADD 73b and are discharged on the sheet discharge tray 74 when the print page counter opc holds an even number (S193). The initial value for the print page counter Opc is an odd number (1).

In the case 1, page expansion is executed (S194). That is, pages (fpc+1) to (fpc+Wait-in) of the document stored in a compressed form in the file area M2 are expanded and are stored in the print page buffer. The initial value for fpc is "1" so that if Wait-in is "1," data of page 2 is stored in the print page buffer.

In the aforementioned case 2, page expansion of pages (fpc+1) to fpcmax is executed (S195).

Then, a process of printing the contents of page 2 at the back side of a sheet in the (n−1)-th set and stacking the sheet on the ADD 73b as shown in FIG. 42A (S196). The print page counter Opc is then counted up by "+1" (S197).

It is then determined if "Opc≦Opcmax" (S198). If the decision is "YES" in this step S198, "input page counter fpc−Wait-in" is set when the value of the print page counter Opc is an even number or "input page counter fpc+Wait-in×3" is set when the value of the print page counter Opc is an odd number (S199) after which the flow returns to step S193. After the contents of page 2 (input page counter fpc=1) stored in the file area M2 are printed on the back side of the N(n−1)-th set as shown in FIG. 42A, for example, the value of the print page counter Opc is incremented by "+1" to become 2 (even number), so that the input page counter fpc is decremented by "1" to become 0.

Then, the flow returns to step S193 where the sheet feed cassette 30 and sheet discharge tray 74 are switched in such a manner that sheets are fed from the ADD 73b and discharged on the sheet discharge tray 74 (S193). As the value of the print page counter Opc is set to an even number, the sheet feed cassette 30 and the sheet discharge tray 74 are switched in such a way that sheets fed from the ADD 73b and are discharged on the sheet discharge tray 74. At this time, the contents of page 1 (input page counter fpc=0) stored in the file area M2 are printed by the printer 313 on the top side of the sheet picked up from the ADD 73b.

When the printing of the second sheet is completed, the value of the print page counter Opc is incremented by "+1" to become 3 (odd number) so that fpc+Wait-in×3 is set to the input page counter fpc. That is, the input page counter fpc=3 and the printing of page 4 (back side) and page 3 (top side) in the same manner. In other words, the input page counter fpc changes in the order of 1 to 0 to 3 to 2 to 5 to 4 and so forth.

The collective-stack double-side printing in group mode (after the first set) is executed in the above manner and as illustrated in FIG. 42A.

Next, cascade double-side printing in sort mode (after the first set) will be described with reference to FIGS. 31 and 32.

Figure 31:
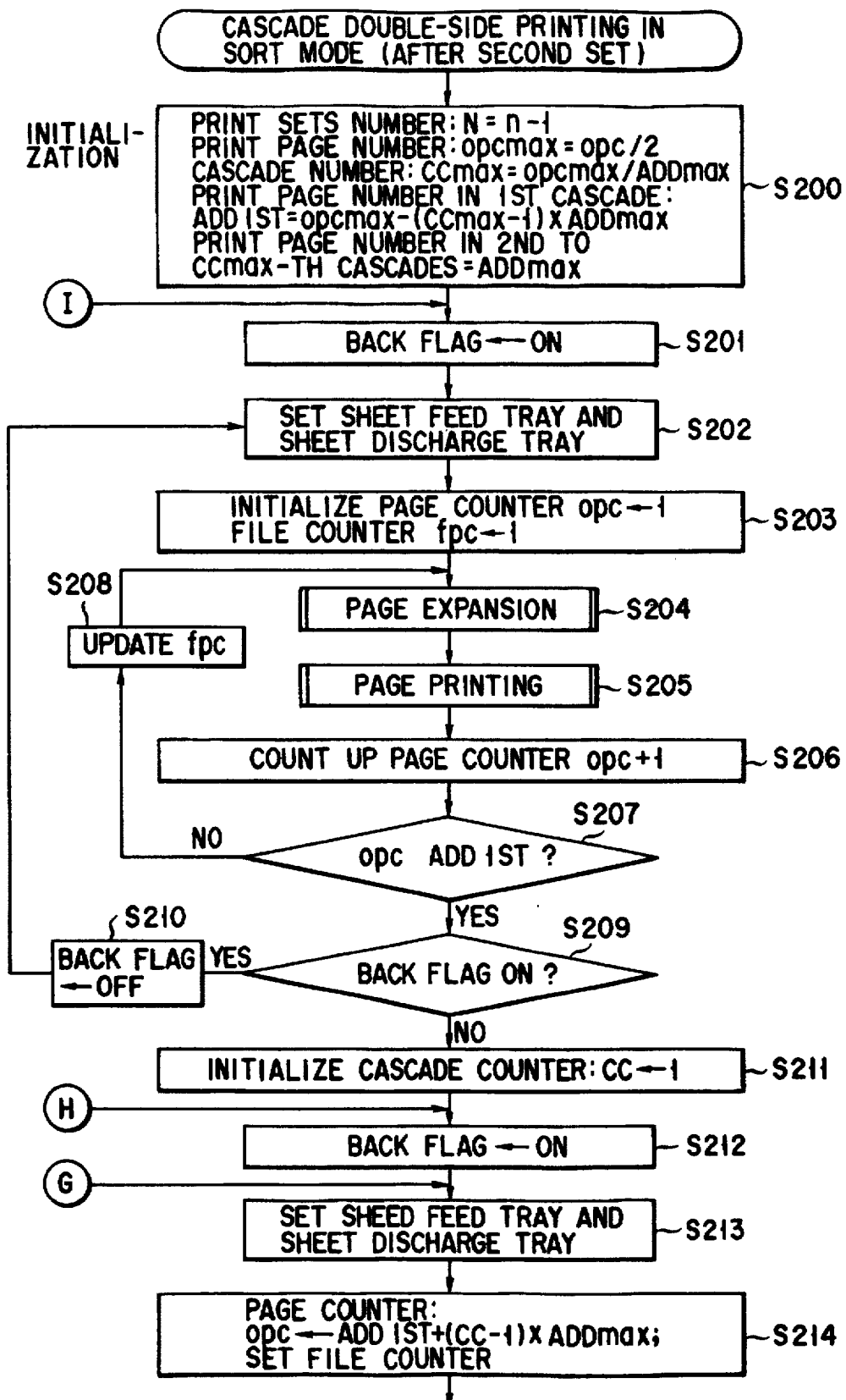
FIG. 31 is a part of a flowchart for explaining cascade double-side printing in a sort mode (after the first set)
Figure 32:
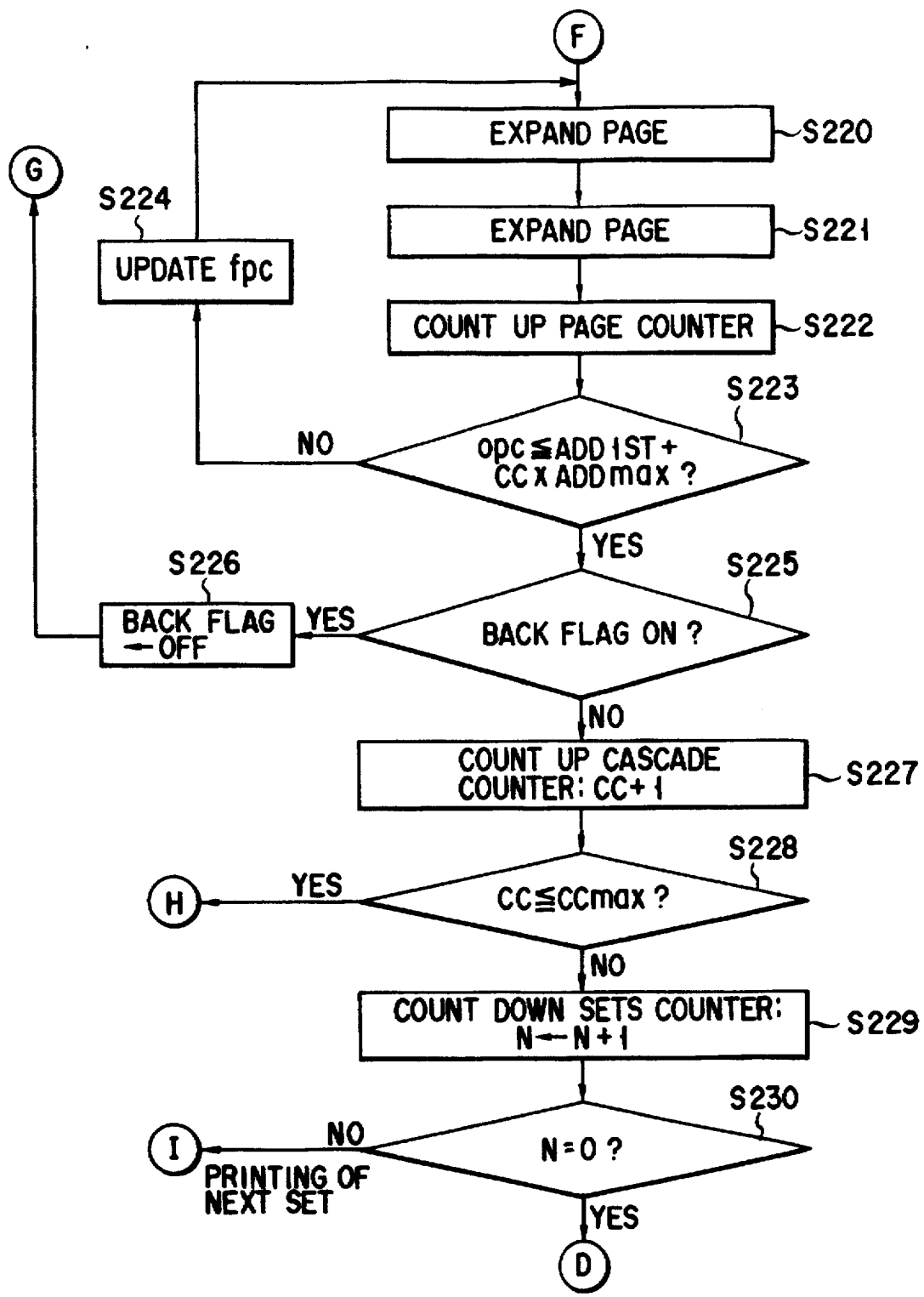
FIG. 32 is a part of a flowchart for explaining the cascade double-side printing in a sort mode (after the first set)

In FIG. 31, initialization is executed first (S200). More specifically, n−1 is set to the print sets counter N, Opcmax/2 is set to the print page number Opcmax, and Opcmax/ADDmax (fractional part cut off) is set to the cascade number CCmax, the print page number for the first time Add1st=Opcmax−CCmax×Addmax and the print page number for the second printing to CCmax printing=ADDmax (when ADD1st=0, only the processing for the second printing and subsequent printing is performed) where ADDmax is the maximum number of sheets of a document to be stackable on the ADD 73b. Therefore, the quotient of the division of Opcmax by ADDmax is a value indicating how many times ADD 73b would become full.

The print page number ADD1st for the first printing is equivalent to the remainder of the division of Opcmax by ADDmax. In this embodiment, when the print page number is not an integer multiple of ADDmax, the odd-numbered pages would be printed first.

Then, the back flag is set to "1" (ON) (S201). The back flag being "1" means that a document will be printed at the back side of a sheet in which case the sheet feed tray and sheet discharge tray are so set that the sheet is fed from the sheet feed cassette 30 and is discharged on the ADD 73b.

The back flag being "0" (reset) means that a document will be printed at the top side of a sheet in which case the sheet feed cassette 30 and sheet discharge tray 74 are switched so that the sheet is fed from the ADD 73b and discharged on the sheet discharge tray 74 (S202).

Then, 1 is set to the page counter Opc, and "0" is set to the input page counter fpc when the back flag is on and "2×ADD1st×Wait-in−Wait-in" is set to the input page counter fpc when the back flag is off (S203).

Then, page expansion is executed as in the aforementioned case 1 (S204).

That is, pages (fpc+1) to (fpc+Wait-in) of the document stored in a compressed form in the file area M2 are expanded and are stored in the print page buffer.

Alternatively, page expansion is executed as in the aforementioned case 2. That is, pages (fpc+1) to fpcmax are expanded.

Next, data of page 1 stored in the print page buffer is sent to the printer 315 to be printed (S205).

Then, the print page counter Opc is counted up (+1) (S206).

Then, it is determined if print page counter Opc≦ADD1st (S207). When the decision is "NO" in this step S207, Wait-in×2 is added to the value of the input page counter fpc when the back flag is on or Wait-in×2 is subtracted from the value of the input page counter fpc when the back flag is off, and then the processing starting with the aforementioned step S204 is executed.

Figure 43A:
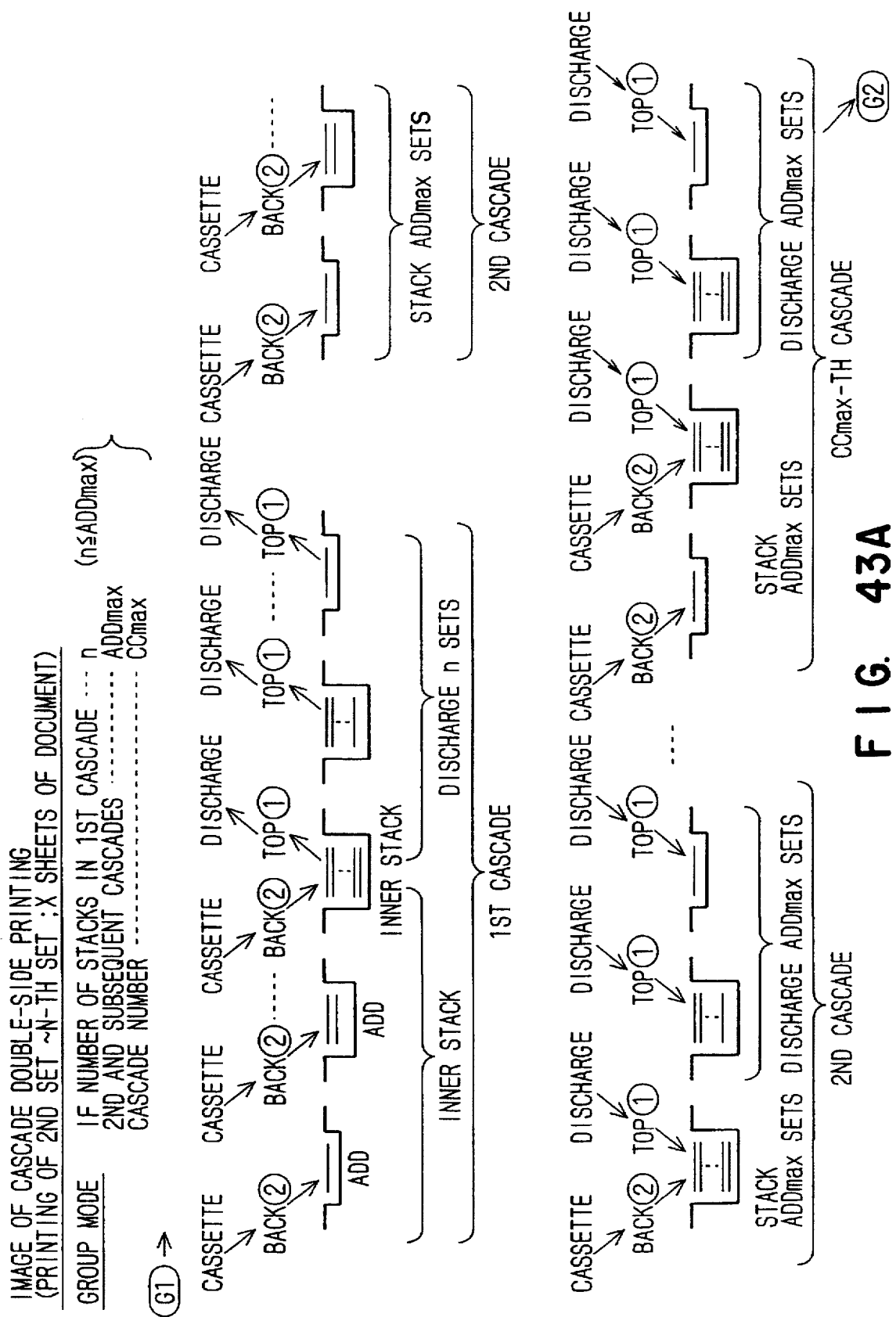
FIGS. 43A and 43B are diagrams showing the image of cascade processing in double-side printing.
Figure 43B:
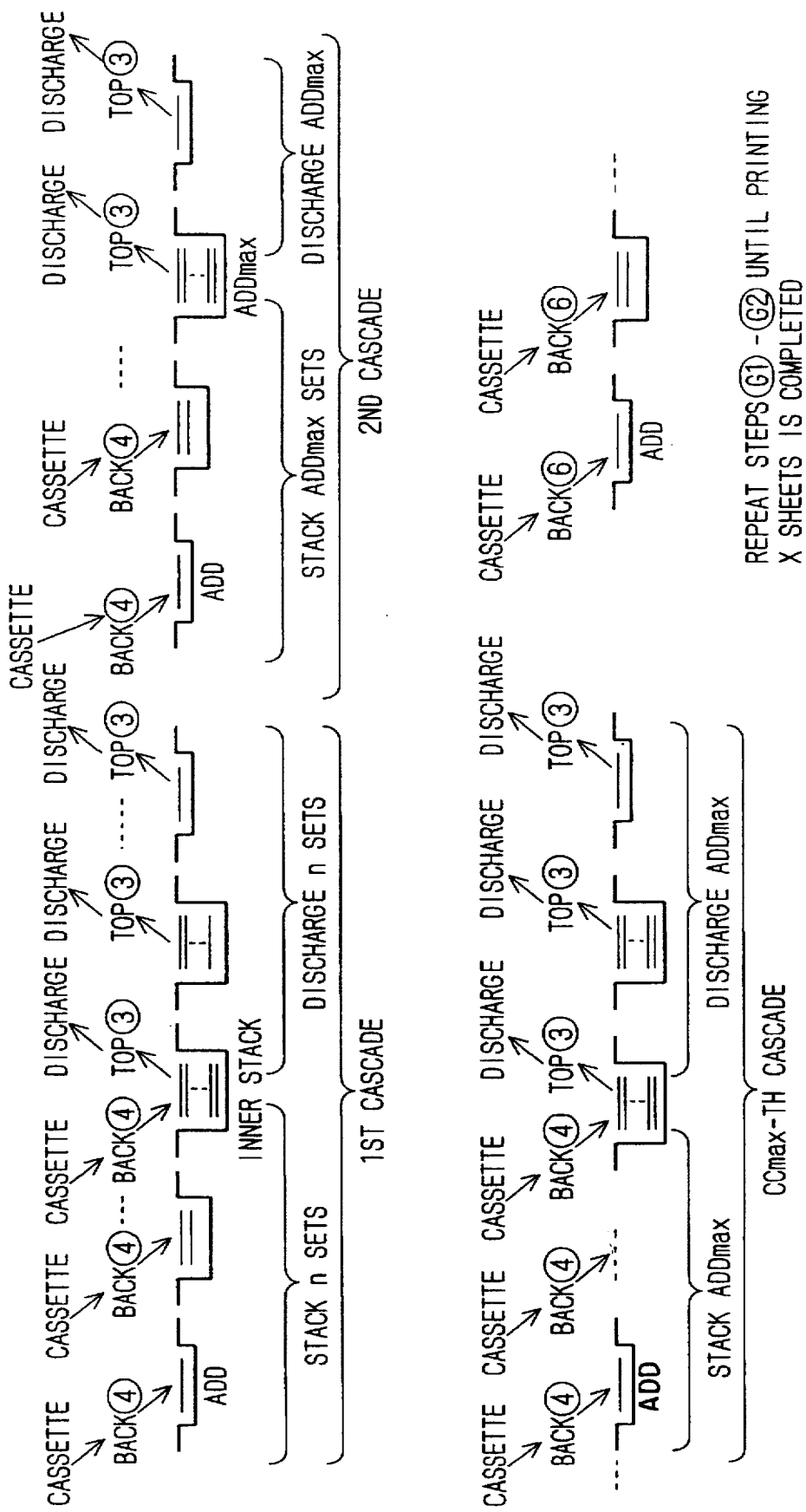

When the coupling page number Wait-in is "1," the input page counter fpc is counted up by "2." More specifically, if "1" is initially set in the input page counter fpc, the contents of page 2, page 4 . . . , and page 2×ADD1st are printed on the back side of the first page of the second set. That is, the contents of the second page and fourth page are printed on the back side of the first page of the second set and this sheet is stacked on the ADD 73b, as shown in FIG. 43A and FIG. 43B.

Every time one page is printed on the back side of the sheet in the second set in the order of page 2, page 4 and so forth, the value of the print page counter Opc is incremented by "+1" (S206).

When ADD1st sheets are printed, the decision in step S207 becomes "YES" and it is determined if the back flag is "1" (ON) (S209).

As the back flag is "1," the decision is "YES" in this step and the back flag is set to "0" (OFF) (S210). Thereafter, the processing starting with step S202 is executed. Since the back flag is "0," the sheet feed cassette 30 and the sheet discharge tray 74 are switched in such a manner that sheets are fed from the ADD 73b and are discharged on the sheet discharge tray 74 (S202).

The sequence of processes in steps S204 to S208 is repeated in the same manner, and odd-numbered pages are printed on the top side of a sheet fed from the ADD 73b. When page 2×ADD1st−1, . . . , page 3 and page 1 are printed on the top side of the n-th sheet, the decision is "YES" in step S207 after which the flow advances to step S209. As the back flag is "0" (OFF), the decision is "NO" in this step S209 and "1" is set to the cascade counter CC (S211).

Then, the back flag is set to "1" (ON) again (S212) and the sheet feed tray and sheet discharge tray are set so that a sheet is fed from the sheet feed cassette 30 and discharged on the ADD 73b (S213).

Next, ADD1st+(CC−1)×ADDmax is set in the print page counter Opc, and 2×{ADD1st+(CC−1)×ADDmax}×Wait-in is set in the input page counter fpc when the back flag is on and 2×{ADD1st+(CC−1)×ADDmax}×Wait-in+ADDmax×2×Wait-in−Wait-in is set in the input page counter fpc when the back flag is off (S214). As "1" is initially set in CC, ADD1st is set in the print page counter Opc.

As in the case 1, page expansion is executed (S220). That is, pages (fpc+1) to (fpc+Wait-in) of the document stored in a compressed form in the file area M2 are expanded and are stored in the print page buffer.

Alternatively, page expansion is executed as in the aforementioned case 2.

Then, data of page 1 stored in the print page buffer is sent to the printer 315 to be printed (S221).

The print page counter Opc is then counted up by "+1" (S222).

It is then determined if "Opc≦ADD1st+(CC−1)×ADDmax (S223). If the decision is "NO" in this step S223, Wait-in×2 is added to the value of the input page counter fpc when the back flag is on or Wait-in×2 is subtracted from the value of the input page counter fpc when the back flag is off, and then the processing starting with the aforementioned step S220 is executed.

Figure 44A:
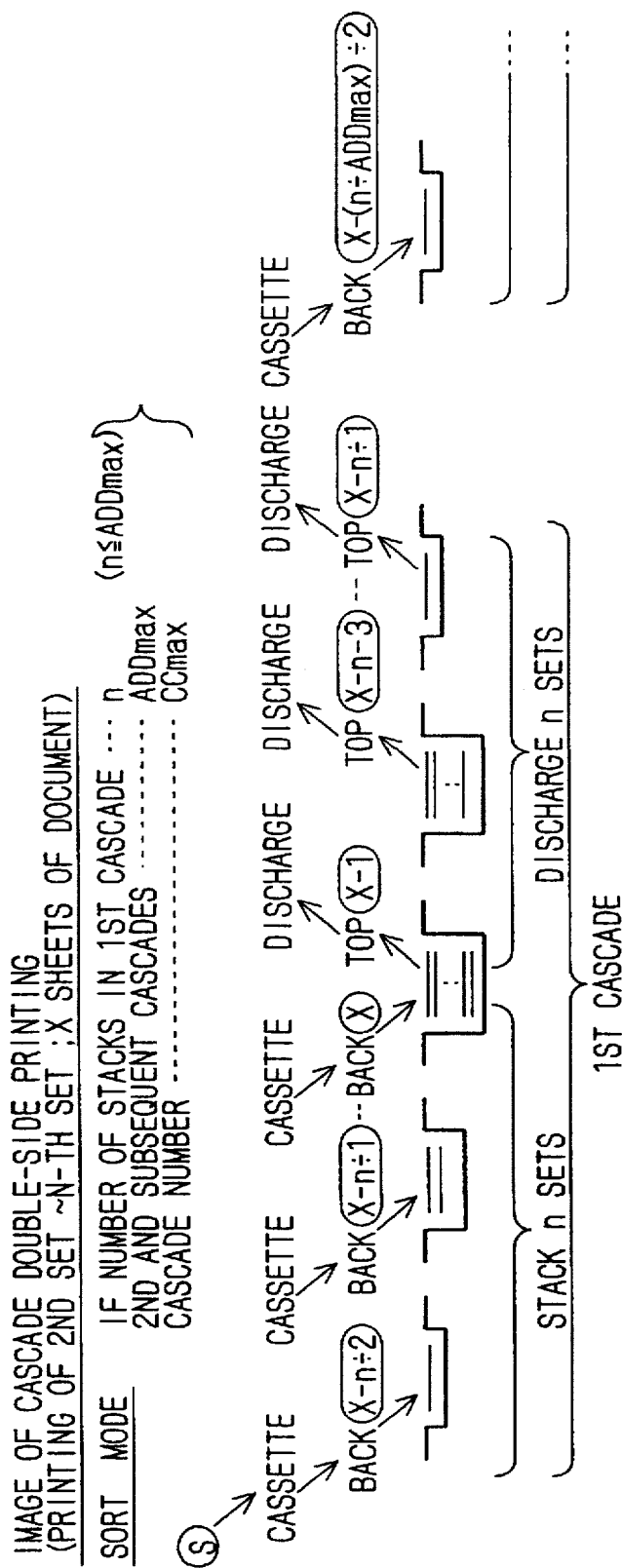
FIGS. 44A, 44B, and 44C are diagrams showing the image of cascade processing in double-side printing.
Figure 44B:
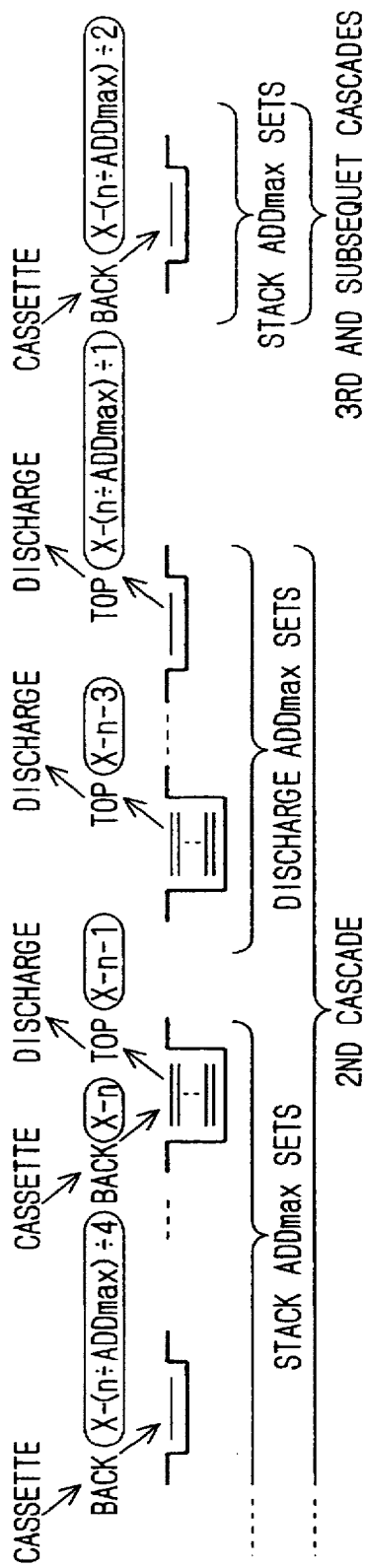
Figure 44C:
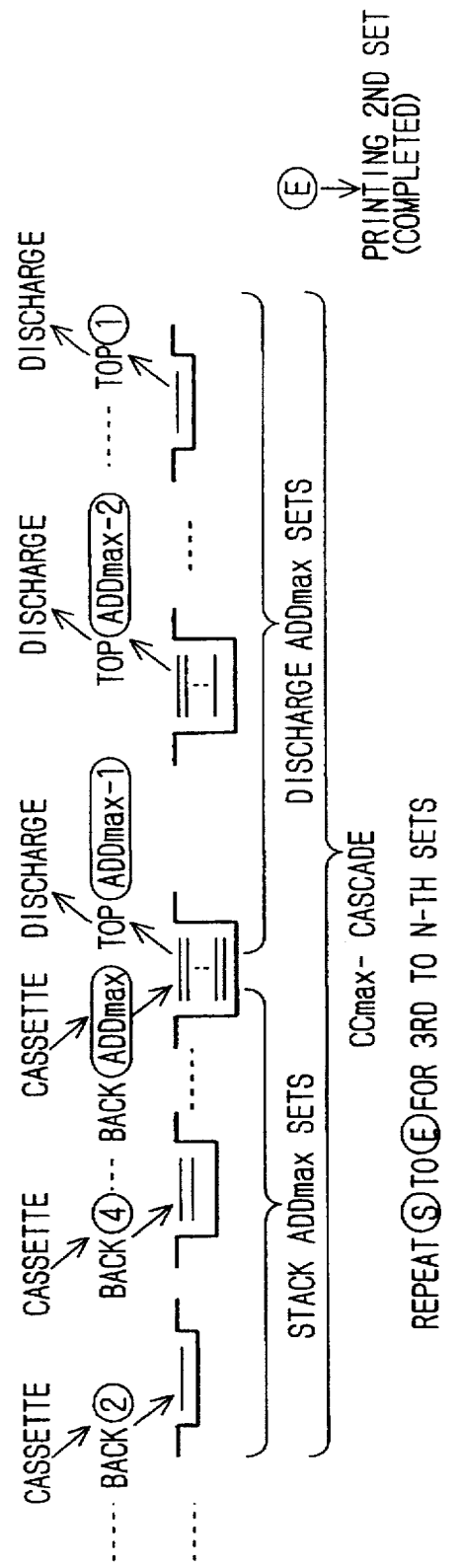

When the coupling page number Wait-in is "1," the input page counter fpc is counted up by "2." More specifically, the contents of page 2×{ADD1st+(CC−1)×ADDmax}+2, page 2×{ADD1st+(CC−1)×ADDmax}+4, . . . , and page 2×{Add1st+CC×ADDmax} are printed on the back side of a sheet of the first set. That is, the contents of the second page and fourth page are printed on the back side of the sheet and this sheet is stacked on the ADD 73b, as shown in FIG. 44A, FIG. 44B and FIG. 44C.

Every time one page is printed on the back side of the sheet in the second set in the order of 2×{ADD1st+(CC−1)×ADDmax}+2, page 2×{ADD1st+(CC−1)×ADDmax}+4 and so forth, the value of the print page counter Opc is incremented by "+1" (S222).

When ADDmax sheets are printed, the decision in step S223 becomes "YES" and it is determined if the back flag is "1" (ON) (S225).

As the back flag is "1," the decision is "YES" in this step and the back flag is set to "0" (OFF) (S226). Thereafter, the processing starting with step S213 is executed. Since the back flag is "0," the sheet feed cassette 30 and the sheet discharge tray 74 are switched in such a manner that sheets are fed from the ADD 73b and discharged on the sheet discharge tray 74 (S213).

The sequence of processes in steps S220 to S224 is repeated in the same manner, and odd-numbered pages are printed on the top side of a sheet fed from the ADD 73b. When page 2×{ADD1st+CC×ADDmax}−1, . . . , page 2×{ADD1st+(CC−1)×ADDmax}+3, page 2×{ADD1st+(CC−1)×ADDmax}+1, and so forth are printed on the top side of page ADDmax, the decision in step S223 becomes "YES" after which the flow advances to step S225. As the back flag is "0" (OFF), the decision is "NO" in this step S225 and the value of the cascade counter CC is incremented by "+1" (S227).

Then, it is determined if the cascade counter CC≦CCmax (S228). When the decision is "YES" in this step S228, the above-described processing starting with step S212 is repeated and printing is made on both sides of the ADDmax sheet in the next, third cascade printing.

Every time cascade printing is completed, the value of the cascade counter is incremented by "+1" (S227).

When the cascade counter CC>CCmax, the decision is "NO" in step S228 and N−1 is set in the print sets counter N (S229).

It is then determined if the print sets number N is 0 (S230). While the decision is "NO" in this step S230, the above-described processing starting with step S201 is repeated.

When "N=0," the decision is "YES" in step S230 and the flow returns to the process starting with step S59 in FIG. 22.

The cascade double-side printing in sort mode (after the first set) is executed in the above manner.

Figure 33:
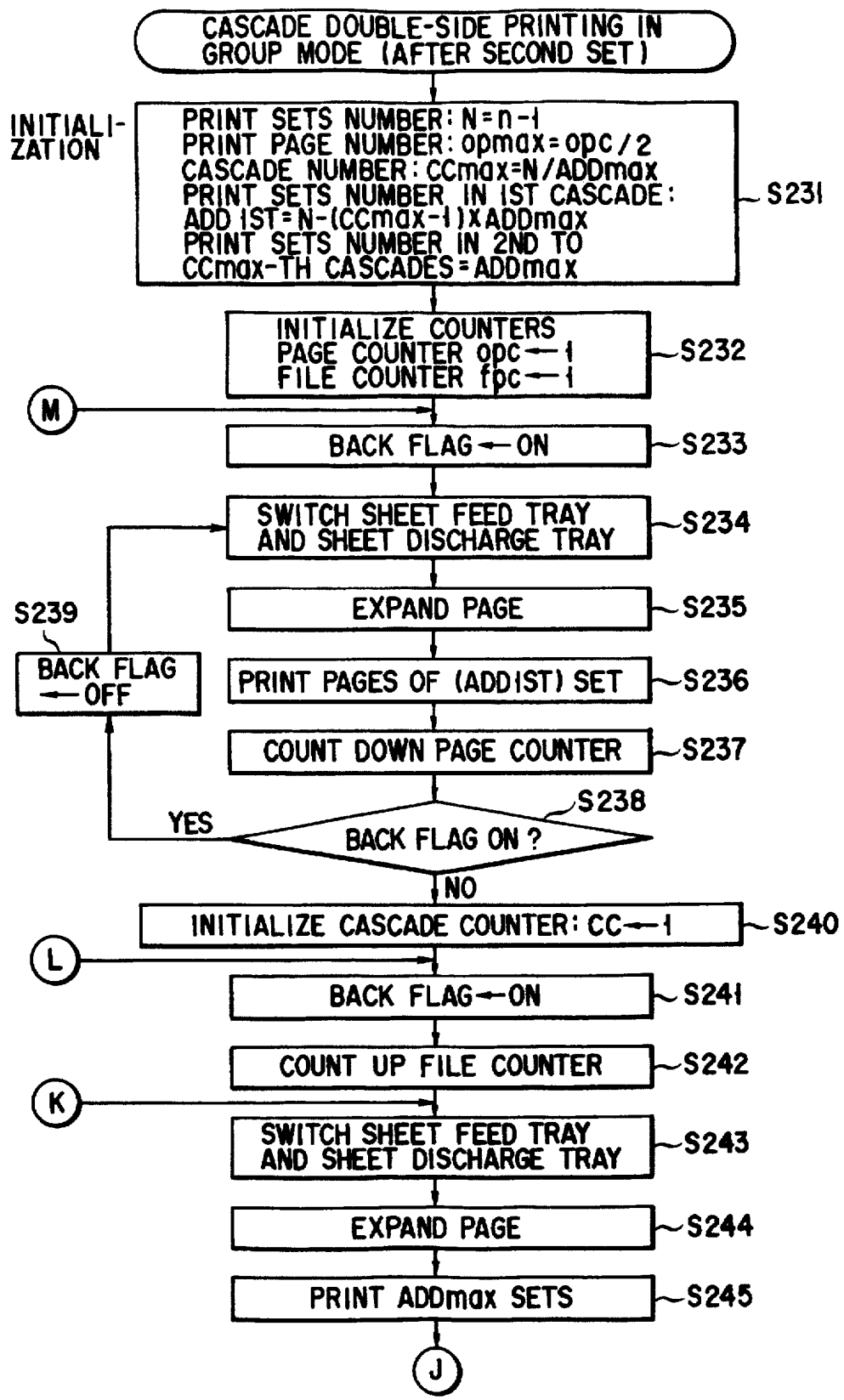
FIG. 33 is a part of a flowchart for explaining cascade double-side printing in a group mode (after the first set)

Now, cascade double-side printing in group mode (after the first set) will be described with reference to FIGS. 33 and 34. In FIG. 33, initialization is executed first. More specifically, n−1 is set to the print sets counter N, Opcmax/2 is set to the print page number Opcmax, and N/ADDmax (fractional part cut off) is set to the cascade number CCmax, the print page number for the first time Add1st=N−CCmax×Addmax and the print page number for the second printing to CCmax printing=ADDmax. When ADD1st=0, the processing for the second printing and subsequent printing is performed.

In this case, ADDmax is the maximum number of sheets of a document to be stackable on the ADD 73b. Therefore, the quotient of the division of N by ADDmax is a value indicating how many times ADD 73b would become full.

The print page number ADD1st for the first printing is equivalent to the remainder of the division of N by ADDmax. In this embodiment, when the print page number is not an integer multiple of ADDmax, the odd-numbered pages would be printed first.

Then, "1" is set in the print page counter Opc and "1" is set in the input page counter fpc (S232).

Then, the back flag is set to "1" (ON) (S233). The back flag being "1" means that a document will be printed at the back side of a sheet in which case the sheet feed tray and sheet discharge tray are set so that the sheet is fed from the sheet feed cassette 30 and discharged on the ADD 73b.

The back flag being "0" (reset) means that a document will be printed on the top side of a sheet in which case the sheet feed cassette 30 and sheet discharge tray 74 are switched so that the sheet is fed from the ADD 73b and discharged on the sheet discharge tray 74 (S234).

Then, page expansion is executed as in the aforementioned case 1 (S235).

That is, pages (fpc+1) to (fpc+Wait-in) of the document stored in a compressed form in the file area M2 expanded and are stored in the print page buffer.

Alternatively, page expansion is executed as in the aforementioned case 2. That is, pages (fpc+1) to fpcmax are expanded.

When the coupling page number is "1," only page (fpc+1) is stored in the print page buffer. As "1" is initially set in the input page counter fpc, data of page 2 stored in the file area M2 (data for printing on the back side of the sheet) is stored in the print page buffer.

The contents of page 2 are printed on the back side of the ADD1st sets of sheets and are stacked on the ADD 73b as shown in FIG. 43A (S236).

The value of the input page counter fpc is incremented by −(Wait-in) or is decremented by "1" (S237).

It is then determined if the back flag is "1" (ON) (S238). As the back flag is "1," the decision is "YES" in this step and the back flag is set to "0" (OFF) (S239). Thereafter, the processing starting with step S234 is executed. Since the back flag is "0," the sheet feed cassette 30 and the sheet discharge tray 74 are switched in such a manner that sheets are fed from the ADD 73b and discharged on the sheet discharge tray 74 (S234).

Next, the sheet on the back side of which page 2 in the ADD1st set has been printed is fed to the printer 315 to be printed (S236).

In the first cascade process, n sets are printed as shown in FIG. 43A.

Then, the value of the input page counter fpc is incremented by "+Wait-in" (S237) and it is again determined if the back flag is set to "1" (ON) (S238).

As the back flag is already "0" (OFF), the decision is "NO" in this step and "1" is set in the cascade counter CC (S240).

Then, the back flag is set to "1" (ON) again (S241) after which the value of the input page counter fpc is incremented by "+Wait-in" (S242).

Because the back flag has been set to "1" (ON), the sheet feed tray and sheet discharge tray are set so that a sheet is fed from the sheet feed cassette 30 and discharged on the ADD 73b.

Then, page expansion is executed as in the aforementioned case 1 (S244).

That is, pages (fpc+1) to (fpc+Wait-in) of the document stored in a compressed form in the file area M2 expanded and are stored in the print page buffer.

Alternatively, page expansion is executed as in the aforementioned case 2. That is, pages (fpc+1) to fpcmax are expanded.

When the coupling page number is "1," only page (fpc+1) is stored in the print page buffer. As "1" is initially set in the input page counter fpc, data of page 2 stored in the file area M2 (data for printing on the back side of the sheet) is stored in the print page buffer.

The contents of page 2 are printed on the back side of the ADDmax sets of sheets and are stacked on the ADD 73b as shown in FIG. 43A (S245).

It is then determined if the back flag is "1" (ON) (S247). As the back flag is "1," the decision is "YES" in this step and the back flag is set to "0" (OFF) (S248). Thereafter, the processing starting with step S243 is executed. Since the back flag is "0," the sheet feed cassette 30 and the sheet discharge tray 74 are switched in such a manner that sheets are fed from the ADD 73b and discharged on the sheet discharge tray 74 (S243).

Next, page expansion is executed in the same manner as done previously (S244).

In the second cascade process, ADDmax sets are printed as shown in FIG. 43A (S245).

Then, the value of the input page counter fpc is decremented by "Wait-in" or by "1" (S246) and it is again determined if the back flag is set to "1" (ON) (S247).

As the back flag is already "0" (OFF), the decision is "NO" in this step and the value of the cascade counter CC is incremented by "1" (S249).

Then, it is determined if the cascade counter CC≦CCmax (S250). When the decision is "YES" in this step S250, the above-described processing of the step S241 is repeated and the value of the cascade counter CC is incremented by "1" every time cascade printing is completed (S249).

When the decision is "NO" in step S250, the value of the print page counter Opc is incremented by "1" and the value of the input page counter fpc is incremented by "+(Wait-in) ×3" or is incremented by "3" (S251).

It is then determined if the print page counter Opc≦Opcmax (S252). When the decision is "YES" in this step S252, the processing starting with the step S233 is repeated and double-side printing of pages 3 and 4 is carried out from the first cascade to the CCmax cascade.

When the decision is "NO" in step S252, it is determined that every printing has been completed, and the entire file and the other resources are freed by steps S59 and S60 in FIG. 22.

The cascade double-side printing in group mode (after the first set) is completed through the above-described processing.

Figure 26:
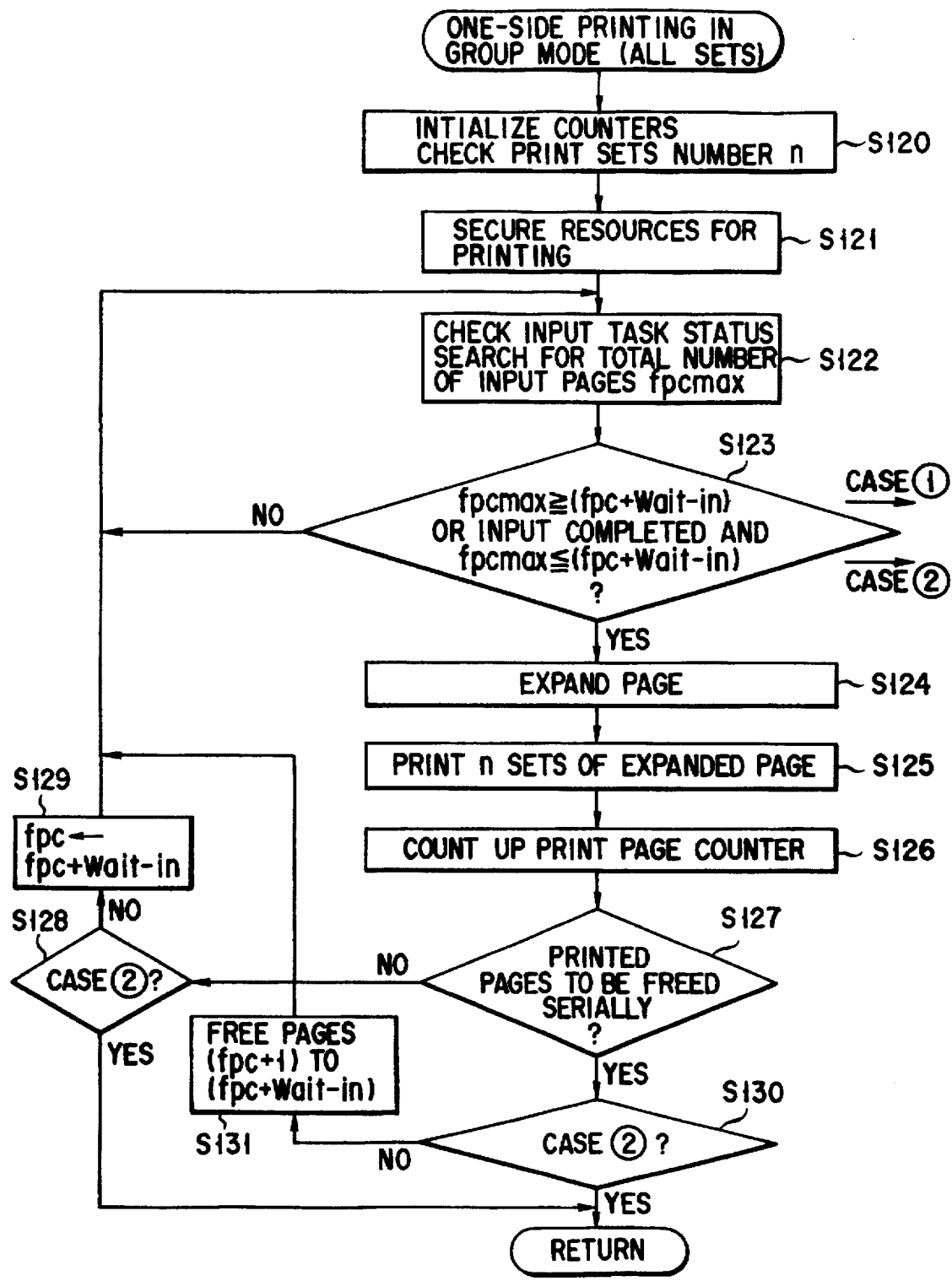
FIG. 26 is a flowchart for explaining one-side printing in a group mode (all sheets)

With reference to the flowchart in FIG. 26, one-side printing in group mode (all sets) which is performed in step S48 in FIG. 21 will be discussed below. In FIG. 26, counters are initialized and the print sets number n is checked first (S120). More specifically, a print page counter Opc for counting the print page number and an input page counter fpc for counting the number of pages of a document stored in a compressed form in the file area M2 in FIG. 15 are cleared to zero. That is, the page coupling number set from the operation section 114 is set as an input-wait page number Wait-in. When two sheets of a document of size A4 are both to be reduced to size B5 and both are to be printed on a sheet of size B4, for example, "2" is set as the "page coupling number." That is, the page coupling number is the number of pages to be coupled in the case where a plurality of pages stored in the file area M2 are coupled to be printed on a single sheet (hereinafter called "2 in 1"). When there are no pages to be coupled, "1" is set to Wait-in.

Next, resources for a printing process, such as the printing page buffer and printer, are secured (S121).

Then, the table in FIG. 14 is searched to see if the status of the input task is abnormal. Further, the total number of input pages of a document, fpcmax, stored in the file area M2 is detected by referring to the memory edition indication table E in FIG. 6 (S122).

Next, it is determined whether "fpcmax≧fpc+Wait-in (case 1)" or "input completed and fpcmax≦fpc+Wait-in (case 2)" is the case (S123).

The case 1 is such that inputting of a document is preceding to a document corresponding to the image data which is about to be output and the total number of input pages fpcmax is large.

The case 2 is such that every time printing is done, the input page counter fpc is counted up by Wait-in to become larger and the difference fpcmax and fpc may become equal to or smaller than Wait-in though the input has been completed. When an odd number of document sheets are input even though 2 in 1 has been designated, for example, only one sheet of a document would be printed on the last page. In this case, the condition for the case 2 is satisfied.

When the decision is "YES" in this step S123, page expansion is executed as follows (S124).

In the case 1, pages (fpc+1) to (fpc+Wait-in) of the document stored in a compressed form in the file area M2 expanded and are stored in the print page buffer. In the case 2, pages (fpc+1) to fpcmax of the document stored in a compressed form in the file area M2 are expanded and stored in the print page buffer.

Next, data stored in the print page buffer is sent to the printer 315 to be printed (S125).

Then, the print page counter Opc is counted up (+1) (S126).

It is then determined if a print page should be released serially (S127). It is determined here whether or not page 1 in the file area M2 should be freed after the print page or the page 1 is printed by n sets.

When the decision is "NO" in this step S127, it is determined if it is the case 2 (S128). When the decision is "NO" in this step S128, Wait-in is added to the value of the input page counter fpc and then the processing starting with the aforementioned step S122 is executed. In other words, in the case of 2 in 1, the input page counter fpc is counted up by "2."

If this processing is repeated, the input page counter fpc may become the total number of input pages fpcmax. That is, the condition for the case 2 is met. In this case, when the decision in step S128 is "YES," one-side printing in group mode (all sets) is completed.

When the decision in step S127 is "YES", it is determined if it is the case 2 (S130). When the decision is "NO" in this step S130, one page in the file area M2 whose printing has been completed, i.e., the portion from page (fpc+1) to page (fpc+Wait-in) is released after which the flow returns to step S122.

When the decision is "YES" in step S130, the sequence of processes is terminated.

Figure 27:
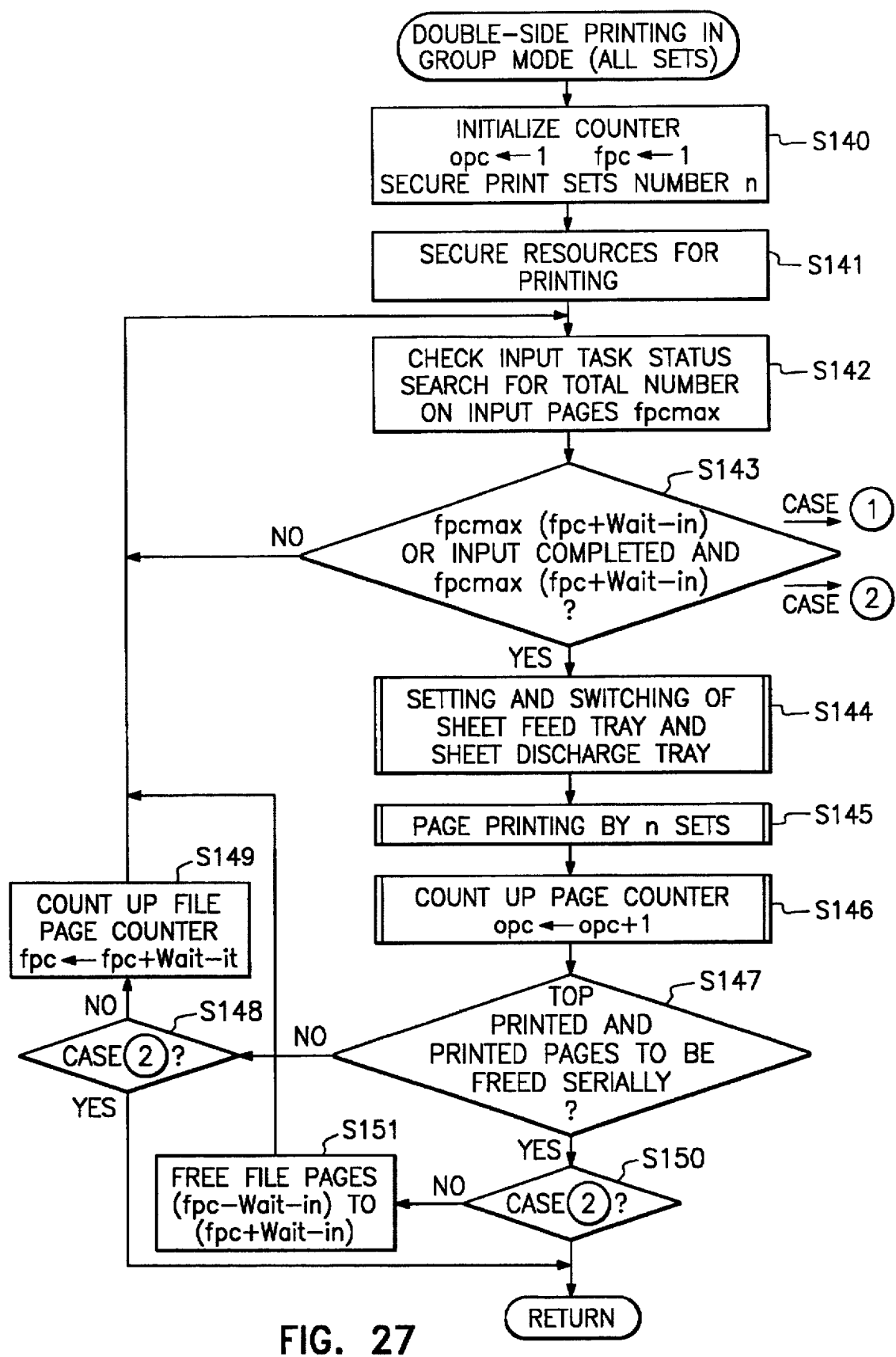
FIG. 27 is a flowchart for explaining double-side printing in a group mode (all sheets)

With reference to FIG. 27, one-side printing in group mode (all sets) which is the process in step S55 in FIG. 21 will be discussed below. The counters are initialized first (S140). More specifically, "1" is set in the print page counter Opc for counting the print page number and the input page counter fpc for counting the number of pages of a document stored in a compressed form in the file area M2 in FIG. 15 are cleared to zero. The page coupling number set from the operation section 114 is set as the input-wait page number Wait-in. Further, the print sets number n is secured.

Next, resources for a printing process, such as the printing page buffer and printer, are secured and the initialization of the sheet feed tray and sheet discharge tray is carried out (S141).

Then, the table in FIG. 14 is searched to see if the status of the input task is abnormal. Further, the total number of input pages of a document, fpcmax, stored in the file area M2 is detected by referring to the memory edition indication table E in FIG. 6 (S142).

Next, it is determined whether "fpcmax≧fpc+Wait-in (case 1)" or "input completed and fpcmax≦fpc+Wait-in (case 2)" is the case (S143).

When the decision is "YES" in this step S143, the sheet feed cassette and sheet discharge tray are switched (S144). More specifically, when the print page counter Opc is "1" (odd number), the sheet feed cassette 30 and the sheet discharge tray 74 are switched in such a way that sheets are fed from the sheet feed cassette 30 and discharged on the ADD 73b. When the print page counter Opc is "0" (even number), the sheet feed cassette 30 and the sheet discharge tray 74 are switched so that sheets are fed from the ADD 73b and discharged on the sheet discharge tray 74.

Next, page expansion is executed as follows (S145).

In the case 1, pages (fpc+1) to (fpc+Wait-in) of the document stored in a compressed form in the file area M2 expanded and are stored in the print page buffer. In the case 2, pages (fpc+1) to fpcmax of the document stored in a compressed form in the file area M2 are expanded and are stored in the print page buffer.

Next, data stored in the print page buffer is sent to the printer 315 to be printed, i.e., printing is made on the back side of each of n sets of sheets which are in turn sequentially stacked on the ADD 73b (S145).

Then, the print page counter Opc is counted up (+1) (S146).

Then, it is determined if the top side has been printed and serial printing should be released (S147).

When the decision is "NO" in this step S147, it is determined if it is the case 2 (S148).

When the decision is "NO" in this step S148, Wait-in is added to the value of the input page counter fpc ("1" is added if there are no coupling pages) and then the processing starting with the aforementioned step S142 is executed (S149).

Then, n sets of sheets on whose back sides page 2 has been printed and which are stacked on the ADD 73b are sequentially printed by the printer 315 and are discharged on the sheet discharge tray 74.

When the flow returns to step S144, as "2" (even number) is set in the print page counter Opc, the sheet feed cassette and sheet discharge tray are switched so that sheets are fed from the ADD 73b and are discharged on the sheet discharge tray 74.

Next, data stored in the print page buffer is sent to the printer 315 to be printed, i.e., printing is made on the top sides of n sets of sheets (S145).

Then, the print page counter Opc is counted up (+1) (S146).

In this manner, page 1 is printed on the top sides of n sets of sheets and page 2 is printed on the back sides thereof.

Then, the decision is "NO" in step S147 and the decision is "NO" in step S148 so that page 3 is printed on the top sides of n sets of sheets and page 4 on the back sides thereof. If this processing is repeated, the input page counter fpc may become the total number of input pages fpcmax. That is, the condition for the case 2 is met. In this case, the decision in step S148 is "YES" and double-side printing in group mode (all sets) is terminated.

When the decision is "YES" in step S147, it is determined if the condition for the case 2 is satisfied (S150). When the decision is "NO" in step S150, two pages from "fpc−(Wait-in)" to "fpc+(Wait-in)" in the file area M2 are freed (S151). Then, the processing starting with step S142 is repeated.

That is, when an instruction to serially free print pages, after printing is made on the back sides and top sides of n sets of sheets, two pages for the back side and top side alone in the file area M2 are freed (S151).

When the decision is "YES" in step S150, double-side printing in group mode (all sets) is terminated.

A description will now be given of how to secure image input and image output buffers in the page buffer M1 in FIG. 15 in the page memory 323 with reference to FIGS. 35 to 36B.

Figure 4:
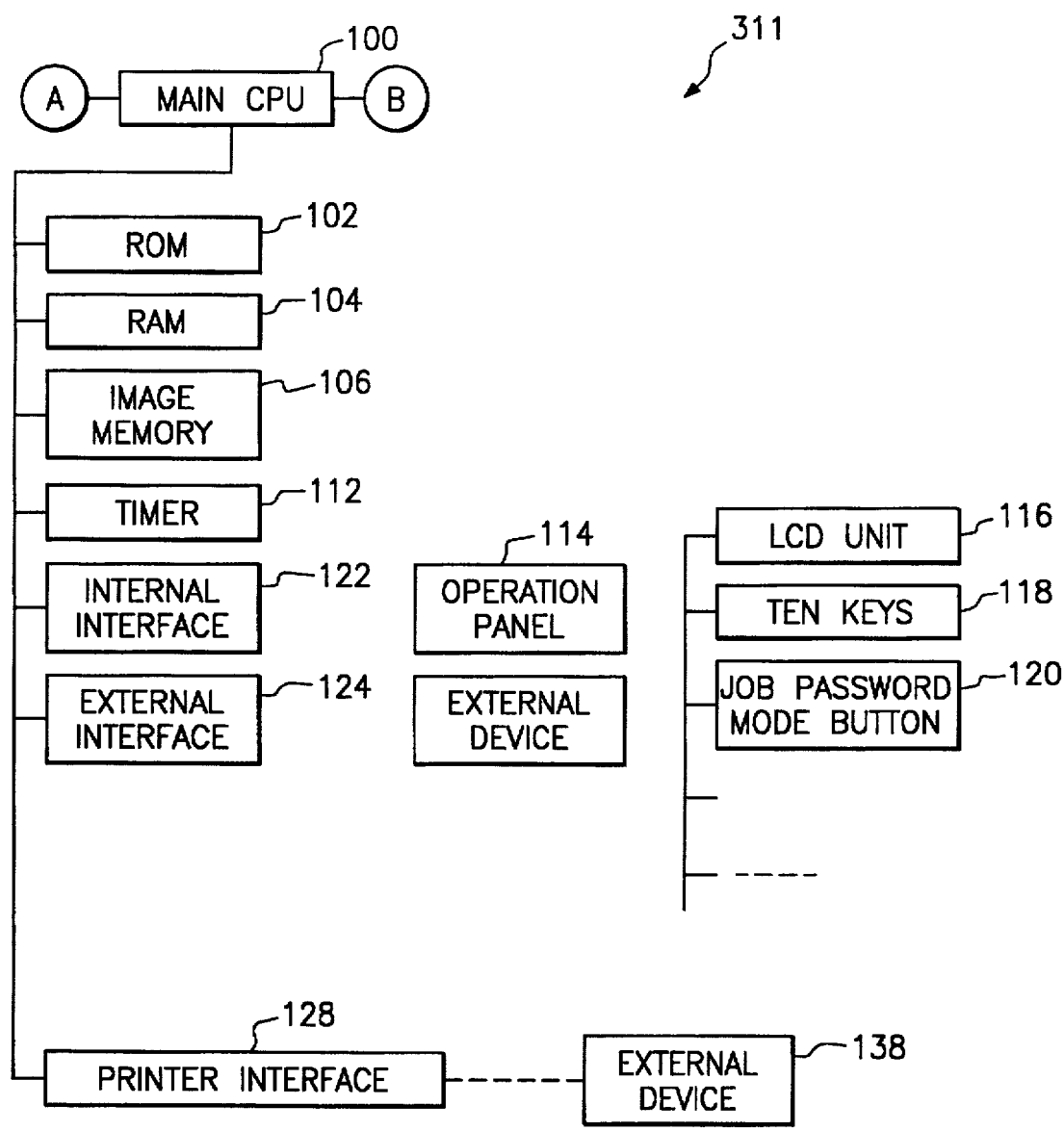
FIG. 4 is a block diagram showing the structure of a basic CPU.

Stored in the ROM 102 in FIG. 4 are a program illustrated as the flowchart in FIG. 35 and a program which executes memory allocation shown in FIG. 40.

FIG. 36A shows a table for securing image input and image output buffers for serial printing.

FIG. 36B shows a table for serial printing. The "serial printing" means printing as one page of a document is read by the scanner section 313. When the sheet size is A4 and the installed memory in the page memory 323 is 8 MB, 4 MB is secured for image inputting and 4 MB for image outputting in the page buffer area M1 in FIG. 15.

FIG. 36B also shows an "after-reading" table. The "after-reading" means printing after all sheets of a document are read by the scanner section 313. The after-reading table has a larger memory capacity to be secured than the serial-printing table. When the sheet size is A4 and the installed memory in the page memory 323 is 8 MB, 4 MB is secured for image inputting and 4 MB for image outputting in the page buffer area M1 in FIG. 15.

A description will now be given of how to secure the image input and image output buffers with reference to the flowchart in FIG. 35.

In FIG. 35, the installed memory capacity is acquired from the system first (S260). It is then determined if serial printing is possible by referring to steps S13 to S18 in the flowchart in FIG. 17 (S261).

When the decision is "YES" in this step S261, the image input and output buffers are secured by referring to the serial printing table in FIG. 36A (S263).

When the decision is "YES" in step S261, the image input and output buffers are secured by referring to the after-reading table in FIG. 36B (S262).

As the capacities of the image input and output buffers are secured in the page buffer area M1 in FIG. 15 based on the capacity of the installed memory and copy mode (serial printing or after-reading printing), the capacities of the image input and output buffers can be set to the optimal values.

Referring to FIGS. 37 to 40, the file write routine and memory allocating process will be described below. First, the method of managing the page memory 323 as the image storing memory will be discussed in accordance with the example of the stored contents of a block management table 33e shown in FIGS. 38A, 38B and 39.

The area of the page memory section 323 used as the image storing memory is segmented to blocks each of 16 Kbytes, which are managed block by block by the block management table 33e. The block size is not limited to 16 Kbytes, but may be set 32 Kbytes or 64 Kbytes.

The total storage area of the page memory 323 is allocated, for example, 8 Mbytes for each job type when power is on, as shown in FIGS. 38A and 38B. The job types to which the individual memory segments are allocated can be identified as attribute information of the block management table 33e by job type ID flags each for one block. For instance, "I: for image input" and "S: for electronic sort" are provided.

A description will now be given of how to use the image storing memory for each job or the page memory section 232, with reference to the flowcharts illustrated in FIGS. 37 and 40. FIG. 37 shows the routine for storing images in the image storing area that each job uses at the time of image storage.

In FIG. 37, n kilobytes of memory are allocated first and it is determined if this size is allocable or causes memory full (S270).

The allocation of n kilobytes of memory is executed according to the flowchart in FIG. 40.

Referring to FIG. 40, the empty (NULL) area in the block management table 33e is searched for each job type (S280). When NULL is found in this step S280, the associated block is used. Then, the NULL flag is changed to an END flag as shown in FIG. 38 (S281), and a newly used block number is set to the END flag (S282), and a status indicative of the proper termination is returned (S283).

This information is used as link information indicating in what order blocks are used. When image data has a large size of, for example, 30 Kbytes, the block securing is repeated twice to newly use a total of two NULL blocks.

If no empty block is searched out in step S280, a memory-full status is returned (S284).

If the status set by the memory allocation routine in FIG. 40 indicates the proper termination, a process of writing data into the allocated area is executed (S271).

It is then determined if there is any other data to be written (S272). When the decision is "YES" in this step, the memory allocation routine is called again in step S270 to allocate n kilobytes of memory.

When the decision is "NO" in step S272, the proper-termination status is set (S273).

When it is determined as "memory full" in step S270, the memory-full status is set (S275).

The memory is secured in the page memory 323 in the above manner.

According to this invention, as described in detail above, the first sheet of a copy or the first set of copies are printed earlier such that copies of a document can be checked at an earlier time. It is therefore possible to provide a composite type image forming apparatus capable of reducing the time spent recopying improper copies and thereby reducing the number of wasted copies.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming apparatus comprising:
    means for reading an image of a document;
    means for storing the image read by the reading means;
    means for setting image forming conditions at a time of forming the image stored in the storing means on an image-forming medium;
    first output means for, every time the reading means reads images of sheets of a document sheet by sheet, printing images corresponding to the read images one by one;
    second output means for, after the first output means prints images corresponding to all sheets of the document one by one, printing images which have not been printed out yet in accordance with the image forming conditions;
    third output means for, after the storing means stores all images corresponding to sheets of the document, printing images corresponding to all sheets of the document; and
    means for enabling the first and second output means or the third output means in accordance with the image forming conditions set by the setting means.

2. An image forming apparatus according to claim 1, further comprising:
    means for changing a usage for an area in the storing means where no image is stored to a usage for a memory area for the second and third output means, after to-be-stored images corresponding to all sheets of the document are stored in the storing means by the reading means.

3. An image forming apparatus according to claim 1, wherein the second and third output means include:
    means for outputting the images of the document in a sort mode, and outputting one set of all images of the document in a document inputting order first and then repeating such outputting by a number of copies in accordance with the image forming conditions including a number of copies set by the setting means, thereby printing the images corresponding the sheets of the documents in a named operation order.

4. An image forming apparatus according to claim 1, wherein the second and third output means include:
    means for outputting the images of the document in a group mode, and outputting an image of a first sheet of the document in an inputting order by a number of copies, outputting an image of a second sheet of the document in the inputting order by the number of copies, an outputting images of remaining sheets of the document in a same manner, in accordance with the image forming conditions including a number of copies set by the setting means, thereby printing the images corresponding the sheets of the documents in a named operation order.

5. An image forming apparatus according to claim 1, wherein the second and third output means include:

fourth output means for, after temporary storage of a predetermined limited number of image forming media on which images of the documents are formed and which are output by the second and third output means, outputting the image forming media outside the apparatus.

6. An image forming apparatus according to claim 5, wherein the fourth output means includes:

fifth output means for outputting the image forming media outside the apparatus when a number of image forming media temporarily stored in accordance with the image forming conditions becomes a predetermined number.

7. An image forming apparatus according to claim 1, wherein the second and third output means include:

fourth output means for combining a plurality of images of the document, forming a combined image on one of image forming media on which images are to be formed, and outputting the image forming media.

8. An image forming apparatus according to claim 1, further comprising:

means for inputting a confirmation signal by an operator indicating the printed and output image forming media is proper after the first output means prints and outputs all images corresponding to the document;

means for inhibiting an output of the third output means when the confirmation-signal inputting means has not received the confirmation signal from the operator; and means for performing control in such a way as to cause the third output means to make printing in accordance with the image forming conditions after all images corresponding to the document are printed and output one by one by the first output means, when the confirmation signal is input by the inputting means.

9. An image forming apparatus according to claim 1, wherein the second and third output means include:

fourth output means for outputting the images of the document in a sort mode, and outputting one set of all images of the document in a document inputting order first and then repeating such outputting by a number of copies in accordance with the image forming conditions including a number of copies set by the setting means, thereby printing the images corresponding the sheets of the documents in a named operation order;

fifth output means for outputting the images of the document in a group mode, and outputting an image of a first sheet of the document in an inputting order by a number of copies, outputting an image of a second sheet of the document in the inputting order by the number of copies, an outputting images of remaining sheets of the document in a same manner, in accordance with the image forming conditions including a number of copies set by the setting means, thereby printing the images corresponding the sheets of the documents in a named operation order;

sixth output means for, after temporary storage of a predetermined limited number of image forming media on which images of the documents are formed and which are output by the second and third output means, outputting the image forming media outside the apparatus; and seventh output means for outputting the image forming media outside the apparatus when a number of image forming media temporarily stored in accordance with the image forming conditions becomes the predetermined limited number.

10. An image forming apparatus comprising:

means for reading images of a plurality of documents;

means for storing the images read by the reading means;

first image forming means for forming the images one by one every reading of one of the documents by the reading means, and forming the stored images in the storing means corresponding to a given image forming condition after the storing means finishes storing all of the images to be stored:

second image forming means for forming the stored images in the storing means corresponding to the given image forming condition after the storing means finishes storing all of the images to be stored;

means for determining whether the first image forming means or the second image forming means forms images corresponding to the given image forming condition; and means for controlling one of the first or the second image forming means determined by the determining means so as to form the images.

11. An image forming apparatus according to claim 10, wherein the first and second image forming means includes:

means for outputting the images of the documents in a sort mode, and outputting one set of all images of the documents in a document inputting order first and then repeating such outputting by a number of copies in accordance with given image forming conditions, thereby printing the images corresponding the sheets of the documents in a named operation order.

12. An image forming apparatus according to claim 10, wherein the first and second image forming means includes:

means for outputting the images of the document in a group mode, and outputting an image of a first sheet of the document in an inputting order by a number of copies, outputting an image of a second sheet of the document in the inputting order by the number of copies, an outputting images of remaining sheets of the document in a same manner, in accordance with given image forming conditions, thereby printing the images corresponding the sheets of the documents in a named operation order.

13. An image forming apparatus according to claim 10, wherein the first and second image forming means includes:

means for, after temporary storage of a predetermined limited number of image forming media on which images of the documents are formed and which are output by the first and second image forming means, outputting the image forming media outside the apparatus in accordance with given image forming conditions.

14. An image forming apparatus according to claim 10, wherein the storing means includes:

first storing means for directly storing the images read by the reading means;

means for compressing the images stored in the first storing means; and second storing means for storing the images compressed by the compressing means.

15. An image forming apparatus according to claim 14, wherein the controlling means includes:

second controlling means for performing control in such a way as to cause the first image forming means to perform image forming using the images stored in the first storing means at a time the plurality of images corresponding to the series of sheets of the document are formed, set by set.

16. An image forming method comprising the steps of:

reading images of a plurality of documents;

storing the images read by the reading step;

first image forming step for forming the image one by one every reading of one of the documents by the reading step, and forming the stored images in the storing step corresponding to a given image forming condition after the storing step finishes all of the images to be stored;

second image forming step for forming the stored images in the storing step corresponding to the given image forming conditions after the storing step finishes all of the images to be stored;

determining whether the first image forming step or the second image forming step corresponding to the given image forming conditions; and controlling one of the first or the second image forming steps determined by the determining step so as to form the images.

17. An image forming method according to claim 16, wherein the first and second image forming step includes:

a step of outputting the images of the document in a sort mode, and outputting one set of all images of the document in a document inputting order first and then repeating such outputting by a number of copies in accordance with given image forming conditions, thereby printing the images corresponding the sheets of the documents in a named operation order.

18. An image forming method according to claim 16, wherein the first and second image forming step includes:

a step of outputting the images of the document in a group mode, and outputting an image of a first sheet of the document in a n inputting order by a number of copies, outputting an image of a second sheet of the document in the inputting order by the number of copies, an outputting images of remaining sheets of the document in a same manner, in accordance with given image forming conditions, thereby printing the images corresponding the sheets of the documents in a named operation order.

19. An image forming method according to claim 16, wherein the first and second storing step includes:

a step of directly storing images read by the reading step;

a step of compressing the images stored in the first storing step; and a step of storing the images compressed in the compression step.

20. An image forming method according to claim 16, wherein the serial image forming step includes:

performing image forming using the images stored in the first storing step at a time the plurality of images corresponding to the series of sheets of the document are formed, set by set.

* * * * *